(12) United States Patent
Hayakawa et al.

(10) Patent No.: US 9,862,320 B2
(45) Date of Patent: Jan. 9, 2018

(54) THREE-DIMENSIONAL OBJECT DETECTION DEVICE, AND THREE-DIMENSIONAL OBJECT DETECTION METHOD

(71) Applicant: Nissan Motor Co., Ltd., Yokohama-shi, Kanagawa (JP)

(72) Inventors: Yasuhisa Hayakawa, Yokohama (JP); Osamu Fukata, Commerce Township, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 188 days.

(21) Appl. No.: 14/406,794

(22) PCT Filed: Jul. 24, 2013

(86) PCT No.: PCT/JP2013/070008
§ 371 (c)(1),
(2) Date: Dec. 10, 2014

(87) PCT Pub. No.: WO2014/017519
PCT Pub. Date: Jan. 30, 2014

(65) Prior Publication Data
US 2015/0145956 A1 May 28, 2015

(30) Foreign Application Priority Data

Jul. 27, 2012 (JP) .................................. 2012-166514

(51) Int. Cl.
*B60R 1/00* (2006.01)
*B60S 1/46* (2006.01)
(Continued)

(52) U.S. Cl.
CPC ................ *B60R 1/002* (2013.01); *B60S 1/46* (2013.01); *B60S 1/56* (2013.01); *G06K 9/00791* (2013.01);
(Continued)

(58) Field of Classification Search
CPC .............. B60R 1/002; B60R 2300/607; B60R 2300/107; B60R 2300/8093; H04N 7/183; B60S 1/56; B60S 1/46
(Continued)

(56) References Cited

U.S. PATENT DOCUMENTS

| 5,708,859 A | 1/1998 | Tajima et al. |
| 2007/0115357 A1 | 5/2007 | Stein et al. |
| 2012/0117745 A1* | 5/2012 | Hattori et al. ........ B60S 1/0848 15/250.01 |

FOREIGN PATENT DOCUMENTS

| CN | 2714389 Y | 8/2005 |
| CN | 102288165 A | 12/2011 |

(Continued)

OTHER PUBLICATIONS

Chin-Teng Lin et al, "Construction of Fisheye Lens Inverse Perspective Mapping Model and Its Applications of Obstacle Detection," EURASIP Journal on Advances in Signal Processing, Jun. 15, 2010, vol. 1, No. 3, 2010, Hindawi Publishing Corporation, New York, NY.

*Primary Examiner* — Gims Philippe
*Assistant Examiner* — On S Mung
(74) *Attorney, Agent, or Firm* — Global IP Counselors, LLP

(57) ABSTRACT

A three-dimensional object detection device has a camera, a three-dimensional object detection unit, a lens cleaning device, a lens state assessment unit and a controller. The camera has a lens for forming an image of an area rearward (Continued)

of a vehicle. The three-dimensional object detection unit detects a three-dimensional object rearward of the vehicle based on the captured images. The lens cleaning device sprays cleaning fluid to clean the lens of the camera. The lens state assessment unit accesses whether the lens is in a predetermined state subject to control based on a timing at which cleaning fluid is sprayed on the lens. The controller suppresses detection of the three-dimensional object by retaining detection or assessment results for a predetermined length of time that were obtained immediately before the lens was assessed to be in the state subject to control, upon assessment that the lens state is subject to control.

11 Claims, 38 Drawing Sheets

(51) Int. Cl.
*B60S 1/56* (2006.01)
*H04N 7/18* (2006.01)
*G06K 9/00* (2006.01)
*G06K 9/20* (2006.01)
*G08G 1/16* (2006.01)

(52) U.S. Cl.
CPC ......... *G06K 9/00805* (2013.01); *G06K 9/209* (2013.01); *G08G 1/166* (2013.01); *G08G 1/167* (2013.01); *B60R 2300/107* (2013.01); *B60R 2300/607* (2013.01); *B60R 2300/8093* (2013.01); *H04N 7/183* (2013.01)

(58) Field of Classification Search
USPC .................................................. 348/46, 148
See application file for complete search history.

(56) References Cited

FOREIGN PATENT DOCUMENTS

| | | |
|---|---|---|
| EP | 2400315 A1 | 12/2011 |
| JP | 2008-219063 A | 9/2008 |
| JP | 2008-227646 A | 9/2008 |
| JP | 2009-286216 A | 12/2009 |
| JP | 2011-240917 A | 12/2011 |
| JP | 2011-245989 A | 12/2011 |
| JP | 2012-132988 A | 7/2012 |
| WO | 2012023412 A1 | 2/2012 |

* cited by examiner

| | LENS CLEANING STEPS | P1 (CLEANING FLUID DISPENSING PROCESS) P10 (CLEANING FLUID SPRAYING PROCESS) | P2, P3, P4 (CLEANING FLUID-DISPERSING AIR BLOWING PROCESS) | P4 (CLEANING FLUID-DISPERSING AIR BLOWING PROCESS) (FINAL) P20 (DRYING AIR BLOWING PROCESS) |
|---|---|---|---|---|
| LENS STATE | AMOUNT OF CLEANING FLUID ADHERING TO LENS | LARGE AMOUNT | MIDDLE AMOUNT | SMALL AMOUNT |
| | LENS STATE | FIRST STATE SUBJECT TO CONTROL | SECOND STATE SUBJECT TO CONTROL | THIRD STATE SUBJECT TO CONTROL |
| PROCESS SUBJECT TO CONTROL | EDGE INFORMATION-BASED OTHER VEHICLE DETECTION PROCESS | POSSIBILITY OF REDUCED PRECISION (HIGH) | TENDENCY FOR REDUCED PRECISION | S TENDENCY FOR REDUCED PRECISION |
| | DIFFERENTIAL WAVEFORM INFORMATION-BASED OTHER VEHICLE DETECTION PROCESS | TENDENCY FOR REDUCED PRECISION | POSSIBILITY OF REDUCED PRECISION (HIGH) | TENDENCY FOR REDUCED PRECISION |
| | RELATIVE SPEED-BASED OTHER VEHICLE DETECTION PROCESS | TENDENCY FOR REDUCED PRECISION | TENDENCY FOR REDUCED PRECISION | POSSIBILITY OF REDUCED PRECISION (HIGH) |

FIG. 23

| | LENS CLEANING STEPS | P1 (CLEANING FLUID DISPENSING PROCESS) P10 (CLEANING FLUID SPRAYING PROCESS) | P2, P3, P4 (CLEANING FLUID-DISPERSING AIR BLOWING PROCESS) | P4 (CLEANING FLUID-DISPERSING AIR BLOWING PROCESS) (FINAL) P20 (DRYING AIR BLOWING PROCESS) |
|---|---|---|---|---|
| LENS STATE | AMOUNT OF CLEANING FLUID ADHERING TO LENS | LARGE AMOUNT | MIDDLE AMOUNT | SMALL AMOUNT |
| | LENS STATE | FIRST STATE SUBJECT TO CONTROL | SECOND STATE SUBJECT TO CONTROL | THIRD STATE SUBJECT TO CONTROL |
| ACTIONS CAPTURED DURING CONTROL | EDGE INFORMATION-BASED OTHER VEHICLE DETECTION PROCESS | <SUPPRESSION CONTROL> SET DETECTION PROCESS INTERRUPT TIME T3 (OR) DETECTION RESULTS RETENTION TIME T3 T3 (T1 < T2 ≤ T3) | SUPPRESSION CONTROL | SUPPRESSION CONTROL |
| | DIFFERENTIAL WAVEFORM INFORMATION-BASED OTHER VEHICLE DETECTION PROCESS | SUPPRESSION CONTROL | <SUPPRESSION CONTROL> SET DETECTION PROCESS INTERRUPT TIME T2 (OR) DETECTION RESULTS RETENTION TIME T2 T2 (T1 < T2 ≤ T3) | SUPPRESSION CONTROL |
| | RELATIVE SPEED-BASED OTHER VEHICLE DETECTION PROCESS | SUPPRESSION CONTROL | SUPPRESSION CONTROL | <SUPPRESSION CONTROL> SET DETECTION PROCESS INTERRUPT TIME T1 (OR) DETECTION RESULTS RETENTION TIME T1 T1 (T1 ≤ T2 ≤ T3) |

FIG. 24

025-0145-0000ee # THREE-DIMENSIONAL OBJECT DETECTION DEVICE, AND THREE-DIMENSIONAL OBJECT DETECTION METHOD

CROSS-REFERENCE TO RELATED APPLICATIONS

This application is a U.S. National stage application of International Application No. PCT/JP2013/070008, filed Jul. 24, 2013, which claims priority to Japanese Patent Application No. 2012-166514 filed in Japan on Jul. 27, 2012. The entire disclosure of Japanese Patent Application No. 2012-166514 is hereby incorporated herein by reference.

BACKGROUND

Field of the Invention

The present invention relates to a three-dimensional object detection device and a three-dimensional object detection method.

Background Information

An obstacle detection device is known that converts images captured of the periphery of a vehicle to bird's-eye view images, and uses differences in two bird's-eye view-converted images captured at different points in time to detect obstacles (see Japanese Laid-Open Patent Application No. 2008-227646).

SUMMARY

The prior art presents a problem in that, because camera lens contamination is a cause of mistaken detection, cleaning of the lens is performed while images are being captured, but, when cleaning fluid is sprayed on to clean the lens, cleaning fluid adhering to the surface of the lens causes changes in image information, preventing accurate detection of three-dimensional objects.

The problem to be solved by the present invention is to provide a three-dimensional object detection device that detects other vehicles present in a detection area with high precision, even when cleaning fluid has been sprayed onto a lens.

The present invention solves the problem described above by assessing, based on the specific actions performed during a predetermined lens cleaning step, whether the state of a lens is a state subject to control, and, when the lens state is a state subject to control, retaining, for a predetermined length of time, detection or assessment results from immediately before the lens state was assessed to be the state subject to control, and suppressing detection of a three-dimensional object being detected is suppressed.

In the present invention, when a lens is cleaned using a cleaning fluid, a three-dimensional object detection process and assessment process are suppressed in accordance with the state of the lens so that detection results or assessment results from before the lens was cleaned are maintained, allowing for the prevention of mistaken assessments such as an already detected three-dimensional object changing to being undetected as the result of the lens cleaning process, or an undetected three-dimensional object changing to being detected as the result of the lens cleaning process. This allows for the provision of a three-dimensional object detection device that prevents lens-cleaning-induced reductions in the precision of detection results and detects other vehicles traveling in a detection area at high precision.

BRIEF DESCRIPTION OF THE DRAWINGS

Referring now to the attached drawings which form a part of this original disclosure.

FIG. 23 is a view illustrating of the correspondence between the state of a lens and the precision of various processes during lens cleaning.

FIG. 24 is a view illustrating of the correspondence between the state of a lens and the specific control actions performed in various processes during lens cleaning.

DETAILED DESCRIPTION OF THE EMBODIMENTS

Figure 1:
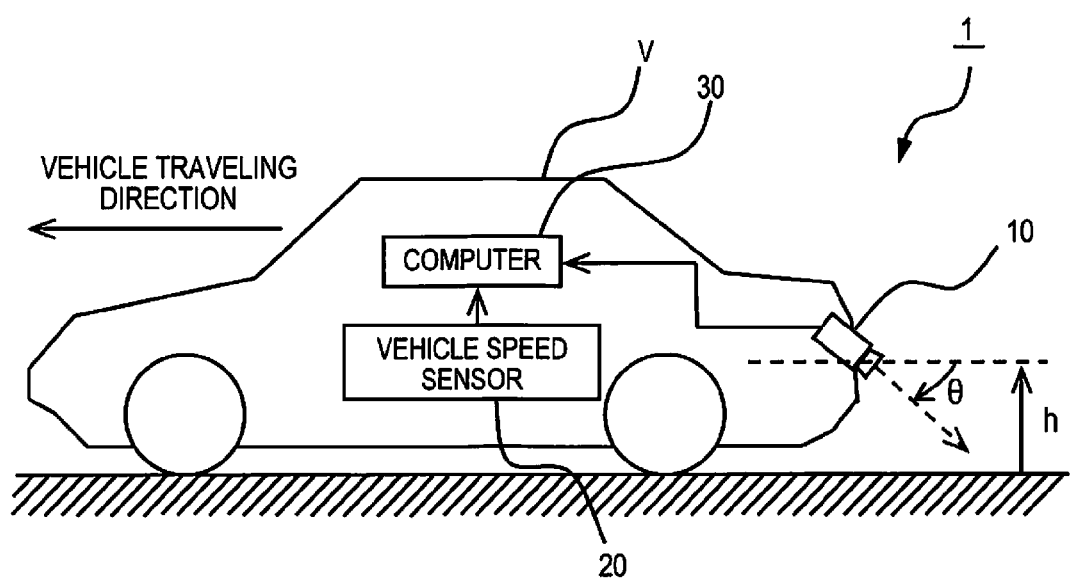
FIG. 1 is a schematic illustration of an overall configuration of a vehicle according to a first embodiment to which the three-dimensional object detection device of the present invention has been applied.

FIG. 1 is a schematic view of a vehicle according to one embodiment to which a three-dimensional object detection device 1 according to the present invention has been applied. The three-dimensional object detection device 1 of the present example detects other vehicles requiring the attention of a driver of a host vehicle V while driving, such as other vehicles that the host vehicle V could potentially contact when changing lanes, as obstacles. In particular, the three-dimensional object detection device 1 of the present example detects other vehicles traveling in adjacent lanes next to the lane in which the host vehicle is traveling (hereafter also referred to simply as "adjacent lanes"). The three-dimensional object detection device 1 of the present example is also capable of calculating the travel distance and traveling speed of a detected other vehicle. For this reason, the example described hereafter will be an example in which a three-dimensional object detection device 1 is installed in a host vehicle V and detects, among various detected three-dimensional objects in the periphery of the host vehicle, another vehicle traveling in an adjacent lane next to the lane in which the host vehicle V is traveling. As shown in the drawing, the three-dimensional object detection device 1 of the present example is provided with a camera 10 provided with a lens 11 that forms images of the area rearward of a vehicle, a vehicle speed sensor 20, a computer 30, and a lens cleaning device 100 for cleaning the lens 11.

As shown in FIG. 1, the camera 10 is attached at a location on the rear of the host vehicle V at a height h so that the optical axis thereof forms a downward angle θ with respect to the horizontal. From this position, the camera 10 captures images of a predetermined area of the surroundings of the host vehicle V. In the present embodiment, one camera 10 is provided for detecting three-dimensional objects to the rear of the host vehicle V, but, in other uses, another camera for acquiring, e.g., images of the vehicle surroundings can also be provided. The vehicle speed sensor 20 detects the travel speed of the host vehicle V, and calculates vehicle speed based on, e.g., of a wheel speed detected by a wheel speed sensor that detects the rate of rotation of a wheel. The computer 30 detects a three-dimensional object rearward of the vehicle, and, in the present example, calculates the travel distance and traveling speed of the three-dimensional object.

Figure 2:
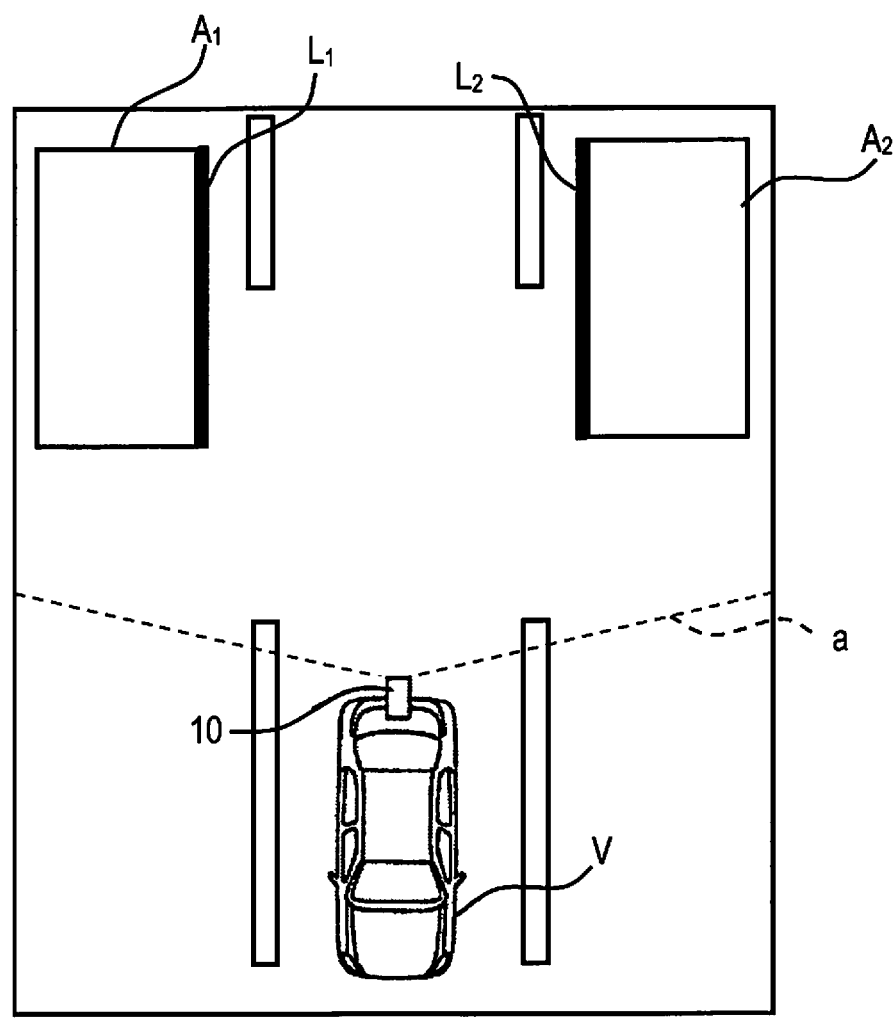
FIG. 2 is a plan view of the vehicle of FIG. 1 in a state of travel (three-dimensional object detection based on differential waveform information).

FIG. 2 is a plan view of the host vehicle V in a state of travel. As shown in the drawing, the camera 10 captures images of the rear of the vehicle at a predetermined view angle a. Here, the view angle a of the camera 10 is set to a view angle allowing images not only of the lane in which the host vehicle V is traveling, but also of the lanes to the left and right, to be captured. The photographable area is the rear of the host vehicle V, and includes detection target areas A1, A2 over adjacent lanes to the left and right of the lane in which the host vehicle V is traveling. In the present embodiment, "the rear of the vehicle" includes not only the area directly behind the vehicle, but also lateral areas rearward of the vehicle. The photographed area of the rear of the vehicle is set according to the view angle of the camera 10. In one example, taking 0° as the direction directly rearward of the vehicle in the longitudinal direction of the vehicle, the area can be set to include a range of 0-90°, preferably 0-70°, to the left and right of the directly rearward direction.

Figure 3:
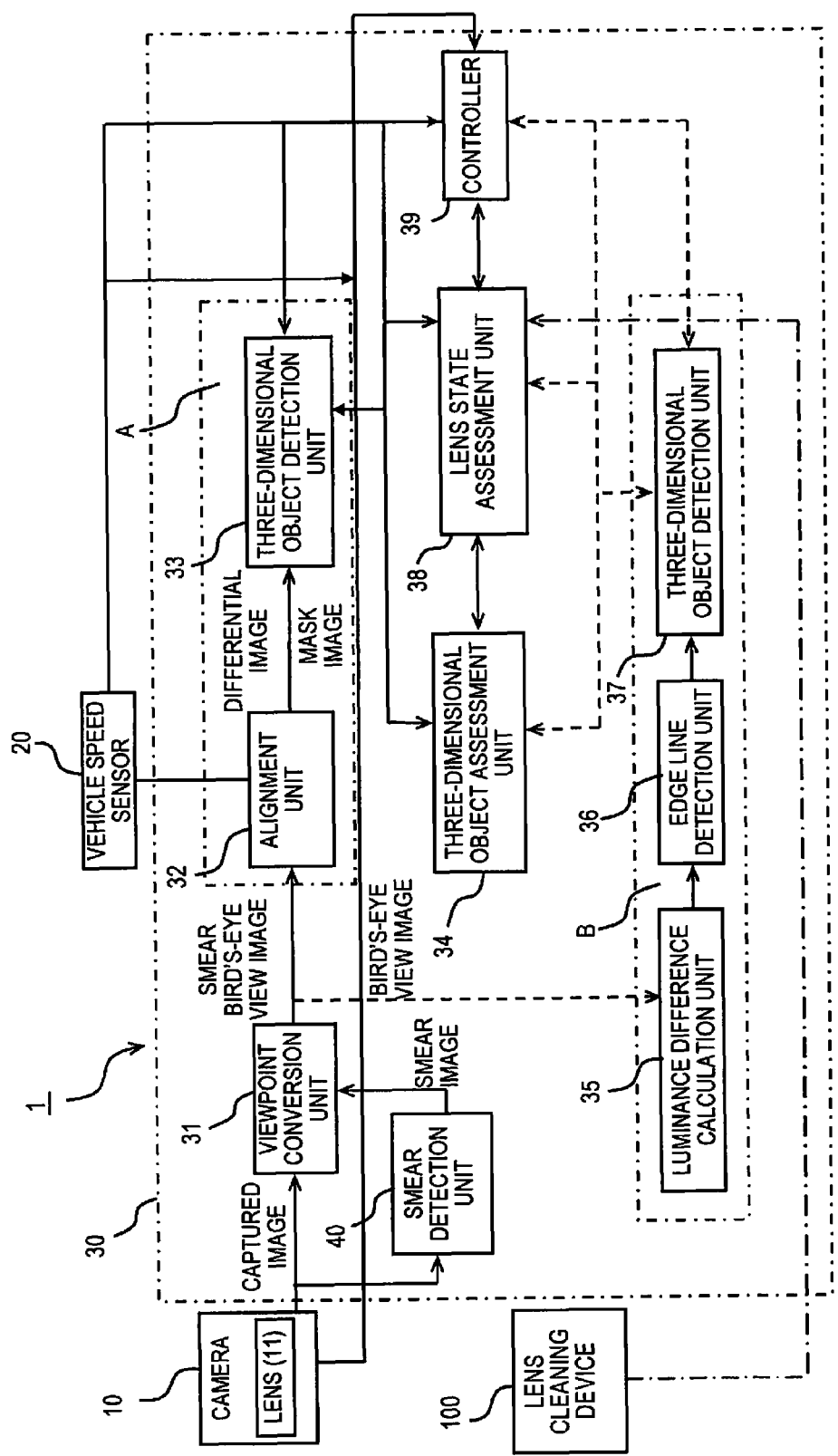
FIG. 3 is a block diagram of the details of a computer from FIG. 1.

FIG. 3 is a block diagram of the details of the computer 30 from FIG. 1. In FIG. 3, the camera 10, vehicle speed sensor 20, and lens cleaning device 100 are also shown so that the connection relationship is clear.

As shown in FIG. 3, the computer 30 is provided with a viewpoint conversion unit 31, an alignment unit 32, a three-dimensional object detection unit 33, a three-dimensional object assessment unit 34, a lens state assessment unit 38, a controller 39, and a smear detection unit 40. The computer 30 has a configuration relating to a three-dimensional object detection block using differential waveform information. The computer 30 of the present embodiment can also have a configuration relating to a three-dimensional object detection block using edge information. In this case, a detection block configuration A comprising the alignment unit 32 and the three-dimensional object detection unit 33 shown in FIG. 3 can be replaced by a detection block configuration B comprising the luminance difference calculation unit 35, the edge line detection unit 36, and the three-dimensional object detection unit 37 surrounded by the dotted line in FIG. 3. As shall be apparent, a configuration that is provided with both the detection block configuration A and the detection block configuration B and performs both three-dimensional object detection based on differential waveform information and three-dimensional object detection based on edge information is also possible. If both the detection block configuration A and the detection block configuration B are provided, either the detection block configuration A or the detection block configuration B can be operated according to, e.g., environmental factors such as luminance. These various configurations will be described hereafter.

Three-Dimensional Object Detection Based on Differential Waveform Information

The three-dimensional object detection device 1 of the present embodiment detects three-dimensional objects present in a right-side detection area or a left-side detection area rearward of the vehicle based on image information obtained by the monocular camera 10 taking images of the rear of the vehicle.

Captured image data of a predetermined area captured by the camera 10 is inputted to the viewpoint conversion unit 31, which performs viewpoint conversion of the captured image data to bird's-eye view image data showing a bird's-eye view. Here, "bird's-eye view" refers to a view from the viewpoint of an imaginary camera looking downward from midair, e.g., vertically downward. This viewpoint conversion can be executed as disclosed, for example, in Japanese Laid-Open Patent Application No. 2008-219063. The captured image data is viewpoint-converted to bird's-eye view image data based on the principle that the vertical edges unique to three-dimensional objects are converted to straight line groups passing through specific fixed points via viewpoint conversion to bird's-eye view image data, which can be used to distinguish flat objects and three-dimensional objects. The results of the image conversion process performed by the viewpoint conversion unit 31 are also used to detect three-dimensional objects using edge information as described hereafter.

Figure 4:
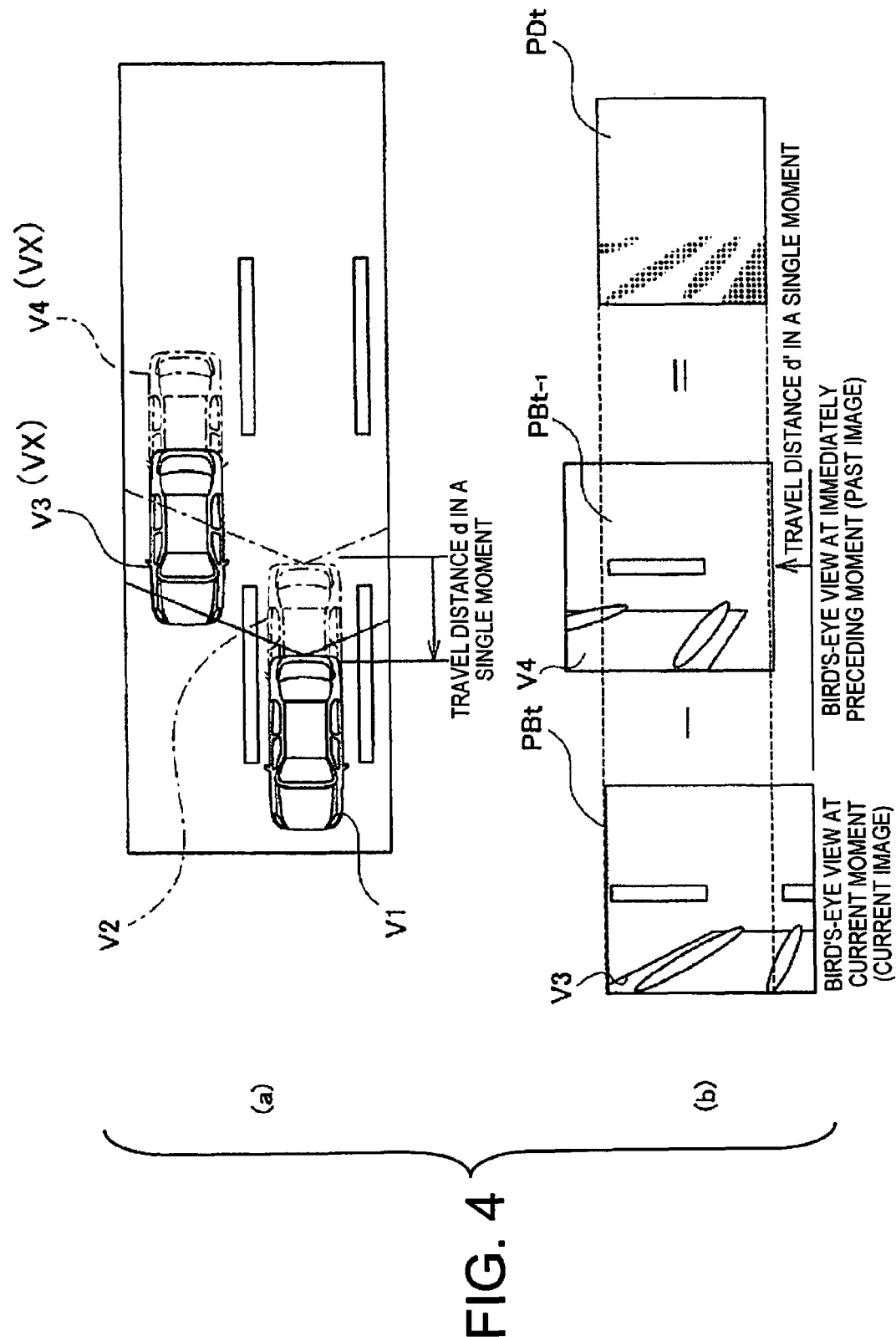
FIG. 4 is an explanatory illustration of an overview of a process performed by an alignment unit in FIG. 3, with part (a) illustrating the vehicle in a state of motion, and part (b) illustrating an overview of the alignment process.

The bird's-eye view image data obtained via the viewpoint conversion performed by the viewpoint conversion unit 31 is sequentially inputted to the alignment unit 32, which aligns bird's-eye view image data inputted at different points in time. FIG. 4 is an explanatory illustration of an overview of a process performed by an alignment unit, with part (a) being a plan view of the host vehicle V in a state of motion, and part (b) is an image showing an overview of the alignment process.

As shown in part (a) of FIG. 4, the host vehicle V is positioned at V1 at the current time, and the host vehicle V was positioned at V2 at one moment before. Another vehicle VX is positioned to the rear of the host vehicle V and travels in parallel with the other vehicle VX, with the other vehicle VX being positioned at V3 at the present moment, and the other vehicle VX being positioned at V4 one moment before. In addition, the host vehicle V is considered to have moved a distance d in one moment. "One moment before" may be a time a predetermined length of time (e.g. one control cycle) in the past from the current time, or may be a time at any desired length of time in the past.

In this state, a current bird's-eye view image $PB_t$ is as shown in part (b) of FIG. 4. In this bird's-eye view image $PB_t$, white lines painted on the road surface appear as rectangular shapes, indicating a relatively accurate plan view thereof, but the position of the other vehicle VX at position V3 is collapsed. Likewise, in a bird's-eye view image $PB_{t-1}$ from one moment before, white lines painted on the road surface appear as rectangular shapes, indicating a relatively accurate plan view thereof, but the other vehicle VX at position V4 is collapsed. As already stated, the vertical edges of the three-dimensional object (including edges rising from the road surface in three-dimensional space as well as vertical edges in the strict sense) appear as a group of straight lines along the collapsing direction as the result of the process of viewpoint conversion to bird's-eye view image data, whereas flat images on the road surface do not contain vertical edges, and therefore do not exhibit collapsing even after viewpoint conversion.

The alignment unit 32 aligns the above-described bird's-eye view images $PB_t$, $PB_{t-1}$ in the data. During this process, the alignment unit 32 offsets the bird's-eye view image $PB_{t-1}$ from one moment before and aligns it with the position of the current bird's-eye view image $PB_t$. The images on the left side and at the center of part (b) of FIG. 4 are shown offset by a travel distance d'. The offset amount d' is the movement amount in the bird's-eye view image data corresponding to the actual travel distance d of the host vehicle V shown in part (a) of FIG. 4, and is assessed based on a signal from the vehicle speed sensor 20 and the length of time from one moment before to the current time.

After alignment has been performed, the alignment unit 32 finds the difference between the bird's-eye view images $PB_t$, $PB_{t-1}$, and generates data for a differential image $PD_t$. The pixel values of the differential image $PD_t$ may be the absolute values of the differences between the pixel values of the bird's-eye view images $PB_t$, PBt−1, or may be set to "1" if the absolute values exceed a predetermined threshold value p and to "0" if not in order to accommodate changes in the level of environmental illumination. The image to the right in part (b) of FIG. 4 is a differential image $PD_t$. This threshold value p may be preset, or may be varied according to a control command issued according to the results detected by the lens state assessment unit 38 of the controller 39 as described hereafter.

Returning to FIG. 3, the three-dimensional object detection unit 33 detects a three-dimensional object based on the data for the differential image $PD_t$ shown in part (b) of FIG. 4. At this time, the three-dimensional object detection unit 33 of the present example also calculates the travel distance of the three-dimensional object in real space. To detect a three-dimensional object and calculate the travel distance thereof, the three-dimensional object detection unit 33 first generates a differential waveform. The travel distance per unit of time of the three-dimensional object is used to calculate the traveling speed of the three-dimensional object. The traveling speed of the three-dimensional object can then be used to determine whether or not the three-dimensional object is a vehicle.

To form the differential waveform, the three-dimensional object detection unit 33 of the present embodiment sets a detection area in the differential image $PD_t$. The three-dimensional object detection device 1 of the present example detects other vehicles requiring the attention of the driver of the host vehicle V, particularly other vehicles traveling in lanes adjacent to the lane in which the host vehicle V is traveling and with which there is a possibility of contact should the host vehicle V change lanes, as detection targets. Thus, in the present example, in which three-dimensional objects are detected based on image information, two detection areas to the right and left sides of the host vehicle V are set in the images obtained by the camera 10. Specifically, in the present embodiment, rectangular detection areas A1, A2 are set on right and left sides to the rear of the host vehicle V, as shown in FIG. 2. Another vehicle detected in the detection areas A1, A2 is detected as an obstacle traveling in an adjacent lane next to the lane in which the host vehicle V is traveling. These detection areas A1, A2 may be set based on relative position with respect to the host vehicle V, or with reference to the positions of the white lines. If the detection areas are set using the positions of the white lines as reference, a three-dimensional object detection device 1 may use, e.g., a known road line recognition technology or the like may be used.

The three-dimensional object detection unit 33 recognizes the borders of the set detection areas A1, A2 by the host vehicle V (the borders following the direction of travel) as ground contact lines L1, L2 (FIG. 2). Generally, a "ground contact line" refers to a line at which a three-dimensional object contacts the ground, but in the present embodiment the ground contact lines are not lines of contact with the ground but are rather set as described above. That said, experience has shown that this is not a problem in practice, as there not an excessive difference between the "ground contact lines" according to the present embodiment and the ground contact lines that would normally be assessed based on the position of the other vehicle VX.

Figure 5:
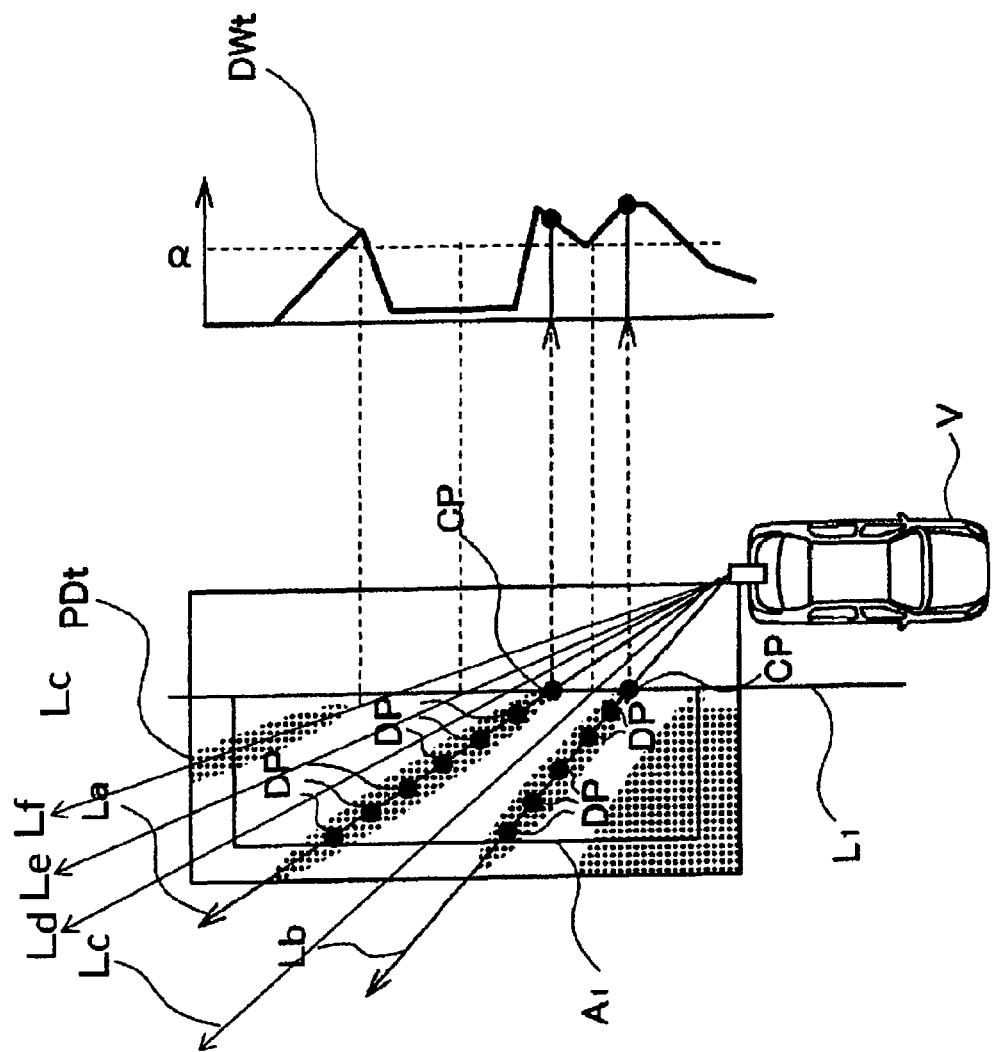
FIG. 5 is a schematic illustration of the manner in which a differential waveform is formed by a three-dimensional object detection unit in FIG. 3.

FIG. 5 is a schematic illustration of the manner in which a differential waveform is formed by the three-dimensional object detection unit 33 shown in FIG. 5. As shown in FIG. 5, the three-dimensional object detection unit 33 generates a differential waveform $DW_t$ based on those parts of the differential image $PD_t$ (right image in part (b) of FIG. 4) calculated by the alignment unit 32 that correspond to the detection areas A1, A2. During this process, the three-dimensional object detection unit 33 forms the differential waveform $DW_t$ along the direction in which the three-dimensional object was collapsed as a result of viewpoint conversion. In the example shown in FIG. 5, only detection area A1 is shown for convenience, but a differential waveform $DW_t$ is also formed for the detection area A2 according to a similar procedure.

Specifically, the three-dimensional object detection unit 33 defines a line La in the collapsing direction of the three-dimensional object in the data for the differential image $PD_t$. The three-dimensional object detection unit 33 then counts the number of difference pixels DP indicating a predetermined difference on the line La. The difference pixels DP indicating a predetermined difference are pixels exceeding a predetermined threshold value if the pixel values of the differential image $PD_t$ are the absolute values of the differences in pixel values between the bird's-eye view images $PB_t$, $PB_{t-1}$, and are pixels indicating "1" if the pixel values of the differential image $PD_t$ are represented by "0" and "1".

After counting the number of difference pixels DP, the three-dimensional object detection unit 33 finds an intersection CP between the line La and a ground contact line L1. The three-dimensional object detection unit 33 then associates the intersection CP and the count number, assesses a horizontal axis position, i.e., a position on the axis running in the up-and-down direction to the right in FIG. 5, based on the position of the intersection CP, assesses a vertical axis position, i.e., a position on the axis running in the left-to-right direction to the right in FIG. 5, based on the count number, and plots the positions as count numbers at the intersection CP.

Subsequently, the three-dimensional object detection unit 33 similarly defines lines Lb, Lc . . . in the collapsing direction of the three-dimensional object, counts the number of difference pixels DP, assesses the horizontal axis positions based on the positions of the intersections CP, assesses the vertical axis positions based on the count numbers (number of difference pixels DP), and plots the positions. The three-dimensional object detection unit 33 sequentially repeats the process described above to create a frequency distribution, thereby generating a differential waveform $DW_t$ as shown to the right in FIG. 5.

As shown to the left in FIG. 5, the line La and line Lb running in the collapsing direction of the three-dimensional object differ in terms of the amount of overlap with the detection area A1. For this reason, if the detection area A1 is filled with difference pixels DP, there will be more difference pixels DP on the line La than on the line Lb. Thus, if the vertical axis position is assessed based on the counted number of difference pixels DP, the three-dimensional object detection unit 33 performs normalization based on the amount of overlap between the detection area A1 and the lines La, Lb running in the collapsing direction of the three-dimensional object. In a specific example, there are six difference pixels DP on line La on the left in FIG. 5 and five difference pixels DP on line Lb. Therefore, to determine the vertical axis position based on the count number in FIG. 5, the three-dimensional object detection unit 33 performs normalization by, e.g., dividing the count number by the overlap distance. As a result, the values on the differential waveform $DW_t$ corresponding to lines La, Lb in the collapsing direction of the three-dimensional object are substantially identical, as shown by the differential waveform DWt.

After the differential waveform $DW_t$ has been generated, the three-dimensional object detection unit 33 calculates the travel distance by performing a comparison with the differential waveform $DW_{t-1}$ from one moment before. Specifically, the three-dimensional object detection unit 33 calculates the travel distance based on change over times between the differential waveforms $DW_t$, $DW_{t-1}$.

Figure 6:
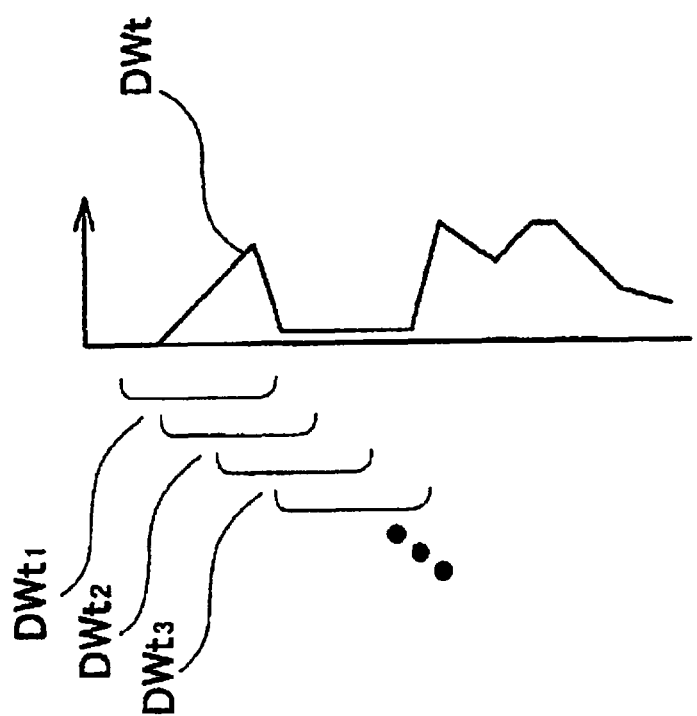
FIG. 6 is a view illustrating small areas divided up by the three-dimensional object detection unit in FIG. 3.

Specifically, the three-dimensional object detection unit 33 divides the differential waveform $DW_t$ into a plurality of small areas $DW_{t1}$-$DW_{tn}$ (n being any integer equal to 2 or higher), as shown in FIG. 6. FIG. 6 is an illustration of small areas $DW_{t1}$-$DW_{tn}$ divided up by the three-dimensional object detection unit 33. The small areas $DW_{t1}$-$DW_{tn}$ are divided up so as to overlap each other, as shown, e.g., in FIG. 6. For example, small area $DW_{t1}$ and small area $DW_{t2}$ overlap, and $DW_{t2}$ and $DW_{t3}$ overlap.

Next, the three-dimensional object detection unit 33 assesses an offset amount (amount of movement in the horizontal axis direction of the differential waveform (in the up-and-down direction in FIG. 6)) for each of the small areas $DW_{t1}$-$DW_{tn}$. The offset amounts are assessed based on the difference (i.e., distance in the horizontal axis direction) between the differential waveform $DW_{t-1}$ from one moment before and the differential waveform $DW_t$ at the current time. During this process, the three-dimensional object detection unit 33 assesses the position (i.e., position in the horizontal axis direction) for each of the small areas $DW_{t1}$-$DW_{tn}$ at which the deviation from the differential waveform $DW_t$ at the current time when the differential waveform $DW_{t-1}$ from one moment before is moved in the horizontal axis direction is minimized, and calculates the amount of movement in the horizontal axis direction between the original position of the differential waveform $DW_{t-1}$ and the position at which deviation is minimized as the offset amount. The three-dimensional object detection unit 33 then counts the offset amounts found for each of the small areas $DW_{t1}$-$DW_{tn}$ and creates a histogram.

Figure 7:
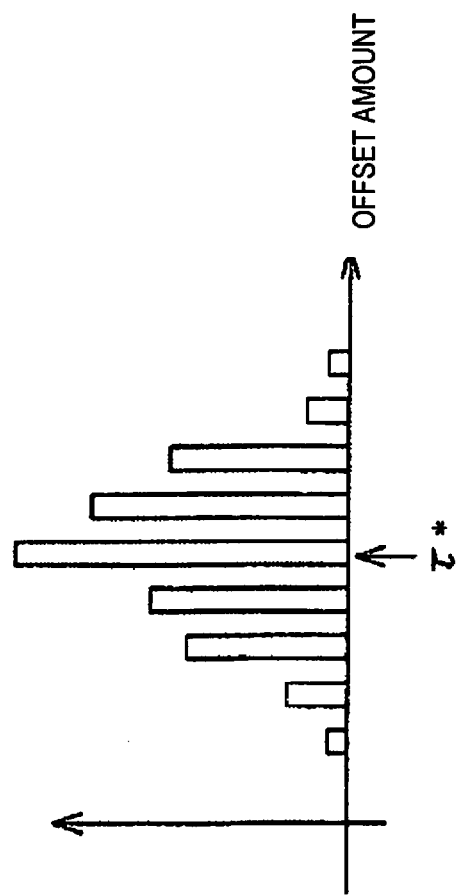
FIG. 7 is a view illustrating an example of a histogram obtained by the three-dimensional object detection unit of FIG. 3.

FIG. 7 is an illustration of an example of a histogram obtained by the three-dimensional object detection unit 33. As shown in FIG. 7, there is a certain degree of variability in the offset amount constituting the amount of movement such that the deviation between the small areas $DW_{t1}$-$DW_{tn}$ and the differential waveform $DW_{t-1}$ from one moment before is minimized. Thus, the three-dimensional object detection unit 33 creates a variability-containing offset amount histogram and calculates travel distance based on the histogram. During this process, the three-dimensional object detection unit 33 calculates the travel distance of the three-dimensional object from the maximum value of the histogram. Specifically, in the example shown in FIG. 7, the three-dimensional object detection unit 33 calculates an offset amount indicating the maximum value of the histogram as the travel distance $\tau^*$. This travel distance $\tau^*$ is the relative travel distance of the other vehicle VX with respect to the host vehicle V. Thus, when calculating absolute travel distance, the three-dimensional object detection unit 33 calculates the absolute travel distance based on the obtained travel distance $\tau^*$ and the signal from the vehicle speed sensor 20.

Figure 8:
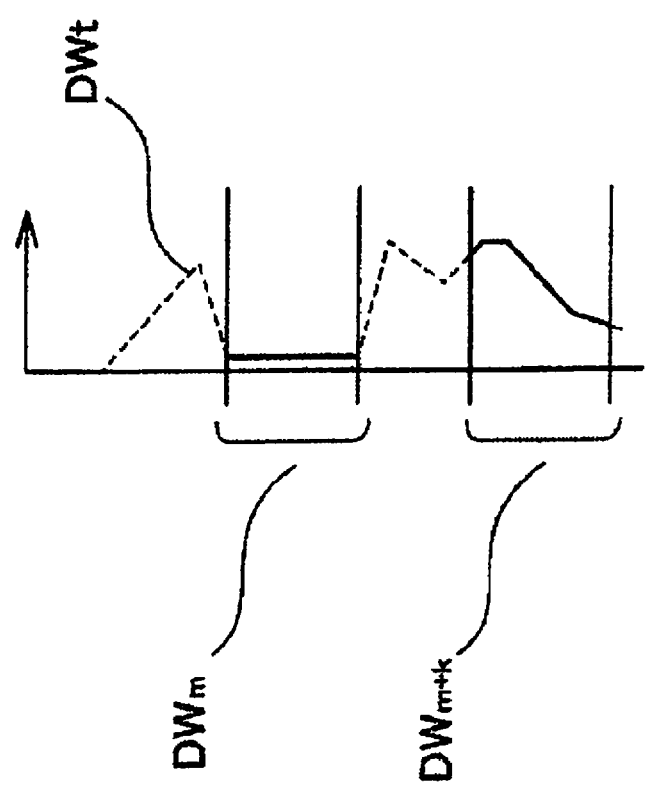
FIG. 8 is a view illustrating weighting performed by the three-dimensional object detection unit of FIG. 3.

When creating a histogram, the three-dimensional object detection unit 33 may apply weighting to each of the plurality of small areas $DW_{t1}$-$DW_{tn}$, and count the offset amounts found for each of the small areas $DW_{t1}$-$DW_{tn}$ according to the weighting to create the histogram. FIG. 8 is an illustration of weighting performed by the three-dimensional object detection unit 33.

As shown in FIG. 8, the small area $DW_m$ (m being an integer at least equal to 1 and no greater than n−1) is flat. Specifically, there is only a small difference between the maximum and minimum pixel counts indicating a predetermined difference in the small area $DW_m$. The three-dimensional object detection unit 33 reduces the weighting for this type of small area $DW_m$. This is because such a flattened small area $DW_m$ lacks characteristics, leading to a high possibility of calculation error.

The small area $DW_{m+k}$ (k being an integer no greater than n−m) has pronounced raised and lowered sections. Specifically, there is a large difference between the maximum and minimum pixel counts indicating a predetermined difference in the small area $DW_m$. The three-dimensional object detection unit 33 increases the weighting for this type of small area $DW_m$. This is because a markedly contoured small area $DW_{m+k}$ has characteristic features, leading to a high possibility of being able to accurately calculate the offset amount. Such weighting allows for improved precision in calculating travel distance.

In the embodiment described above, the differential waveform $DW_t$ is divided into a plurality of small areas $DW_{t1}$-$DW_{tn}$ in order to improve the precision of travel distance calculation, division into small areas $DW_{t1}$-$DW_{tn}$ may be omitted if there is no great need for precision in calculating travel distance. In such cases, the three-dimensional object detection unit 33 calculates travel distance from the offset amount for the differential waveform $DW_t$ that minimizes deviation between the differential waveform $DW_t$ and the differential waveform $DW_{t-1}$. In other words, the method used to determine the offset amount between the differential waveform $DW_{t-1}$ from one moment before and the differential waveform $DW_t$ at the current time is not limited to that described above.

Returning to FIG. 3, the computer 30 is provided with a smear detection unit 40. The smear detection unit 40 detects areas of smear occurrence using the data for the image captured by the camera 10. Because smearing is a phenomenon of white streaks that occurs in CCD image sensors and the like, the smear detection unit 40 may be omitted if a camera 10 using a CMOS image sensor or the like, which is not subject to smearing, is used.

Figure 9:
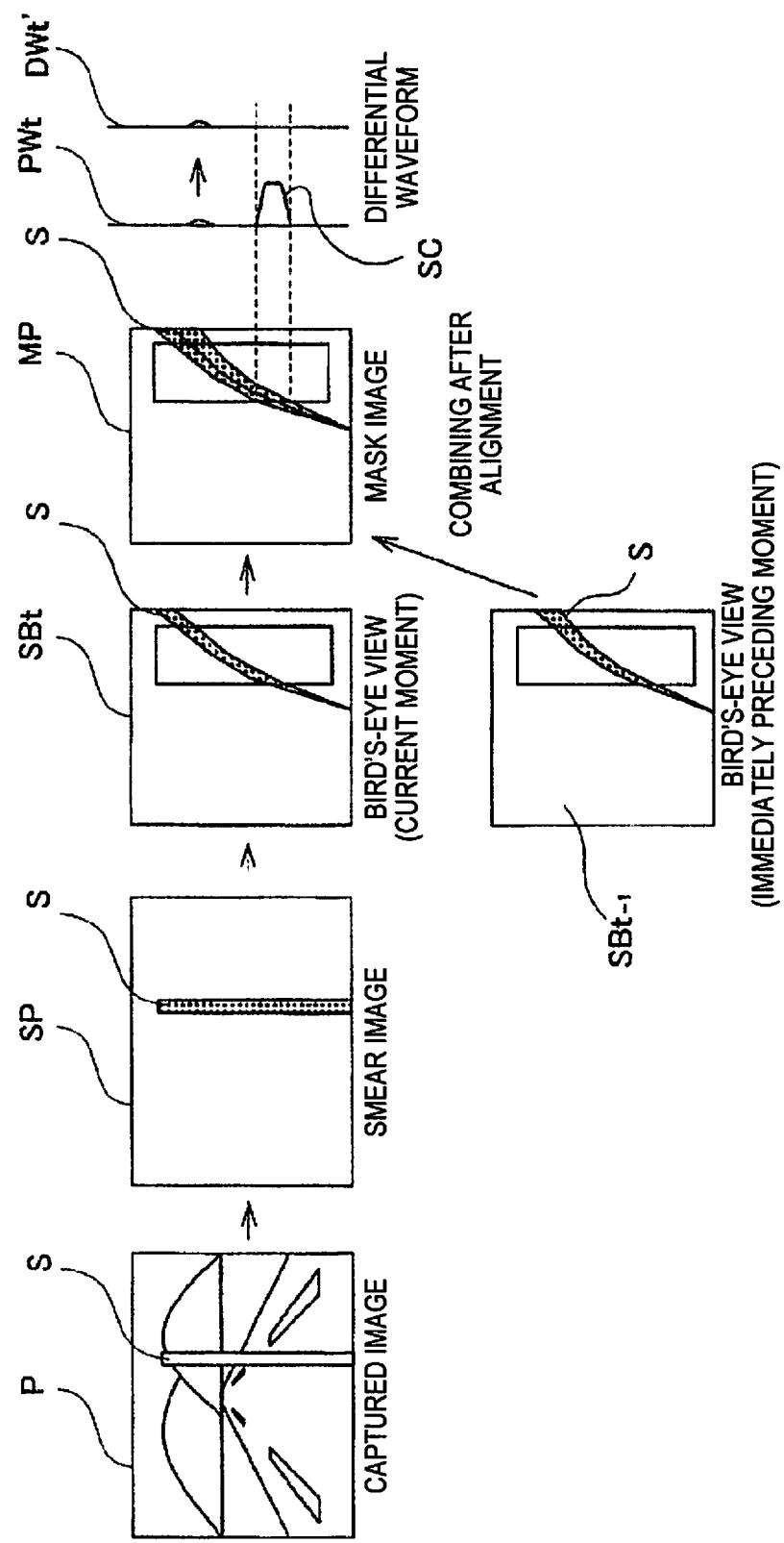
FIG. 9 is a view illustrating a process performed by a smear detection unit in FIG. 3 and a process of calculating a differential waveform thereby.

FIG. 9 is an image illustrating a process performed by the smear detection unit 40 and a process of calculating a differential waveform $DW_t$ thereby. First, let us assume that data for a captured image P in which a smear S is present is inputted to the smear detection unit 40. The smear detection unit 40 detects the smear S in the captured image P. There are various methods for detecting the smear S; if, for example, a typical charge-coupled device (CCD) camera is used, a smear S appears only in a part of the image lower than the light source. For this reason, an area having a luminance value of a predetermined value or greater and continuing upwards in the vertical direction from the lower part of the image toward the upper part of the image is detected and identified as an area of smear S occurrence in the present embodiment.

The smear detection unit 40 generates smear image SP data in which the pixel values are set to "1" at locations where the smear S occurs, and to "0" elsewhere. After generating the data for the smear image SP, the smear detection unit 40 transmits the data to the viewpoint conversion unit 31. After the smear image SP data has been inputted, the viewpoint conversion unit 31 performs viewpoint conversion converting the data to a bird's-eye view. The viewpoint conversion unit 31 thus generates data for a smear bird's-eye view image $SB_t$. After forming the data for the smear bird's-eye view image $SB_t$, the viewpoint conversion unit 31 sends the data to an alignment unit 33. The viewpoint conversion unit 31 also sends data for a smear bird's-eye view image $SB_{t-1}$ from one moment before to the alignment unit 33.

The alignment unit 32 aligns the smear bird's-eye view images $SB_t$, $SB_{t-1}$ in the data. The specific alignment process is performed in a manner similar to the alignment of the bird's-eye view images $PB_t$, $PB_{t-1}$ in the data. After alignment, the alignment unit 32 finds the logical sum of the areas in which the smear S occurs in the smear bird's-eye view images $SB_t$, $SB_{t-1}$. The alignment unit 32 then uses this to generate data for a mask image MP. After generating the data for the mask image MP, the alignment unit 32 transmits the data to the three-dimensional object detection unit 33.

The three-dimensional object detection unit 33 sets the count for the frequency distribution to zero at locations corresponding to areas of smear S occurrence in the mask image MP. Specifically, if a differential waveform $DW_t$ such as that shown in FIG. 9 has been generated, the three-dimensional object detection unit 33 sets the count SC for the smear S to zero, and generates a corrected differential waveform $DW_t'$.

In the present embodiment, the three-dimensional object detection unit 33 assesses the traveling speed of the vehicle V (camera 10), and assesses an offset amount for a stationary object based on the assessed traveling speed. After assessing an offset amount for the stationary object, the three-dimensional object detection unit 33 disregards the offset amount corresponding to the stationary object out of the maximum values of the histogram, and calculates the travel distance of the three-dimensional object.

Figure 10:
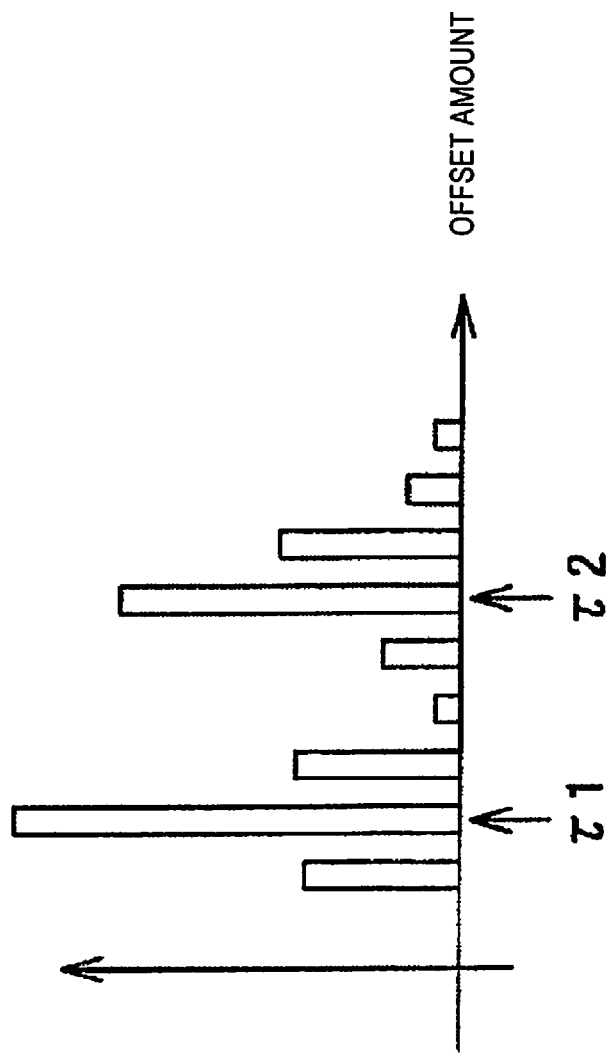
FIG. 10 is a view illustrating another example of a histogram obtained by the three-dimensional object detection unit of FIG. 3.

FIG. 10 is an illustration of another example of a histogram obtained by the three-dimensional object detection unit 33. If another stationary object apart from the other vehicle VX is present within the view angle of the camera 10, two maximum values τ1, τ2 appear in the obtained histogram. In this case, one of the two maximum values τ1, τ2 is an offset amount for the stationary object. The three-dimensional object detection unit 33 therefore assesses an offset amount for the stationary object based on the traveling speed, ignores the maximum value corresponding to the offset amount, and calculates the travel distance for the three-dimensional object using the remaining maximum value.

Even if offset amounts corresponding to stationary objects are ignored, if there are multiple maximum values, there may be multiple other vehicles VX in the view angle of the camera 10. However, it is extremely rare for multiple other vehicles VX to be present in the detection areas A1, A2. The three-dimensional object detection unit 33 therefore cancels travel distance calculation.

Figure 11:
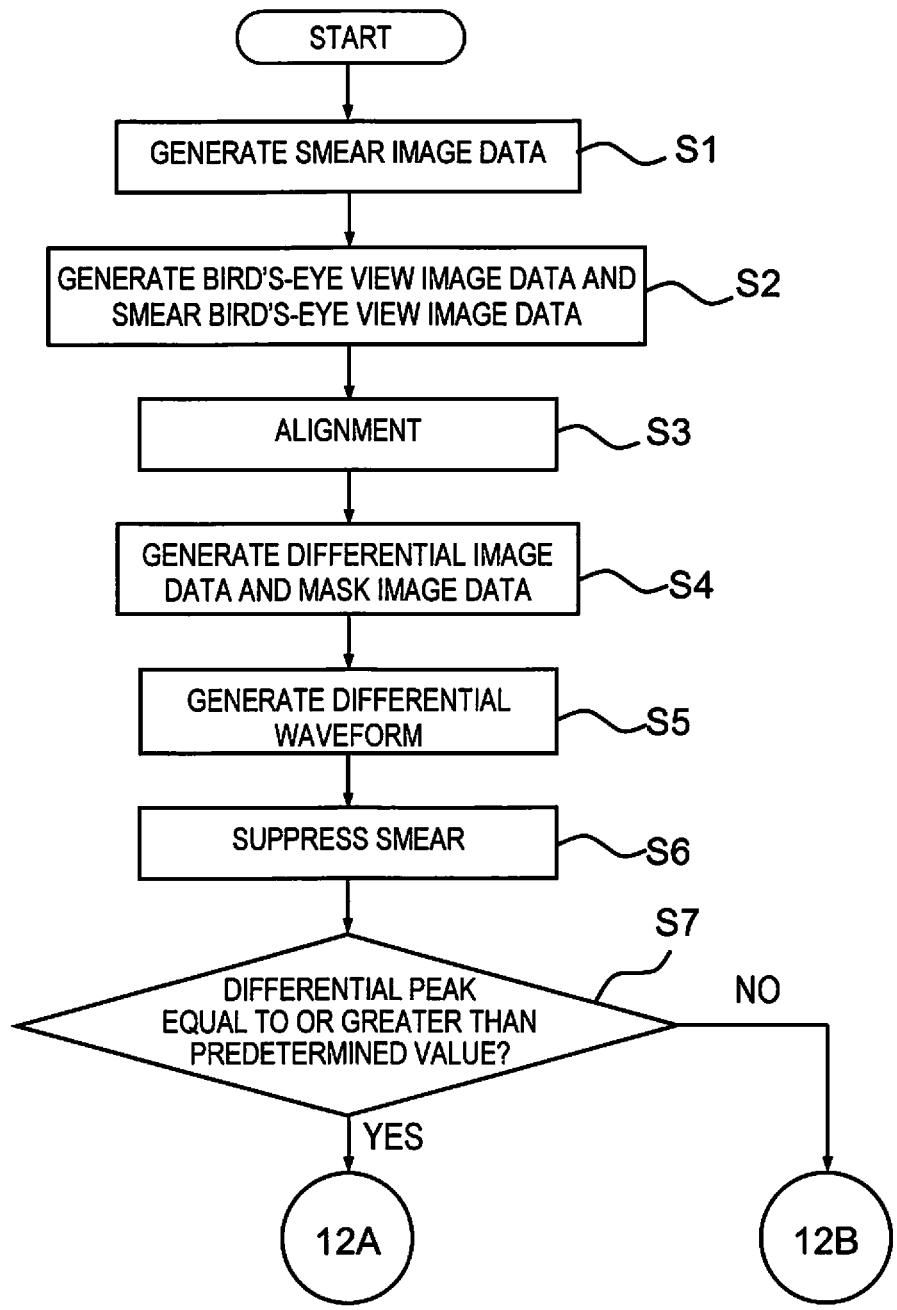
FIG. 11 is a first part of a flowchart illustrating a three-dimensional object detection method using differential waveform information as executed by the viewpoint conversion unit, alignment unit, smear detection unit, and three-dimensional object detection unit of FIG. 3.
Figure 12:
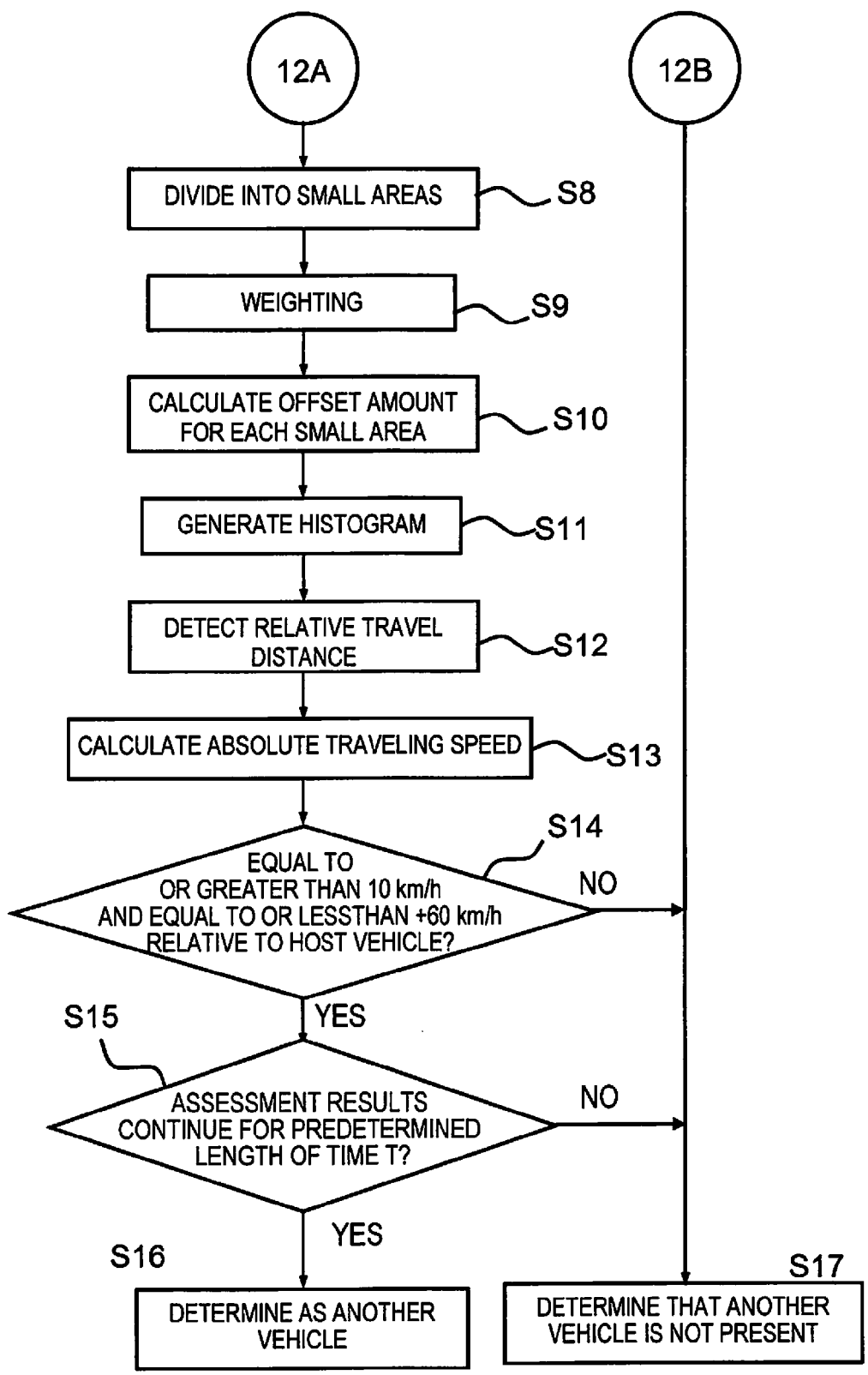
FIG. 12 is a second part of a flowchart illustrating a three-dimensional object detection method using differential waveform information as executed by the viewpoint conversion unit, alignment unit, smear detection unit, and three-dimensional object detection unit of FIG. 3.

Next, a three-dimensional object detection procedure based on differential waveform information will be described. FIG. 11 and FIG. 12 depict a flowchart of a three-dimensional object detection procedure according to the present embodiment. As shown in FIG. 11, the data for the captured image P captured by the camera 10 is first inputted into the computer 30, and the smear detection unit 40 generates a smear image SP (S1). Next, the viewpoint conversion unit 31 generates data for a bird's-eye view image $PB_t$ from the data for the captured image P captured by the camera 10, and data for a smear bird's-eye view image $SB_t$ is generated from the data for the smear image SP (S2).

The alignment unit 33 then aligns the data for the bird's-eye view image $PB_t$ and the data for a bird's-eye view image $PB_{t-1}$ from one moment before, and aligns the data for the smear bird's-eye view image $SB_t$ and the data for the smear bird's-eye view image $SB_{t-1}$ from one moment before (S3). After this alignment has been performed, the alignment unit 33 generates data for the differential image $PD_t$ and data for the mask image MP (S4). The three-dimensional object detection unit 33 then generates a differential waveform $DW_t$ from the data for the differential image $PD_t$ and the data for a differential image $PD_{t-1}$ from one moment before (S5). After generating the differential waveform $DW_t$, the three-dimensional object detection unit 33 sets the count for the parts of the differential waveform $DW_t$ corresponding to areas of smear S occurrence to zero, minimizing the effects of the smear S (S6).

The three-dimensional object detection unit 33 then assesses whether the peak of the differential waveform $DW_t$ is equal to or greater than a first threshold value α (S7). The first threshold value α is preset, and can be altered by a control command from the controller 39 shown in FIG. 3; the details of this process will be described hereafter. If the peak of the differential waveform $DW_t$ is not equal to or greater than the first threshold value α, i.e., if there is almost no difference, there is considered to be no three-dimensional object present in the captured image P. Therefore, if it is assessed that the peak of the differential waveform $DW_t$ is not equal to or greater than the first threshold value α (S7: NO), the three-dimensional object detection unit 33 assesses that there is no three-dimensional object or other vehicle constituting an obstacle present (FIG. 12: S16). The process shown in FIGS. 11 and 12 then ends.

Meanwhile, if it is assessed that the peak of the differential waveform $DW_t$ is equal to or greater than the first threshold value α (S7: YES), the three-dimensional object detection unit 33 assesses that a three-dimensional object is present, and divides the differential waveform $DW_t$ into a plurality of small areas $DW_{t1}$-$DW_{tn}$ (S8). Next, the three-dimensional object detection unit 33 assigns weighting to each of the small areas $DW_{t1}$-$DW_{tn}$ (S9). The three-dimensional object detection unit 33 then calculates an offset amount for each of the small areas $DW_{t1}$-$DW_{tn}$ (S10), and generates a weighted histogram (S11).

The three-dimensional object detection unit 33 then calculates a relative travel distance constituting the travel distance of the three-dimensional object with respect to the host vehicle V based on the histogram (S12). Next, the three-dimensional object detection unit 33 calculates the absolute traveling speed of the three-dimensional object based on the relative travel distance (S13). At this time, the three-dimensional object detection unit 33 calculates the relative traveling speed by time-differentiating the relative travel distance, and adds the host vehicle speed calculated by the vehicle speed sensor 20 to calculate the absolute traveling speed.

The three-dimensional object detection unit 33 then assesses whether the absolute traveling speed of the three-dimensional object is 10 km/h or greater, and whether the relative traveling speed of the three-dimensional object with respect to the host vehicle V is +60 km/h or less (S14). If both conditions are satisfied (S14: YES), the three-dimensional object detection unit 33 assesses that the three-dimensional object is another vehicle VX (S15). The process shown in FIGS. 11 and 12 then ends. When either condition is not satisfied (S14: NO), the three-dimensional object detection unit 33 assesses that no other vehicle is present (S16). The process shown in FIGS. 11 and 12 then ends.

In the present embodiment, detection areas A1, A2 are set for the host vehicle V, and emphasis is placed on detecting other vehicles VX traveling in lanes adjacent to the lane in which the host vehicle V is traveling that call for attention while the host vehicle V is traveling, and, in particular, on whether there is a possibility of contact therewith when the host vehicle V changes lanes. This is in order to determine whether there is a possibility of contact with another vehicle VX traveling in an adjacent lane next to the lane in which the host vehicle V is traveling when the host vehicle changes lanes. The process in S14 is executed for this reason. Specifically, assuming that the system of the present embodiment is being operated on a highway, if the speed of a three-dimensional object is less than 10 km/h, it is rarely a problem even if another vehicle VX is present, as it will be positioned far behind the host vehicle V when the latter changes lanes. Similarly, if the relative traveling speed of the three-dimensional object with respect to the host vehicle V exceeds +60 km/h (i.e., if the three-dimensional object is moving at a speed more than 60 km/h greater than that of the host vehicle V), there is rarely a problem, as the object will be in motion in front of the host vehicle V when the latter changes lanes. Therefore, S14 can also be considered to be a process of assessing whether the other vehicle VX will present a problem when changing lanes.

The assessment in step S14 of whether the absolute traveling speed of the three-dimensional object is 10 km/h or higher and the relative traveling speed of the three-dimensional object with respect to the host vehicle V is +60 km/h or less yields the following effects. For example, it is possible that an error in attaching the camera 10 could cause a stationary object to be detected as having an absolute traveling speed of several km/h. Thus, assessing whether the speed is 10 km/h or more makes it possible to reduce the risk of a stationary object being considered to be another vehicle VX. There is also a risk of the relative speed of the three-dimensional object with respect to the host vehicle V being detected as exceeding +60 km/h depending on the level of noise. Thus, assessing whether the relative speed is +60 km/h or less allows the possibility of noise-induced misdetection to be reduced.

In step S14, the relative traveling speed threshold values used to identify other vehicles VX can be set as desired. For example, the relative traveling speed threshold values can be set to −20 km/h or more and 100 km/h or less. The negative minimum value is the minimum value for the traveling speed when a detected object is moving to the rear of the host vehicle, i.e., when the detected object is being left behind by the vehicle. These threshold values can be preset as desired, but can be altered according to a control command from the controller 39 as described hereafter.

It is also possible to confirm that the absolute traveling speed is not negative or is not 0 km/h instead of performing the process of step S14. Because the present embodiment focuses on whether there is a possibility of contact when the host vehicle V changes lanes, it is also acceptable for a warning sound to be issued to the driver of the host vehicle or for a predetermined display device to display the equivalent of a warning if another vehicle VX is detected in step S15.

In step S15, it is assessed whether the three-dimensional object detected by the three-dimensional object detection unit 33 is continuously detected for a predetermined length of time T or longer. If the three-dimensional object is continuously detected for the predetermined length of time T or longer, the process continues to step S16, and the three-dimensional object is identified as being another vehicle present in the right-side detection area A1 or the left-side detection area A2. Otherwise, the process continues to step S17, and the judgment that no other vehicle is present is made.

Using the process of detecting three-dimensional objects based on differential waveform information as in the present example; a differential waveform $DW_t$ is generated by counting the number of pixels exhibiting a predetermined difference along the direction in which the three-dimensional object has collapsed as the result of viewpoint conversion in the data for the differential image $PD_t$ and creating a frequency distribution thereof. In this context, "pixels exhibiting a predetermined difference in the data for the differential image $PD_t$," are pixels exhibiting differences in images captured at different points in time, and, in other words, can be considered to indicate locations at which a three-dimensional object was present. For this reason, the number of pixels in the collapsing direction of the three-dimensional object at the location where the three-dimensional object was present are counted and a frequency distribution thereof is created, thereby generating a differential waveform $DW_t$. In particular, because the number of pixels in the collapsing direction of the three-dimensional object is counted, height-directional information for the three-dimensional object is used to generate the differential waveform $DW_t$. The travel distance of the three-dimensional object is then calculated based on the change over time in the differential waveform $DW_t$ that contains height-directional information. Because height-directional information for a detected location before and after a change over time is included in the identification process, instead of the focus being on movement at only one point, the location tends to be the same location on the three-dimensional object, and travel distance is calculated based on the change over time in the same location, allowing for increased precision in travel distance calculation.

The count for the frequency distribution is set to zero at locations corresponding to areas of smear S occurrence in the differential waveform $DW_t$. As a result, waveform locations in the differential waveform $DW_t$ generated by the smear S are removed, preventing the smear S from being mistakenly recognized as a three-dimensional object.

In addition, the travel distance of the three-dimensional object is calculated based on the offset amount for the differential waveform $DW_t$ at which the error of the differential waveform $DW_t$ is minimized. Thus, travel distance is calculated based on an offset amount for one-dimensional information in the form of a waveform, allowing computing costs per calculation of travel distance to be minimized.

In addition, differential waveforms $DW_t$ formed at different points in time are divided into a plurality of small areas $DW_{t1}$-$DW_{tn}$. Dividing into a plurality of small areas $DW_{t1}$-$DW_{tn}$ in this way yields a plurality of waveforms representing various locations on the three-dimensional object. An offset amount such that waveform error is minimized is assessed for each of the small areas $DW_{t1}$-$DW_{tn}$ and the offset amounts assessed for each of the small areas $DW_{t1}$-$DW_{tn}$ are counted and a histogram thereof is created to calculate the travel distance of the three-dimensional object. Thus, offset amounts are assessed for various locations on the three-dimensional object, and the travel distance is calculated based on the plurality of offset amounts, thus allowing for increased precision in calculating travel distance.

In addition, weighting is applied to the plurality of small areas $DW_{t1}$-$DW_{tn}$, and the offset amounts found for each of the small areas $DW_{t1}$-$DW_{tn}$ are counted according to the weighting to create the histogram. The weighting is thus increased for areas exhibiting noticeable characteristics and reduced for areas not exhibiting noticeable characteristics, thereby allowing for better travel distance calculation. As a result, travel distance calculation precision can be increased even further.

The greater the difference is between the minimum and maximum values for the number of pixels exhibiting a predetermined difference in the small areas $DW_{t1}$-$DW_{tn}$ of the differential waveform $DW_t$, the greater the weighting is. Thus, weighting increases the more the area exhibits characteristic contours and the larger the difference between the maximum and minimum values is, and decreases the flatter the area is. Because it is easier to accurately calculate the offset amount for markedly contoured areas that for flattened areas, increasing the weighting in accordance with an increase in the difference between the maximum and minimum values allows for even further improvements in travel distance calculation precision.

The travel distance of the three-dimensional object is calculated based on the maximum value of the histogram obtained by counting the offset amounts assessed for each of the small areas $DW_{t1}$-$DW_{tn}$. Thus, a more accurate travel distance can be calculated from the maximum value, even if there are variations in the offset amounts.

Offset amounts are also assessed for stationary objects, and these offset amounts are disregarded, preventing stationary-object-induced reductions in precision in calculating the travel distance of the three-dimensional object. If, disregarding offset amounts corresponding to stationary objects, there are multiple maximum values, calculation of the travel distance of the three-dimensional object is canceled. This allows for the prevention of miscalculations in travel distance, such as when there are multiple maximum values.

In the embodiment described above, the speed of the host vehicle V is assessed based on the signal from the vehicle speed sensor 20, but the present invention is not limited to such an arrangement; for example, speed can be estimated using a plurality of images captured at different points in time. A vehicle speed sensor is unnecessary in such an arrangement, allowing for a simpler configuration.

In the embodiment described above, a current image and an image from one moment before are converted to bird's-eye view images, a differential image $PD_t$ is generated after the converted bird's-eye view images have been aligned, and the generated differential image $PD_t$ is evaluated along a collapsing direction (i.e., the direction in which the three-dimensional object collapses when the image is converted to a bird's-eye view image) to generate a differential waveform $DW_t$, but the present invention is not limited to such a configuration. For example, it is also acceptable to convert only the image from one moment before to a bird's-eye view image, align the converted bird's-eye view image, subsequently convert the image to one equivalent to the originally captured image, use this image and a current image to generate a differential image, and evaluate the differential image along a direction equivalent to the collapsing direction (i.e., a direction obtained by converting the collapsing direction to a direction in the captured image) to generate a differential waveform $DW_t$. In other words, as long as the current image and the image from one moment before are aligned, a differential image $PD_t$ is formed based on the difference between the two aligned images, and the differential image $PD_t$ can be evaluated in the collapsing direction of the three-dimensional object after being converted to a bird's-eye view image, it is not necessary to form a clear bird's-eye view image.

Three-Dimensional Object Detection Based on Edge Information

Figure 13:
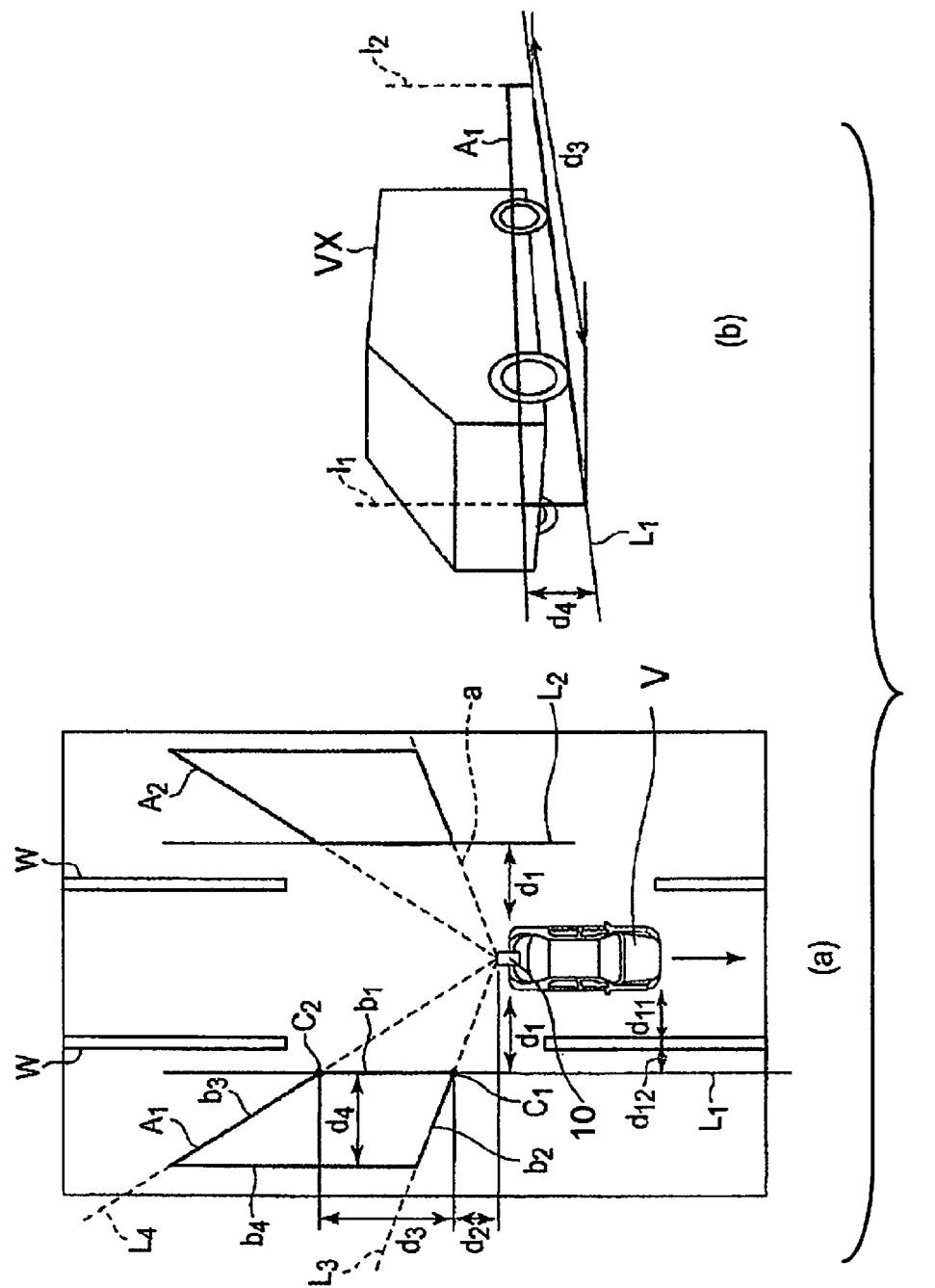
FIG. 13 is a view illustrating the traveling state of the vehicle shown in FIG. 1 (three-dimensional object detection based on edge information), with part (a) illustrating a plan view of the relative positions of detection areas and the like, and part (b) illustrating a perspective view of the relative positions of detection areas and the like in real space.

Next, a three-dimensional object detection block B that can be operated instead of the three-dimensional object detection block A shown in FIG. 3 will be described. The three-dimensional object detection block B detects three-dimensional object using edge information compiled using the luminance difference calculation unit 35, the edge line detection unit 36, and the three-dimensional object detection unit 37. FIG. 13 is an illustration of the imaging range of the camera 10 shown in FIG. 3, with part (a) being a plan view, and part (b) being a perspective view of real space to the rear of the host vehicle V. As shown in part (a) of FIG. 13, the camera 10 has a predetermined view angle α, and photographs the area to the rear of the host vehicle V encompassed within the predetermined view angle α. The view angle α of the camera 10 is set so that the imaging range of the camera 10 includes adjacent lanes as well as the lane in which the host vehicle V is traveling, as in the case shown in FIG. 2.

In the present example, the detection areas A1, A2 have trapezoidal shapes as seen in plan view (i.e., bird's-eye view), and the positions, sizes, and shapes of the detection areas A1, A2 are assessed based on distances d1-d4. In the example illustrated in the drawing, the detection areas A1, A2 are not limited to having trapezoidal shapes, and may have rectangular shapes as seen in bird's-eye view, as shown in FIG. 2.

Distance d1 is the distance from the host vehicle V to ground contact lines L1, L2. The ground contact lines L1, L2 are lines at which a three-dimensional object present in a lane adjacent to the lane in which the host vehicle V is traveling contacts the ground. The object of the present embodiment is to detect other vehicles VX (including two-wheeled vehicles) traveling in adjacent lanes to the left and right of the lane of the host vehicle V to the rear of the host vehicle V. Thus, the distance d1 constituting the positions of the ground contact lines L1, L2 of the other vehicles VX can be substantially fixed based on the distance d11 from the host vehicle V to a white line W and the distance d12 from the white line W to a position where another vehicle VX is predicted to be traveling.

The distance d1 need not be fixed, but may also be variable. In such a case, the computer 30 recognizes the position of a white line W with respect to the host vehicle V using road line recognition or the like, and assesses the distance d11 based on the position of the recognized white line W. The distance d1 is thus variably set using the assessed distance d11. In the present embodiment described hereafter, the position at which the other vehicle VX travels (i.e., the distance d12 from the white line W) and the position at which the host vehicle V travels (i.e., the distance d11 from the white line W) are largely fixed; thus, the distance d1 is considered fixed.

Distance d2 is the distance of extension from the rear end of the host vehicle V with respect to the vehicle travel direction. The distance d2 is set so that at least the detection areas A1, A2 fall within the view angle α of the camera 10. In the present embodiment in particular, the distance d2 is set so as to contact the range delineated by the view angle α. Distance d3 indicates the length of the detection areas A1, A2 with respect to the vehicle travel direction. The distance d3 is set based on the three-dimensional object to be detected. In the present embodiment, another vehicle VX or the like is the detection target; thus, the distance d3 is set to a length including the other vehicle VX.

Distance d4 indicates a height set so as to include the tires of another vehicle VX in real space, as shown in part (b) of FIG. 13. The distance d4 in the bird's-eye view image is the length shown in part (a) of FIG. 13. The distance d4 can also be set to a length not including lanes adjacent to the adjacent lanes (i.e., two lanes away) in the bird's-eye view image. This is because, when lanes two lanes away from the lane of the host vehicle V are included, it is impossible to distinguish whether the other vehicle VX is present in an adjacent lane or two lanes away to the left or right from the lane in which the host vehicle V is traveling.

Distance d1-distance d4 are assessed as described above, and these distances are used to determine the positions, sizes, and shapes of the detection areas A1, A2. Specifically, the distance d1 is used to determine the position of upper edges b1 of the trapezoidal detection areas A1, A2. The distance d2 is used to determine starting point positions C1 of the upper edges b1. The distance d3 is used to determine end point positions C2 of the upper edges b1. A straight line L3 extending from the camera 10 toward the starting point positions C1 is used to determine side edges b2 of the trapezoidal detection areas A1, A2. Similarly, a straight line L4 extending from the camera 10 toward the end point positions C2 is used to determine side edges b3 of the trapezoidal detection areas A1, A2. The distance d4 is used to determine lower edges b4 of the trapezoidal detection areas A1, A2. The area surrounded by the edges b1-b4 in this way are the detection areas A1, A2. As shown in part (b) of FIG. 13, the detection areas A1, A2 are squares (rectangles) in real space to the rear of the host vehicle V.

Returning to FIG. 3, captured image data for a predetermined area photographed by the camera 10 is inputted into the viewpoint conversion unit 31. The viewpoint conversion unit 31 performs a viewpoint conversion process on the inputted captured image data that converts the data to bird's-eye view image data showing a bird's-eye view. Here, "bird's-eye view" refers to a view from the viewpoint of, for example, an imaginary camera looking straight down (or somewhat diagonally downward) from above. The viewpoint conversion process can be effected using, for example, the technique disclosed in Japanese Laid-Open Patent Application No. 2008-219063.

In order to detect the edges of a three-dimensional object included in the bird's-eye view image, the luminance difference calculation unit 35 calculates the luminance difference for the bird's-eye view image data obtained via the viewpoint conversion performed by the viewpoint conversion unit 31. The luminance difference calculation unit 35 calculates the luminance difference between two pixels near each of multiple positions along a vertical imaginary line extending in the vertical direction in real space. The luminance difference calculation unit 35 can calculate the luminance difference either by setting a single vertical imaginary line extending in the vertical direction in real space or by setting two vertical imaginary lines extending in the vertical direction in real space.

A specific method of setting two vertical imaginary lines will now be described. The luminance difference calculation unit 35 sets a first vertical imaginary line corresponding to a line segment extending in the vertical direction in real space and a second vertical imaginary line corresponding to a line segment, different from the first vertical imaginary line, that extends vertically in real space for the viewpoint-converted bird's-eye view image. The luminance difference calculation unit 35 assesses the luminance difference between points on the first vertical imaginary line and points on the second vertical imaginary line continuously along the first vertical imaginary line and the second vertical imaginary line. The operation of the luminance difference calculation unit 35 will be described in detail hereafter.

Figure 14:
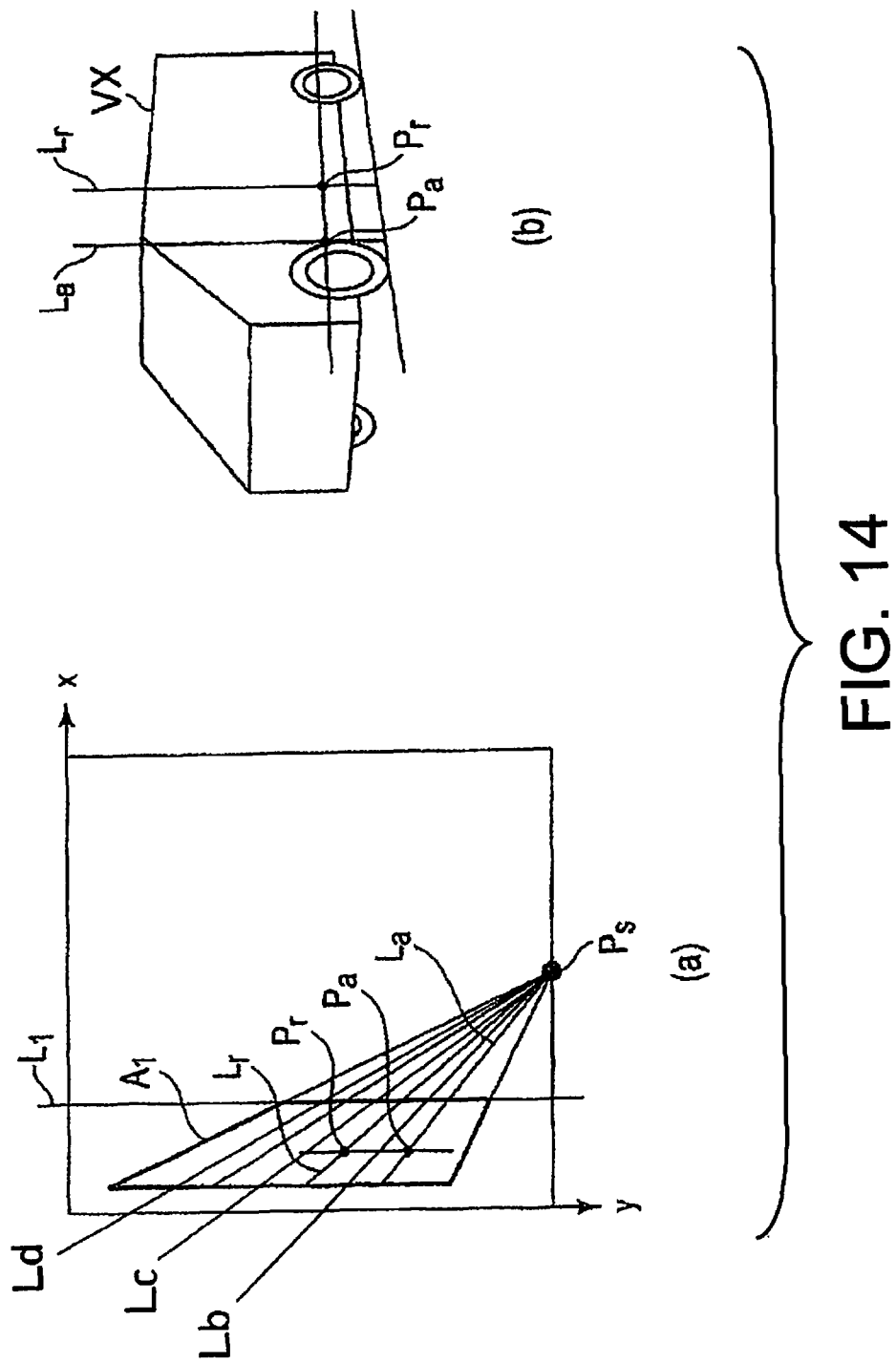
FIG. 14 is a view illustrating operation of a luminance difference calculation unit of FIG. 3, with part (a) illustrating the relative positions of an attention line, a reference line, an attention point, and a reference point in a bird's-eye view image, and part (b) illustrating the relative positions of an attention line, a reference line, an attention point, and a reference point in real space.

As shown in part (a) of FIG. 14, the luminance difference calculation unit 35 sets a first vertical imaginary line La (hereafter, "attention line La") that corresponds to a line segment extending in the vertical direction in real space and passes through the detection area A1. The luminance difference calculation unit 35 also sets a second vertical imaginary line Lr (hereafter, "reference line Lr"), different from the attention line La, that corresponds to a line segment extending in the vertical direction in real space and passes through the detection area A1. The reference line Lr is set at a position separated from the attention line La by a predetermined distance in real space. The lines corresponding to line segments extending in the vertical direction in real space are lines fanning outward from the position Ps of the camera 10 in the bird's-eye view image. These outward fanning lines run in the collapsing direction of the three-dimensional object when converted to a bird's-eye view.

The luminance difference calculation unit 35 sets an attention point Pa (point on the first vertical imaginary line) on the attention line La. The luminance difference calculation unit 35 also sets a reference point Pr (point on the second vertical imaginary line) on the reference line Lr. The attention line La, attention point Pa, reference line Lr, and reference point Pr have the relationship shown in part (b) of FIG. 14 in real space. As is apparent from part (b) of FIG. 14, the attention line La and the reference line Lr extend vertically in real space, and the attention point Pa and the reference point Pr are set at substantially the same height in real space. The attention point Pa and reference point Pr need not be at strictly the same height; a certain amount of deviation is permissible to the extent that the attention point Pa and the reference point Pr can be considered to be at the same height.

The luminance difference calculation unit 35 calculates the luminance difference between the attention point Pa and the reference point Pr. If there is a large luminance difference between the attention point Pa and the reference point Pr, an edge is considered to be present between the attention point Pa and the reference point Pr. Thus, the edge line detection unit 36 shown in FIG. 3 detects edge lines based on the luminance difference between the attention point Pa and the reference point Pr.

Figure 15:
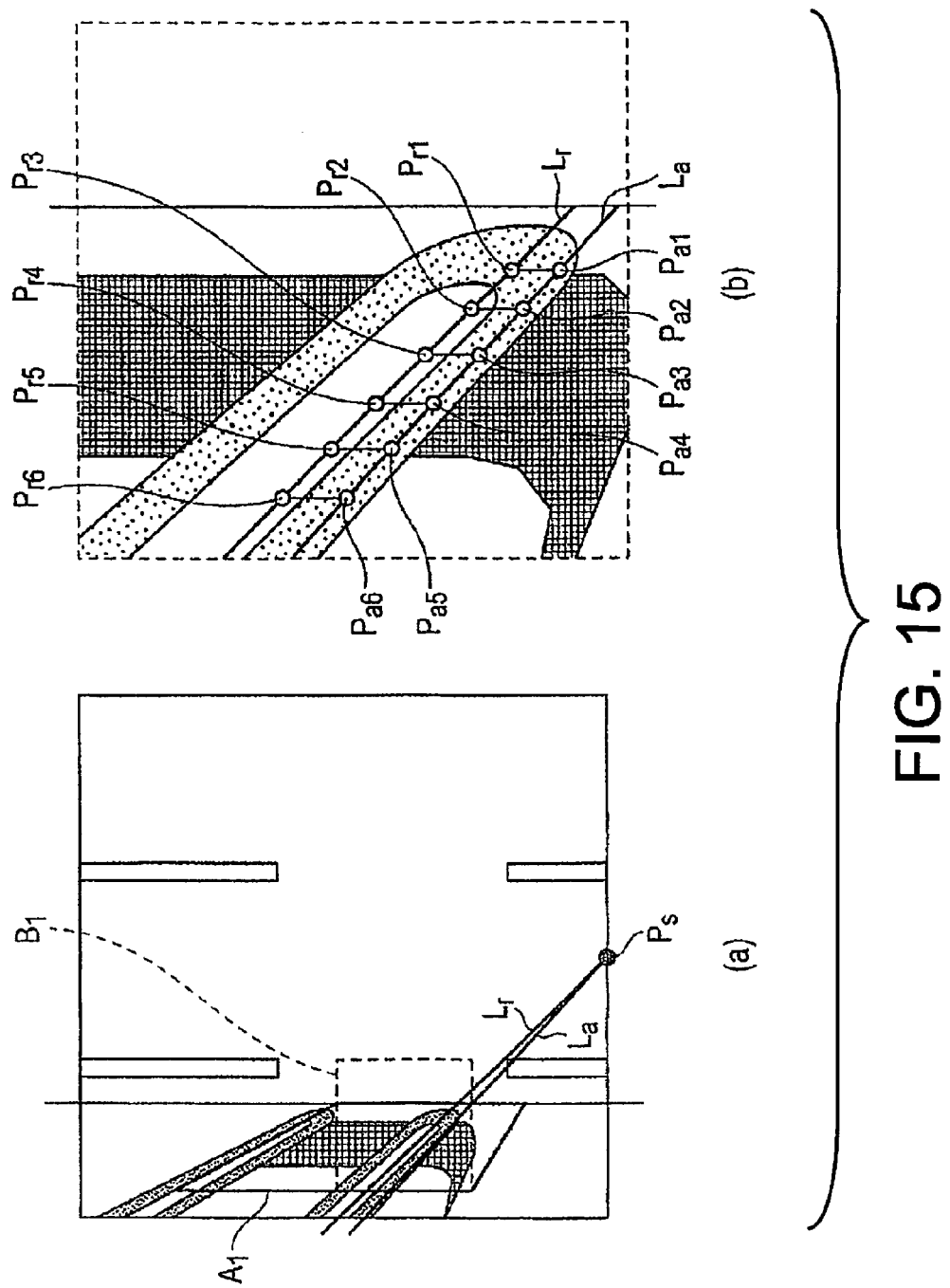
FIG. 15 is a view for describing the detailed operation of the luminance difference calculation unit of FIG. 3, with part (a) illustrating a detection area in a bird's-eye view image, and part (b) illustrating the relative positions of an attention line, a reference line, an attention point, and a reference point in the bird's-eye view image.

This point will now be discussed in detail. FIG. 15 is an illustration of the specific operation of the luminance difference calculation unit 35, wherein part (a) of FIG. 15 is a bird's-eye view image showing a bird's-eye view, and part (b) of FIG. 15 is a magnified view of section B1 in the bird's-eye view image shown in part (a) of FIG. 15. Only detection area A1 is illustrated and described in FIG. 15, but luminance difference is also calculated in the detection area A2 according to a similar procedure.

If another vehicle VX is shown in the captured image captured by the camera 10, the other vehicle VX appears in the detection area A1 in the bird's-eye view image, as shown in part (a) of FIG. 15. Let us assume that the attention line La is set over the rubber part of a tire of the other vehicle VX in the bird's-eye view image, as shown in the magnified view of section B1 from part (a) of FIG. 15 in part (b) of FIG. 15. In this state, the luminance difference calculation unit 35 first sets the reference line Lr. The reference line Lr is set along the vertical direction at a position separated a predetermined distance from the attention line La in real space. Specifically, in the three-dimensional object detection device 1 according to the present embodiment, the reference line Lr is set at a position 10 cm away from the attention line La in real space. As a result, the reference line Lr is set, e.g., on the wheel of the tire of the other vehicles VX 10 cm away from the rubber of the tire of the other vehicle VX in the bird's-eye view image.

Next, the luminance difference calculation unit 35 sets a plurality of attention points Pa1-PaN on the attention line La. In part (b) of FIG. 15, for convenience of illustration, six attention points Pa1-Pa6 are set (hereafter, an arbitrarily selected point will be referred to with "attention point Pai".) Any number of attention points Pa may be set on the attention line La. The following description will assume that N attention points Pa are set on the attention line La.

Next, the luminance difference calculation unit 35 sets reference points Pr1-PrN at the same height in real space as the attention points Pa1-PaN. The luminance difference calculation unit 35 then calculates the luminance difference between attention points Pa and reference points Pr at the same height. In this way, the luminance difference calculation unit 35 calculates the luminance difference between two pixels at a plurality of positions (1-N) along a vertical imaginary line extending in the vertical direction in real space. For example, the luminance difference calculation unit 35 calculates the luminance difference between a first attention point Pa1 and a first reference point Pr1, and the luminance difference between a second attention point Pa2 and a second reference point Pr2. The luminance difference calculation unit 35 continuously calculates luminance differences along the attention line La and the reference line Lr. In other words, the luminance difference calculation unit 35 calculates the luminance differences in order between the third through $N^{th}$ attention points Pa3-PaN and the third through $N^{th}$ reference points Pr3-PrN.

The luminance difference calculation unit 35 repeatedly executes this process of setting a reference line Lr, setting attention points Pa and reference points Pr, and calculating luminance differences while shifting the attention line La within the detection area A1. Specifically, the luminance difference calculation unit 35 repeatedly executes the process described above while shifting the positions of the attention line La and the reference line Lr the same distance in the direction in which the ground contact line L1 extends in real space. For example, the luminance difference calculation unit 35 sets the line that had been the reference line Lr in the previous process to the attention line La, sets a reference line Lr for this attention line La, and calculates the luminance difference.

Returning to FIG. 3, the edge line detection unit 36 detects edge lines based on the continuous luminance difference calculated by the luminance difference calculation unit 35. For example, in the case shown in part (b) of FIG. 15, the first attention point Pa1 and the first reference point Pr1 are positioned at the same part of the tire, and therefore have a low luminance difference. Meanwhile second through sixth attention points Pa2-Pa6 are positioned on the rubber part of the tire, and second through sixth reference points Pr2-Pr6 are positioned on the wheel part of the tire. Thus, there is a greater luminance difference between the second through sixth attention points Pa2-Pa6 and the second through sixth reference points Pr2-Pr6. The edge line detection unit 36 is thus capable of detecting the presence of an edge line between the second through sixth attention points Pa2-Pa6 and the second through sixth reference points Pr2-Pr6, which have a high luminance difference.

Specifically, to detect an edge line, the edge line detection unit 36 first assigns attributes to an $i^{th}$ attention point Pai based on the luminance difference between an $i^{th}$ attention point Pai (coordinates (xi, yi)) and an $i^{th}$ reference point Pri (coordinates (xi', yi')) according to the following Formula 1.

When $I(xi,yi) > I(xi',yi') + t$:

$s(xi,yi) = 1$

When $I(xi,yi) < I(xi',yi') - t$:

$s(xi,yi) = -1$

In other cases:

$s(xi,yi) = 0$      Formula 1

In Formula 1, t indicates a threshold value, I (xi, yi) indicates a luminance value for an $i^{th}$ attention point Pai, and I (xi', yi') indicates a luminance value for an $i^{th}$ reference point Pri. According to Formula 1, if the luminance value for the attention point Pai is greater than a luminance value obtained by adding the threshold value t to the reference point Pri, the attribute s (xi, yi) for the attention point Pai is "1". Meanwhile, if the luminance value for the attention point Pai is less than a luminance value yielded by subtracting the threshold value t from the reference point Pri, the attribute s (xi, yi) for the attention point Pai is "−1". For other relationships between the luminance value of the attention point Pai and the luminance value of the reference point Pri, the attribute s (xi, yi) of the attention point Pai is "0". The threshold value t is preset, and can be altered according to a control command issued by the controller 39 shown in FIG. 3. The details of this process will be described hereafter.

Next, the edge line detection unit 36 assesses whether the attention line La is an edge line based on the continuity c (xi, yi) of the attribute s along the attention line La based on the following Formula 2.

When $s(xi,yi) = s(xi+1,yi+1)$ (except when 0=0):

$c(xi,yi) = 1$

In other cases:

$c(xi,yi) = 0$      Formula 2

If the attribute s (xi, yi) of the attention point Pai and the attribute s (xi+1, yi+1) of the adjacent attention point Pai+1 are identical, the continuity c (xi, yi) is "1". If the attribute s (xi, yi) of the attention point Pai and the attribute s (xi+1, yi+1) of the adjacent attention point Pai+1 are not identical, the continuity c (xi, yi) is "0".

Next, the edge line detection unit 36 finds the sum of continuity c for all the attention points Pa on the attention line La. The edge line detection unit 36 normalizes the continuity c by dividing the calculated total for continuity c by the number N of attention points Pa. If the normalized value exceeds a threshold value θ, the edge line detection unit 36 identifies the attention line La as an edge line. The threshold value θ is predetermined via experimentation. The threshold value θ may be preset, or may be altered according to a control command issued by the controller 39 according to the assessment results from the lens state assessment unit 38, as described hereafter.

Specifically, the edge line detection unit 36 assesses whether the attention line La is an edge line according to the following Formula 3. The edge line detection unit 36 then assesses whether an attention line La is an edge line for all of the attention lines La drawn in the detection area A1.

$\Sigma c(xi,yi)/N > \theta$      Formula 3

Returning to FIG. 3, the three-dimensional object detection unit 37 detects a three-dimensional object based on the amount of edge lines detected by the edge line detection unit 36. As described above, the three-dimensional object detection device 1 according to the present embodiment detects edge lines extending in the vertical direction in real space. If numerous edge lines extending in the vertical direction are detected, there is a high possibility that a three-dimensional object is present in the detection areas A1, A2. The three-dimensional object detection unit 37 thus detects a three-dimensional object based on the amount of edge lines detected by the edge line detection unit 36. Before detecting a three-dimensional object, the three-dimensional object detection unit 37 assesses whether the edge lines detected by the edge line detection unit 36 are correct. The three-dimensional object detection unit 37 assesses whether the variation in luminance along an edge line in the bird's-eye view image is greater than a predetermined threshold value. If the variation in luminance along an edge line in the bird's-eye view image is greater than the threshold value, the edge line is judged as having been detected as the result of an errant assessment. Meanwhile, if the variation in luminance along an edge line in the bird's-eye view image is not greater than the threshold value, the edge line is assessed as being correct. The threshold value is preset via experimentation or the like.

Figure 16:
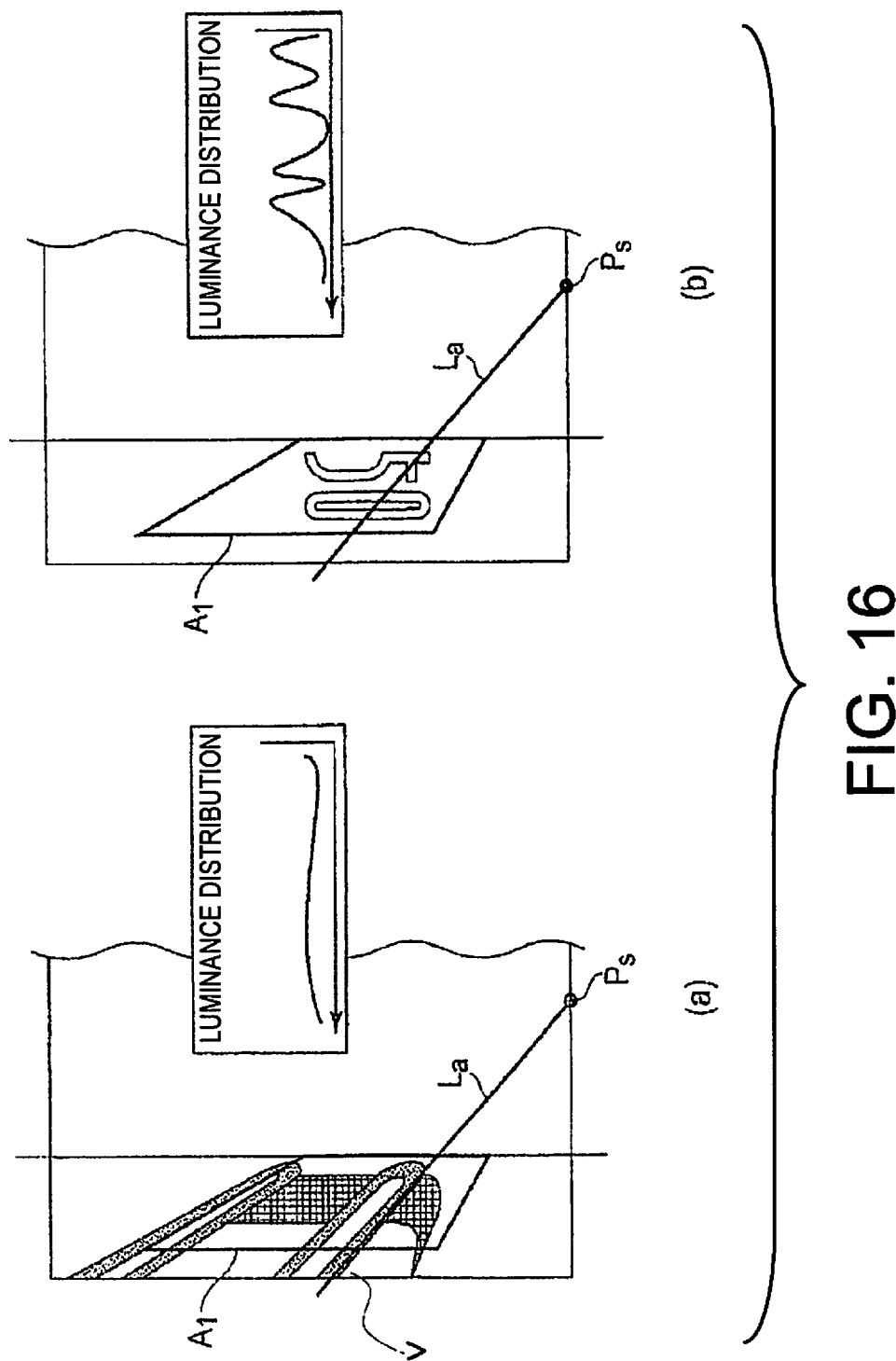
FIG. 16 is a view illustrating an edge line and a luminance distribution on an edge line, with part (a) illustrating a luminance distribution when a three-dimensional object (vehicle) is present in a detection area, and part (b) illustrating a luminance distribution when no three-dimensional object is present in a detection area.

FIG. 16 shows edge line luminance distributions, wherein part (a) of FIG. 16 shows an edge line and luminance distribution when another vehicle VX is present in the detection area A1 as a three-dimensional object, and part (b) of FIG. 16 shows an edge line and luminance distribution when no three-dimensional object is present in the detection area A1.

Let us assume that an attention line La set on the rubber part of a tire of another vehicle VX in the bird's-eye view image has been identified as an edge line, as shown in part (a) of FIG. 16. In this case, there is a gentle variation in luminance along the attention line La in the bird's-eye view image. This is due to the tire of the other vehicle VX being stretched in the bird's-eye view image as the result of the image captured by the camera 10 having been viewpoint-converted to the bird's-eye view image. Meanwhile, let us assume that an attention line La set on a white section of text reading "50" painted on the road surface in the bird's-eye view image has been misidentified as an edge line, as shown in part (b) of FIG. 16. In this case, there is a sharply pronounced variation in luminance along the attention line La in the bird's-eye view image. This is due to there being a mixture of high luminance areas corresponding to the white lettering and low luminance areas corresponding to the road surface on the edge line.

Based on differences in the luminance distribution along the attention line La as described above, the three-dimensional object detection unit 37 assesses whether an edge line has been misidentified. If the variation in luminance along an edge line is greater than a predetermined threshold value, the three-dimensional object detection unit 37 assesses that the edge line has been detected as the result of an errant assessment. The edge line in question is thus not used to detect three-dimensional objects. This allows for a minimization in situations in which white text such as "50" on the road surface or grass on the shoulder or the road is identified as an edge line, leading to reductions in the precision of three-dimensional object detection.

Specifically, the three-dimensional object detection unit 37 calculates variation in luminance along an edge line using one of the following Formulas 4 and 5. The variation in luminance along the edge line is equivalent to an evaluation value in the vertical direction in real space. The following Formula 4 evaluates the luminance distribution using the total of the squares of the differences between $i^{th}$ luminance values I (xi, yi) and an adjacent $(i+1)^{th}$ luminance value I (xi+1, yi+1) on an attention line La. The following formula 5 evaluates the luminance distribution using the total of the absolute values of the differences between $i^{th}$ luminance values I (xi, yi) and an adjacent $(i+1)^{th}$ luminance value I (xi+1, yi+1) on an attention line La.

Evaluation value for vertical-equivalent direction=Σ [{I(xi,yi)−I(xi+1,yi+1)}$^2$]     Formula 4

Evaluation value for vertical-equivalent direction=Σ|I (xi,yi)−I(xi+1,yi+1)|     Formula 5

The invention is not limited to Formula 5; for example, as shown in the following Formula 6, a threshold value t2 can be used to binarize the attribute b of an adjacent luminance value, then find the sum of the binarized attributes b for all the attention points Pa.

Evaluation value for vertical-equivalent direction=Σb (xi,yi)

When |I(xi,yi)−I(xi+1,yi+1)|>t2:

b(xi,yi)=1

In other cases:

b(xi,yi)=0     Formula 6

If the absolute value of the luminance difference between the luminance value for the attention point Pai and the luminance value for the reference point Pri is greater than the threshold value t2, the attribute b (xi, yi) of the attention point Pa (xi, yi) is "1". For other relationships, the attribute b (xi, yi) of the attention point Pai is "0". The threshold value t2 is experimentally set in advance so as to confirm that an attention line La is not on the same three-dimensional object. The three-dimensional object detection unit 37 finds the total of the attributes b for all attention points Pa on the attention line La, calculates an evaluation value in the vertical-equivalent direction, and assesses whether the edge line is correct.

Figure 17:
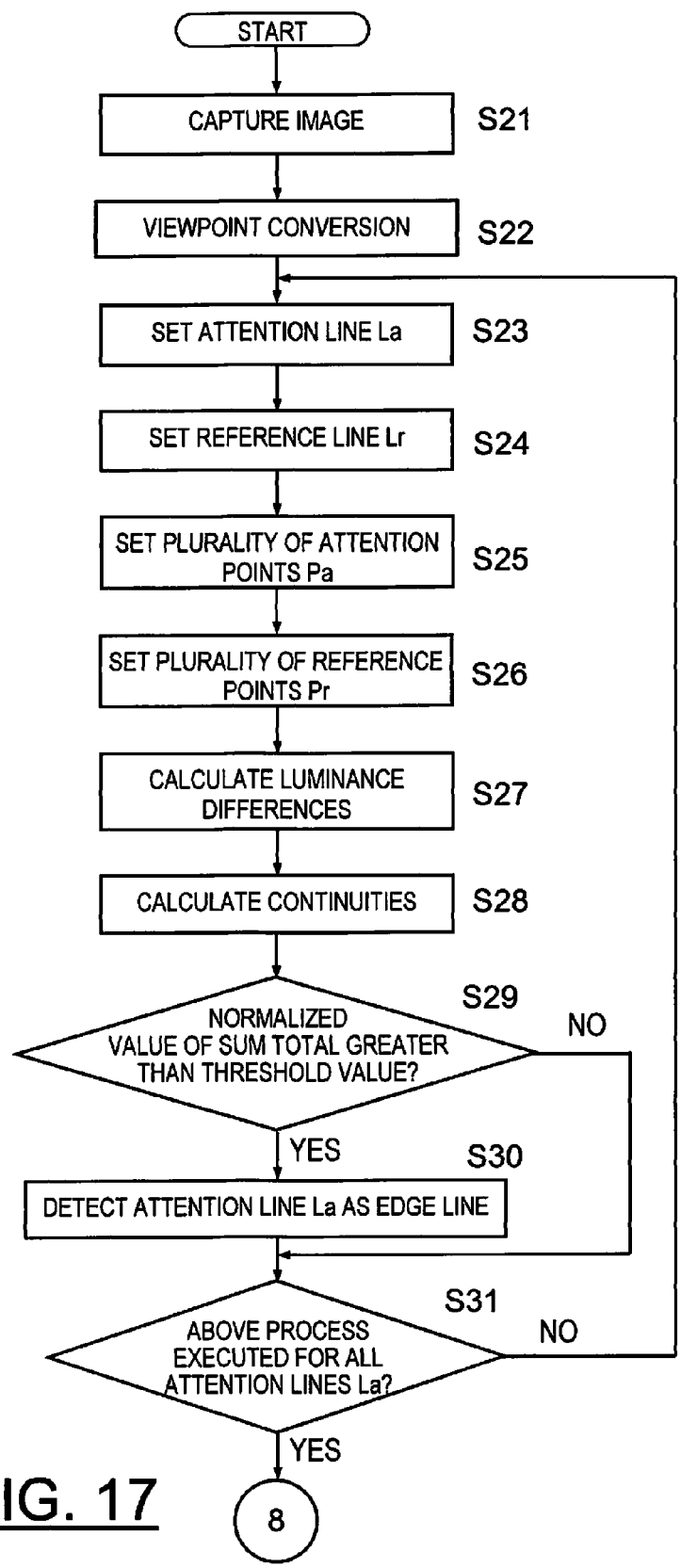
FIG. 17 is a first part of a flowchart illustrating an edge information-utilizing three-dimensional object detection method executed by the viewpoint conversion unit, luminance difference calculation unit, edge line detection unit, and three-dimensional object detection unit of FIG. 3.
Figure 18:
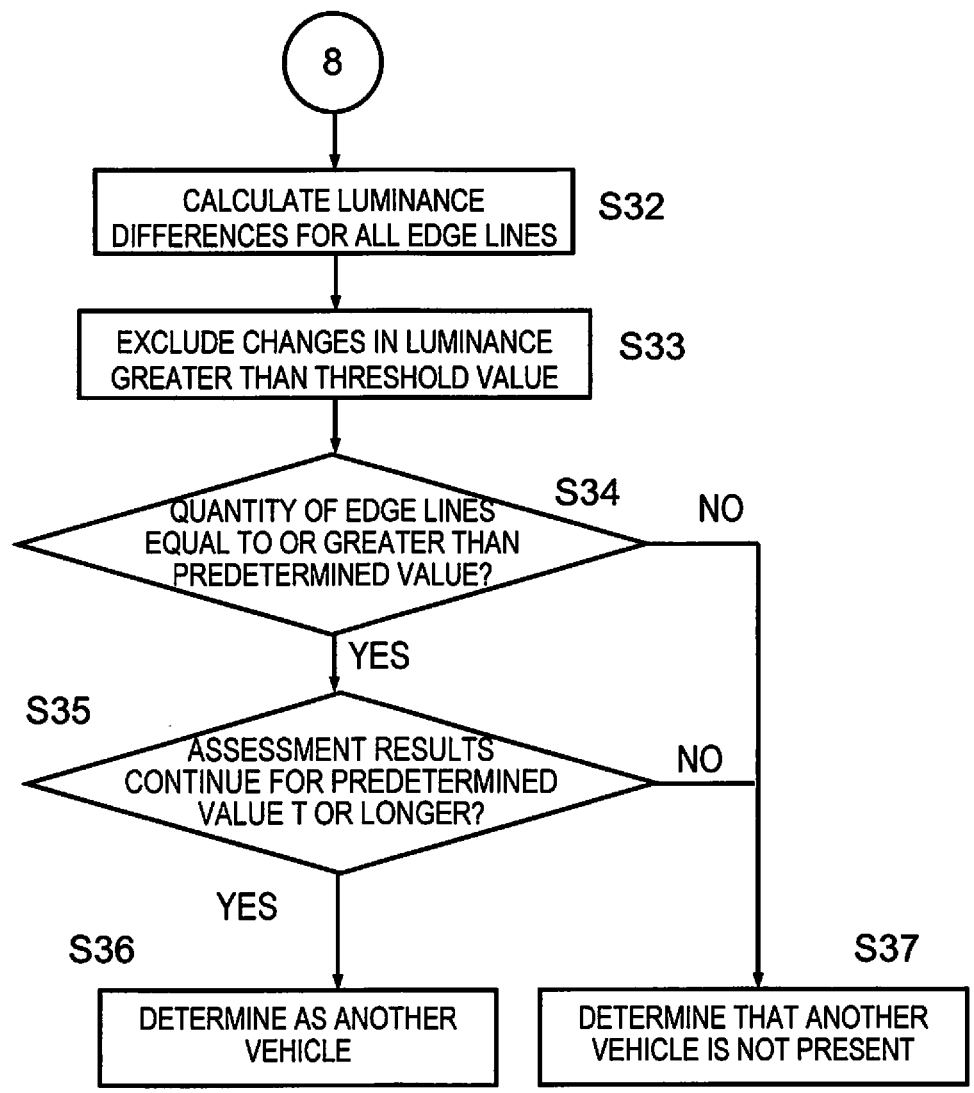
FIG. 18 is a second part of a flowchart illustrating an edge information-utilizing three-dimensional object detection method executed by the viewpoint conversion unit, luminance difference calculation unit, edge line detection unit, and three-dimensional object detection unit of FIG. 3.

Next, a three-dimensional object detection method based on edge information according to the present embodiment will be described. FIGS. 17 and 18 show a flowchart illustrating the details of the three-dimensional object detection method according to the present embodiment. For convenience, FIGS. 17 and 18 illustrate a process being performed on detection area A1, but a similar process is also performed upon detection area A2.

As shown in FIG. 17, the camera 10 first photographs a predetermined area assessed by the view angle α and attachment position thereof in step S21. Next, in step S22, data for the image photographed captured by the camera 10 in step S21 is inputted to the viewpoint conversion unit 31, and a bird's-eye view image data is generated via viewpoint conversion.

Next, in step S23, the luminance difference calculation unit 35 sets an attention line La in detection area A1. To do so, the luminance difference calculation unit 35 sets a line equivalent to a line extending in the vertical direction in real space as the attention line La. Next, in step S24, the luminance difference calculation unit 35 sets a reference line Lr in the detection area A1. To do this, the luminance difference calculation unit 35 sets a line that is equivalent to a line segment extending in the vertical direction in real space and is separated from the attention line La by a predetermined distance in real space as the reference line Lr.

Next, in step S25, the luminance difference calculation unit 35 sets a plurality of attention points Pa on the attention line La. During this process, the luminance difference calculation unit 35 sets a number of attention points Pa that will not be problematic when the edge line detection unit 36 is performing edge detection. In step S26, the luminance difference calculation unit 35 sets reference points Pr so that the attention points Pa and the reference points Pr are at substantially the same height in real space. As a result, the attention points Pa and the reference points Pr are substantially aligned in the horizontal direction, making it easier to detect edge lines extending in the vertical direction in real space.

Next, in step S27, the luminance difference calculation unit 35 calculates the luminance difference between attention points Pa and reference points Pr at the same height in real space. Next, the edge line detection unit 36 calculates the attribute s for each attention point Pa according to numerical formula 1 above. Next, in step S28, the edge line detection unit 36 calculates the continuity c of the attribute s for each attention point Pa according to numerical formula 2 above. Next, in step S29, the edge line detection unit 36 assesses whether the normalized sum for continuity c is greater than the threshold value $\theta$ according to numerical formula 2 above. If the normalized value is found to be greater than the threshold value $\theta$ (S29: YES), the edge line detection unit 36 detects the attention line La in question as an edge line in step S30. Next, the process transitions to step S31. If the normalized value is found not to be greater than the threshold value $\theta$ (S29: NO), the edge line detection unit 36 does not detect the attention line La in question as an edge line, but transitions to step S31. The threshold value $\theta$ can be set in advance, but can also be altered according to a control command from the controller 39.

In step S31, the computer 30 assesses whether the process set forth in steps S23-S30 has been executed for all settable attention lines La in the detection area A1. If the process is found not to have been performed for all of the attention lines La (S31: NO), the process is returned to step S23, a new attention line La is set, and the process is repeated until step S31. Meanwhile, if the process described above is found to have been performed for all attention lines La (S31: YES), the process shifts to step S32 in FIG. 18.

In step S32 in FIG. 18, the three-dimensional object detection unit 37 calculates the variation in luminance along the edge line for the edge line detected in step S30 in FIG. 17. The three-dimensional object detection unit 37 calculates the variation in luminance of the edge line according to one of numerical formulas 4, 5, and 6 described above. Next, in step S33, the three-dimensional object detection unit 37 removes any edge lines having a variation in luminance that is greater than the predetermined threshold value. In other words, edge lines having a large variation in luminance are assessed as not being correct edge lines, and are not used to detect three-dimensional objects. This is in order to prevent text on the road surface or grass on the shoulder of the road in detection area A1 from being detected as an edge line, as discussed above. Thus, the predetermined threshold value is set to a value, assessed in advance via experimentation or the like, based on the variation in luminance created by text on the road surface, grass on the shoulder of the road, or the like.

Next, in step S34, the three-dimensional object detection unit 37 assesses whether the edge line amount is equal to or greater than a second threshold value $\beta$. The second threshold value $\beta$ is assessed and set in advance via experimentation, and can be altered according to a control command issued by the controller 39 shown in FIG. 3. The details of this process will be described hereafter. For example, when the three-dimensional object to be detected is set to four-wheeled vehicles, the second threshold value $\beta$ is preset via experimentation according to the number of edge lines belonging to a four-wheeled vehicle appearing in the detection area A1. If the edge line amount is found to be equal to or greater than the second threshold value $\beta$ (S34: YES), and the three-dimensional object is continuously detected by the three-dimensional object detection unit 33 for the predetermined length of time T or longer (S35: YES), the three-dimensional object detection unit 37 detects that a three-dimensional object is present in the detection area A1 in step S36 (S36). Meanwhile, if the edge line amount is found not to be equal to or greater than the second threshold value $\beta$ (S34: NO), or no three-dimensional object is continuously detected by the three-dimensional object detection unit 33 for the predetermined length of time T or longer (S35: NO), the three-dimensional object detection unit 37 finds that no three-dimensional object is present in the detection area A1 (S37). The second threshold value $\beta$ can be set in advance, but can also be altered according to a control command from the controller 39. All detected three-dimensional objects may be judged to be other vehicles VX traveling in an adjacent lane next to the lane in which the host vehicle V, or the relative speed of the detected three-dimensional object relative to the host vehicle V may be considered as a characteristic of other vehicles VX in order to determine whether the object is another vehicle VX traveling in the adjacent lane.

In accordance with the three-dimensional object detection method based on edge information according to the present embodiment, as discussed above, vertical imaginary lines are set in the bird's-eye view image as line segments extending in the vertical direction in real space in order to detect three-dimensional objects present in the detection areas A1, A2. The luminance difference between two pixels near multiple positions along the vertical imaginary lines can then be calculated to determine whether a three-dimensional object is present based on the continuity of the luminance difference.

Specifically, an attention line La corresponding to a line segment extending in the vertical direction in real space and a reference line Lr different from the attention line La are set in the detection areas A1, A2 in the bird's-eye view image. The luminance difference between the attention points Pa on the attention line La and the reference points Pr on the reference line Lr is continuously found along the attention line La and the reference line Lr. In this way, the luminance difference between the attention line La and the reference line Lr is found by continuously finding the luminance difference between points. If there is a high luminance difference between the attention line La and the reference line Lr, there is a high possibility of an edge of a three-dimensional object being present at the location where the attention line La is set. It is thus possible to detect three-dimensional object based on continuous luminance difference. In particular, there is no effect upon the three-dimensional object detection process even if the three-dimensional object is stretched out according to the distance thereof from the road surface as a result of the conversion to the bird's-eye view image in order to compare the luminance ratio between vertical imaginary lines extending in the vertical direction in real space. Thus, in accordance with the method of the present example, the precision of three-dimensional object detection can be improved.

In the present example, the luminance difference between two points of substantially the same height near the vertical imaginary line is found. Specifically, the luminance difference between an attention point Pa on the attention line La and a reference point Pr on the reference line Lr at substantially the same height in real space is found, allowing for clear detection of luminance differences if an edge extending in the vertical direction is present.

Figure 19:
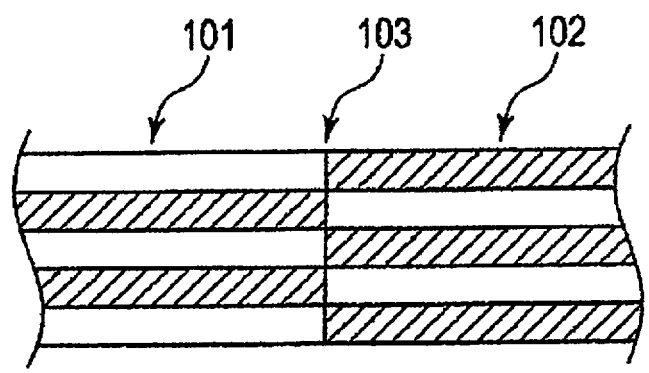
FIG. 19 is a view illustrating an example image for detailing an edge detection operation.

In addition, in the present example, it is possible to assign attributes to attention points Pa based on the luminance difference between attention points Pa on the attention line La and reference points Pr on the reference line Lr, determine whether the attention line La in question is an edge line based on whether the continuity c of the attributes along the attention line La, and detect boundaries between areas of high luminance and areas of low luminance as edge lines, allowing edges to be detected as naturally perceived by humans. This effect will be described in detail. FIG. 19 is an illustration of an example image for explaining the process performed by the edge line detection unit 36. The example image features a first striped pattern 101 or repeating areas of high luminance and areas of low luminance, and an adjacent second striped pattern 102 of repeating areas of low luminance and areas of high luminance. In the present example image, areas of high luminance in the first striped pattern 101 and areas of low luminance in the second striped pattern 102 are adjacent, and areas of low luminance in the first striped pattern 101 and areas of high luminance in the second striped pattern 102 are adjacent. A location 103 positioned at the boundary between the first striped pattern 101 and the second striped pattern 102 tends not to be perceivable to humans as an edge.

By contrast, because areas of low luminance and areas of high luminance are adjacent, the location 103 is perceived as an edge if edges are detected only using luminance differences. However, because the edge line detection unit 36 only identifies the location 103 as an edge line when, in addition to the luminance difference at location 103, there is continuity in the attribute of luminance difference, mistaken identifications of locations 103 that would not be perceived by a human as edge lines by the edge line detection unit 36 can be prevented, allowing for edge detection that is natural from a human sensory perspective.

In the present example, if the variation in luminance of the edge line detected by the edge line detection unit 36 is greater than a predetermined threshold value, the edge line is judged as having been detected as the result of misidentification. When the captured image acquired by the camera 10 is converted to a bird's-eye view image, a three-dimensional object in the captured image tends to appear in a stretched state in the bird's-eye view image. For example, if a tire of another vehicle VX is stretched out, as described above, a single location, viz., the tire, is stretched out, resulting in a tendency for the variation in luminance in the bird's-eye view image to be low in the direction of stretching. By contrast, if text or the like drawn on a road surface is misidentified as an edge line, a mixture of an area of high luminance in the form of the text and an area of low luminance in the form of the road surface appears in the bird's-eye view image. In this case, the variation in luminance in the bird's-eye view image in the direction of stretching tends to be greater. Thus, by identifying variations in luminance along an edge line in a bird's-eye view image, as in the present example, edge lines detected as the result of misidentification can be recognized, allowing for heightened three-dimensional object detection precision.

Final Three-Dimensional Object Assessment

Returning to FIG. 3, the three-dimensional object detection device 1 of the present example is provided with the two three-dimensional object detection units 33 (or three-dimensional object detection units 37) described above, the three-dimensional object assessment unit 34, the lens state assessment unit 38, and the controller 39. The three-dimensional object assessment unit 34 makes a final assessment of whether a detected three-dimensional object is another vehicle VX present in the detection areas A1, A2 based on the results detected by the three-dimensional object detection unit 33 (or the three-dimensional object detection unit 37). The three-dimensional object detection unit 33 (or three-dimensional object detection unit 37) and three-dimensional object assessment unit 34 detect a three-dimensional object reflecting the assessment results from the lens state assessment unit 38 according to commands from the controller 39.

The three-dimensional object assessment unit 34 will now be described. The three-dimensional object assessment unit 34 of the present embodiment makes a final assessment of whether a three-dimensional object detected by the three-dimensional object detection units 33, 37 is another vehicle VX present in the detection areas A1, A2. Specifically, the three-dimensional object assessment unit 34 finds that a three-dimensional object is another vehicle VX present in the detection areas A1, A2 if the three-dimensional object detection results yielded by the three-dimensional object detection units 33, 37 continue over a predetermined length of time T. Although there is no particular limitation either way, it is possible for the three-dimensional object assessment unit 34 to make a final assessment of whether a three-dimensional object is another vehicle VX present in the detection areas A1, A2 if the number of peaks, peak values, traveling speed, and the like of the differential waveform extracted from the differential waveform information are within predetermined value ranges, and that state continues for a predetermined length of time or longer, or to make a final assessment of whether a three-dimensional object is another vehicle VX present in the detection areas A1, A2 if the continuity, normalized sum, edge line amount, and the like of the edge extracted from the edge information are within predetermined value ranges, and that state continues for a predetermined length of time or longer.

If a three-dimensional object detected by the three-dimensional object detection units 33, 37 is continuously detected for a predetermined length of time or longer, the three-dimensional object assessment unit 34 of the present embodiment assesses that the three-dimensional object is another vehicle VX present in the right-side detection area or the left-side detection area.

When the detected three-dimensional object is found to be another vehicle VX present in the detection areas A1, A2, the three-dimensional object assessment unit 34 executes a process such as notifying a passenger. The three-dimensional object assessment unit 34 is capable of suppressing identification of detected three-dimensional objects as other vehicles VX according to control commands from the controller 39. The controller 39 generates control commands according to the assessment results yielded by the lens state assessment unit 38.

Next, the lens state assessment unit 38 will be described. The lens state assessment unit 38 of the present embodiment assesses whether the lens 11 is in a preset state subject to control based on the specific actions captured in a lens cleaning step executed by the lens cleaning device 100.

Figure 20:
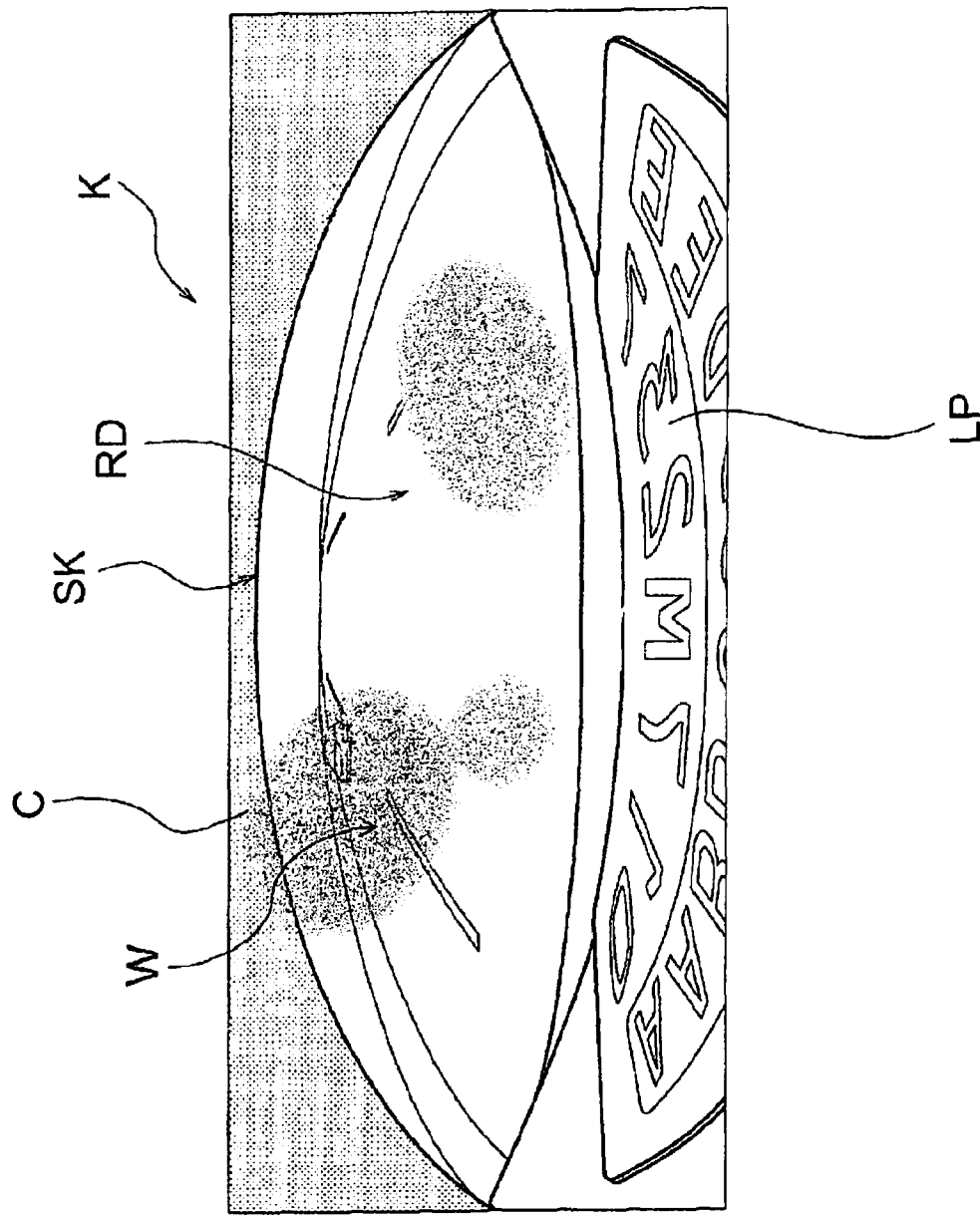
FIG. 20 is a view illustrating an example of image information captured by a camera after a lens has been cleaned.

In other words, the lens state assessment unit 38 of the present embodiment assesses the state of the lens 11 when cleaning has been performed by the lens cleaning device 100 using cleaning fluid. This is because cleaning fluid adheres to the lens 11 when the lens 11 is cleaned with cleaning fluid, affecting the captured image. FIG. 20 shows one example of image information K acquired when the lens 11 is being cleaned. As shown in FIG. 20, when cleaning fluid adheres to the lens 11 as the result of cleaning, an image of the cleaning fluid appears in the image information captured through the lens 11. The image seen in the lower part of FIG. 20 is that of a license plate LP, and the darkened section in the upper part is the case C of the camera 10. The image information K for the area between the license plate LP and the case C constantly changes as the host vehicle V moves. The image information K includes an image of a surface RD of a road on which the host vehicle V is traveling, and an image of the sky SK spreading out to the rear over the road surface RD. The image information K shown in FIG. 20 shows an image of cleaning fluid W adhering to the lens 11.

When an image conversion process is performed using image information K captured through a lens 11 with cleaning fluid W adhering thereto, as shown in FIG. 20, the derived differential waveform information or edge information reflects the image W of the cleaning fluid. If differential waveform information or edge information is calculated using such image information and a three-dimensional object detection process is performed according to the methods described above, the cleaning fluid image W may be misperceived as an image of another vehicle VX.

Figure 21:
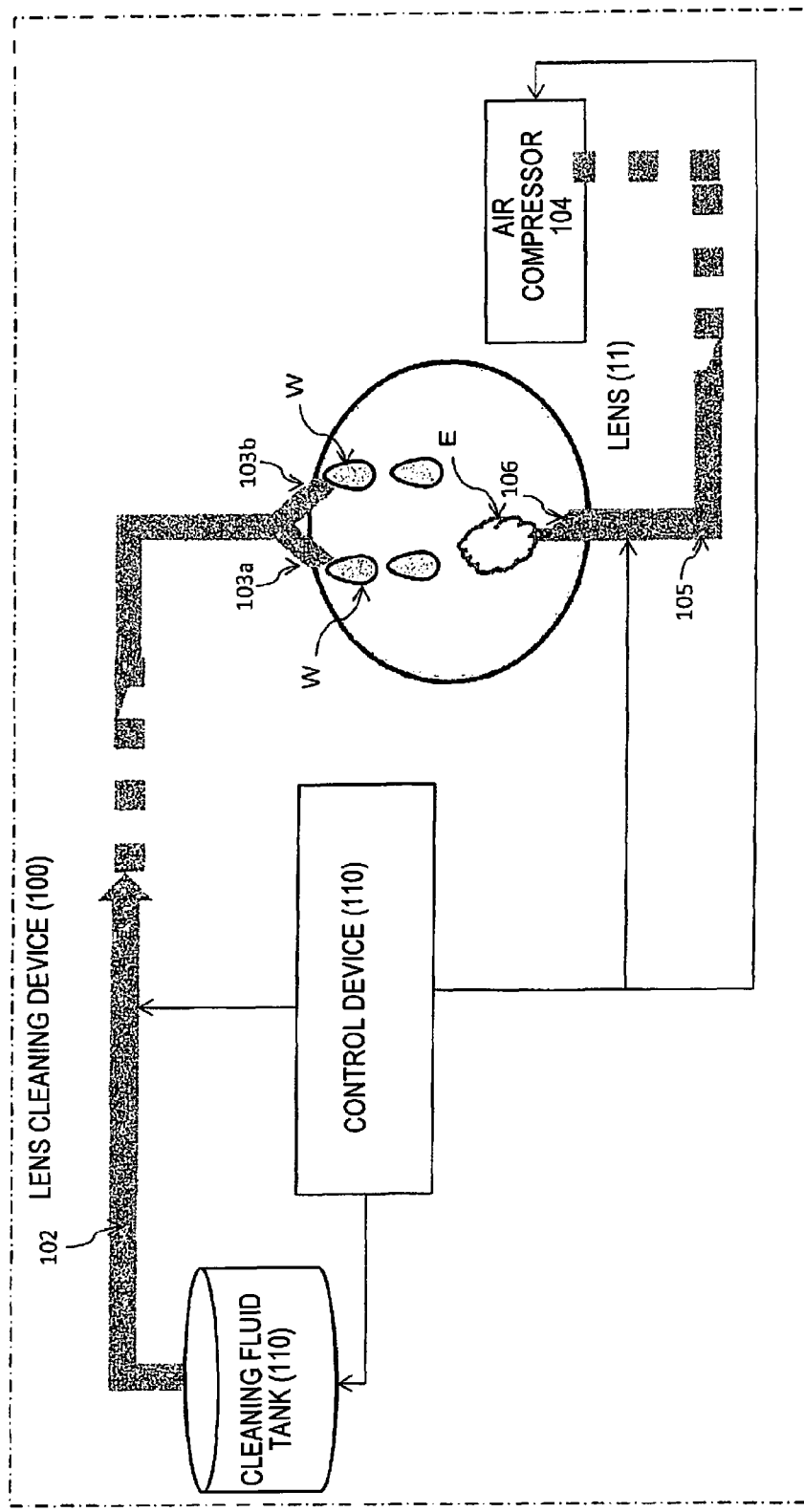
FIG. 21 is a schematic illustration of the configuration of a lens cleaning device.

The lens cleaning device 100 will now be described. FIG. 21 shows a schematic configuration of the lens cleaning device 100 of the present embodiment. As shown in FIG. 21, the lens cleaning device 100 is provided with a cleaning fluid tank 101 for at least temporarily storing cleaning fluid, a flow path 102 for delivering cleaning fluid supplied from the cleaning fluid tank 101, dispensing mouths 103*a*, 103*b*, formed in the flow path 102, for dispensing drops of cleaning fluid W onto the surface of the lens 11, an air compressor 104 for compressing air provided from the exterior, a tube 105 for delivering compressed air, and a jet mouth 106, formed in an end of the tube 105, for spraying air E onto the surface of the lens 11. The operation of the various elements of the lens cleaning device 100 described above is controlled by a control 110. The control 110 cleans the lens 11 according to a control program following specific pre-defined lens cleaning steps. Another example of the lens cleaning device 100 will be described hereafter as a second embodiment. Control according to the present invention may of course be applied to the lens cleaning device 100 according to the second embodiment.

Figure 22:
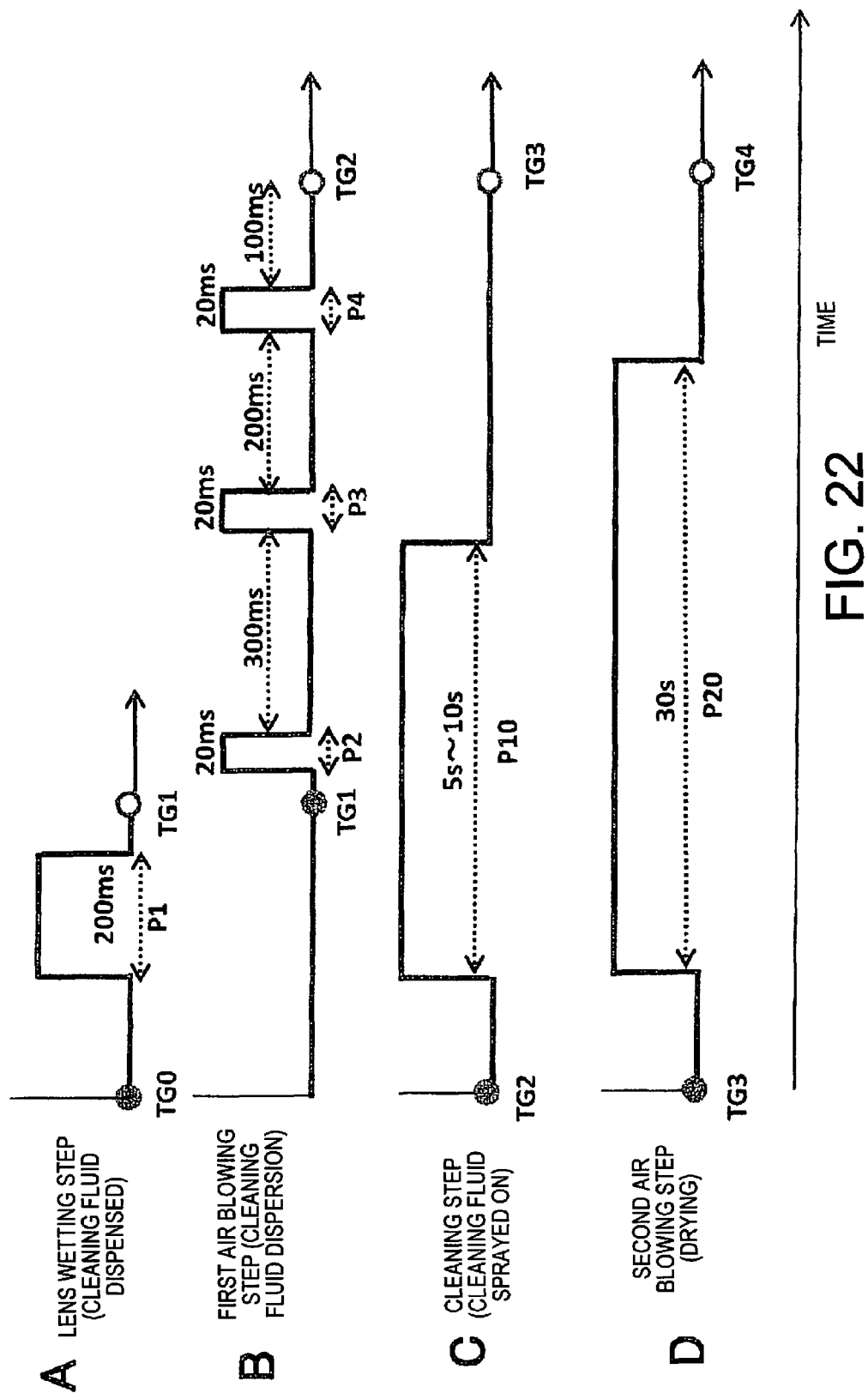
FIG. 22 is a timing chart for describing a lens cleaning step.

There is no particular limitation upon the specific actions captured during the lens cleaning steps; the lens cleaning steps of the present embodiment include a lens wetting step, a first air blowing step, a cleaning step, and a second air blowing step. FIG. 22 is a time chart of the lens cleaning steps of the present embodiment. The lens cleaning steps of the present embodiment include a "lens wetting step A" in which cleaning fluid W is dispensed dropwise onto the lens 11 in order to wet the surface of the lens 11, a "first air blowing step B" of intermittently spraying the lens 11 with air multiple times at predetermined intervals in order to spread the dispensed cleaning fluid W over the entire surface of the lens 11, a "cleaning step C" of spraying cleaning fluid W onto the lens 11 to wash contamination from the surface of the lens 11, and a "second air blowing step D" of evaporating the cleaning fluid W and drying the surface of the lens 11, executed in the order A, B, C, D.

Specifically, when the cleaning process is begun at time TG0, the control 110 first executes the "lens wetting step A". In the "lens wetting step A", a cleaning fluid dispensing process P1 in which cleaning fluid is continuously dispensed onto the surface of the lens 11 for about 200 ms is performed. The control 110 ends the "lens wetting step A" at time TG1, and subsequently begins the "first air blowing step B". In the first air blowing step B, multiple dispersing air blowing processes P2-P4 are performed. In the present embodiment, air is intermittently sprayed for 20 ms three times at cycles of 300 ms to 100 ms, but the air spraying cycle, spraying time, and number of sprayings can be set as desired according to air supply capability and the size of the lens 11. Once the "first air blowing step B" is completed at time TG2, the control 110 begins the "cleaning step C" and performs a cleaning fluid spraying process P10 in which cleaning fluid W is sprayed onto the surface of the lens 11 for about 5-10 seconds, and, when this process is completed at time TG3, begins the "drying step D" and performs a drying air blowing process P20 in which air is sprayed onto the surface of the lens 11 for about 30 seconds.

The lens state assessment unit 38 assesses the state of the lens 11 based on the specific actions captured during the lens cleaning steps described above. This is because the state of the lens 11 is constantly changing as it proceeds through the various steps of the lens wetting step A, the first air blowing step B, the cleaning step C, and the second air blowing step D. The lens state assessment unit 38 of the present embodiment assesses the state of the lens 11 in terms of the amount of cleaning fluid W adhering to the lens 11.

When the cleaning fluid dispensing process P1 of the lens wetting step A or the cleaning fluid spraying process P10 of the cleaning step C is being performed, the lens state assessment unit 38 assesses that there is a relatively large amount of cleaning fluid adhering to the lens 11. This state is defined as a "first state subject to control" subject to three-dimensional object detection control. When the dispersing air blowing processes P2, P3, P4 of the first air blowing step B are being performed, the lens state assessment unit 38 assesses that, relatively speaking, there is a middle amount of cleaning fluid adhering to the lens 11. This state is defined as a "second state subject to control" subject to three-dimensional object detection control. When the drying air blowing process P20 of second air blowing step D is being performed, the lens state assessment unit 38 assesses that there is a relatively small amount of cleaning fluid adhering to the lens 11. This state is defined as a "third state subject to control" subject to three-dimensional object detection control.

When the lens is being cleaned, cleaning fluid adheres to the lens 11. Thus, because image information captured during lens cleaning is less reliable than image information captured under ordinary circumstances (when the lens is not being cleaned), three-dimensional object detection process suppression control, to be described hereafter, can be constantly executed when the lens is being cleaned to improve the precision of detecting other vehicles.

However, constantly executing three-dimensional object detection process suppression control increases processing load, and suppression control could be performed even during instances in which reliability is guaranteed, instead reducing the precision of detecting other vehicles.

Thus, the inventors engaged in numerous tests of the precision of detecting other vehicles during lens cleaning for both of the previously described process of detecting other vehicles traveling in adjacent lanes based on differential waveform information and detecting other vehicles traveling in adjacent lanes based on edge information to further narrow down situations in which the precision of detecting other vehicles is reduced.

Specifically, the inventors obtained analysis results indicating an especially high possibility, in the case of an edge information-based other vehicle detection process, of reduced precision of detecting other vehicles when the lens is being cleaned during the lens wetting step A, in which the cleaning fluid dispensing process P1 is performed, and during the cleaning step C, in which the cleaning fluid spraying process P10 is performed (lens state: first state subject to control). One conceivable reason for this is that, during the lens wetting step A and cleaning step C, large amounts of cleaning fluid cover the lens 11, and a film of cleaning fluid impedes the image-forming capability of the lens 11, making edges corresponding to three-dimensional objects indistinct.

The inventors also obtained analysis results indicating an especially high possibility, in the case of differential waveform information-based other vehicle detection process, of reduced precision of detecting other vehicles when the lens is being cleaned during the first air blowing step B, when the dispersing air blowing processes P2, P3, P4 are being performed (lens state: second state subject to control). One conceivable reason for this is that, during the first air blowing step B, the intermittently sprayed air divides large amounts of cleaning fluid into beads that move over the lens 11, affecting differential waveform information results.

The inventors also obtained analysis results indicating an especially high possibility of reductions in the precision of differential waveform information-based relative speed detection results and edge information-based relative speed detection results from the time the air blowing step performed last in the first air blowing step B is begun until it is completed, and during the second air blowing step D, in which the drying air blowing process P20 is performed (lens state: third state subject to control). One conceivable reason for this is that cleaning fluid flows over the lens 11 due to the air continuously sprayed during the second air blowing step D, affecting the change over time in the edge information differential waveform information. Another reason is that there are initially large amounts of cleaning fluid during the first air blowing step B, but there is an increased number of air blowing processes, leading to a phenomenon similar to that occurring during the second air blowing step D being observed in the final air blowing process. These observations are summarized in FIG. 23.

In order to solve the problems described above, the controller 39 of the three-dimensional object detection device 1 according to the present embodiment of the present invention prevents a detected three-dimensional object from being assessed as being another vehicle VX based on the lens state assessment results yielded by the lens state assessment unit 38.

The controller 39 of the three-dimensional object detection device 1 of the present embodiment will now be described. The controller 39 of the present embodiment acquires lens state assessment unit 38 assessment results from the previous process, and assesses whether the lens 11 is in a predetermined state subject to control, i.e., a state requiring suppression control on the part of the controller 39, in the assessment results. In the present invention, "state subject to control" refers to a state in which there is at least some cleaning fluid adhering to the lens 11. This state of cleaning fluid adherence includes at least one of a state in which cleaning fluid is being sprayed, at state in which there is residual sprayed cleaning fluid on the lens 11, or a state in which there is residual cleaning fluid on the lens 11 following the air spraying performed after the cleaning fluid has been sprayed.

If the lens state assessment unit 38 assesses that the lens is in one of the first to third states subject to control described above, the controller 39 retains detection results from immediately before the lens state was assessed as being a state subject to control for a predetermined length of time, i.e., interrupts output of assessments of whether detected three-dimensional objects are other vehicles VX for a predetermined length of time, thereby preventing detected three-dimensional objects from being mistakenly identified as another vehicle VX. In other words, trust is placed in detection/assessment results from before the effects of lens cleaning and those detection/assessment results are continuously used, and the process of seeking detection/assessment results is suspended during states subject to control that are affected by lens cleaning.

In this way, the three-dimensional object detection process and assessment process are suppressed, depending on the state of the lens 11, so that detection results or assessment results from before the lens was cleaned are maintained, thereby preventing mistakes such as an already detected three-dimensional object changing to being undetected due to the lens cleaning process, or an undetected three-dimensional object changing to being detected due to the lens cleaning process. This allows for the prevention of reductions in the precision of the detection results due to the lens 11 being cleaned even when other vehicles VX are detected using differential waveform information when other vehicles VX are detected using edge information, allowing for the provision of a three-dimensional object detection device that detects other vehicles traveling in the detection areas at a high level of precision.

In this case, if the lens state assessment unit 38 assesses that the lens state is a state subject to control, and a detection state in which a three-dimensional object is being detected by the three-dimensional object detection units 33, 37 was identified immediately before the lens state was assessed as being a state subject to control, the controller 39 retains the detection results from immediately before the lens state was assessed as being a state subject to control for a predetermined length of time, and assessments of whether detected three-dimensional objects are other vehicles VX and output of the same are interrupted for a predetermined length of time.

In other words, only when a three-dimensional object is detected immediately before the lens is put into a state subject to control due to the lens being cleaned does the controller 39 retain the immediately preceding detection results for a predetermined length of time and interrupt assessments of whether detected three-dimensional objects are other vehicles VX and output thereof for a predetermined length of time, thus preventing a detected three-dimensional object from being mistakenly assessed as being another vehicle VX.

In this way, highly reliable detection/assessment results indicating that another vehicle VX has been detected are continuously used before the effects of lens cleaning are felt, and the process of seeking detection/assessment results is suspended in states subject to control that are affected by lens cleaning, thereby preventing the detection/assessment results from being affected by lens cleaning and allowing other vehicles VX to be detected at high precision.

Any of the first, second, or third states subject to control described above can be set as the state subject to control used in this process. It is of course also acceptable to retain immediately preceding detection results for a predetermined length of time and interrupt the assessment of whether detected three-dimensional objects are other vehicles VX and output of the same for a predetermined length of time for all of the first through third states subject to control. In the present embodiment, the first through third states subject to control are defined based on the cleaning steps, but states subject to control can be defined based on different cleaning steps. In this case, "states in which there is cleaning fluid adhering to the lens 11", such as the states before and after the cleaning fluid is dispensed or the states before and after the cleaning fluid is sprayed on, can be defined as "states subject to control". "States in which there is cleaning fluid adhering to the lens 11" include a state in which air is blown and there is cleaning fluid remaining on the lens 11 after the cleaning fluid has been dispensed or sprayed on.

Out of consideration for situations in which other vehicle VX detection precision is reduced as described above, the controller 39 of the present embodiment sets the second state subject to control as a state subject to control when detecting three-dimensional objects using differential waveform information, and sets the first state subject to control as a state subject to control when detecting three-dimensional objects using edge information.

During the process of the three-dimensional object detection unit 33 detecting three-dimensional objects using differential waveform information, if the lens state assessment unit 38 assesses that the lens state is the second state subject to control, in which there is a middle amount of cleaning fluid adhering to the lens 11, the controller 39 of the present embodiment retains detection results from immediately before the lens state was assessed as being in the second state subject to control for a predetermined length of time, and interrupts assessment of whether detected three-dimensional objects are other vehicles VX and output of the same for a predetermined length of time. The lens state assessment unit 38 assesses that the lens state is the second state subject to control in which there is a middle amount of cleaning fluid adhering to the lens 11 based on the fact that the lens cleaning step is from when the first air blowing step B is begun until when the first air blowing step B is completed.

As a result, during the process of detecting three-dimensional objects using differential waveform information, a process that minimizes misdetection of other vehicles VX can be selectively executed during the lens cleaning process or in the second state subject to control, in which there is a high tendency toward reductions in the precision of detecting other vehicles VX due to cleaning fluid adhering to the lens 11, thereby making it possible to reduce processing load and avoid superfluous suppression processes. As a result, other vehicles VX can be detected with greater precision.

The greater the number of air blowing repetitions P2-P4 there are during the first air blowing step B identified by the lens state assessment unit 38, the shorter the controller 39 sets the predetermined length of time that the detection results from immediately before the lens was assessed as being the second state subject to control is retained. As discussed above, it is foreseeable that there will be large amounts of cleaning fluid moving over the lens 11 in beads during the first air blowing step B due to the intermittently blown air, a phenomenon that affects differential waveform information. Every time intermittent air blowing is performed during the first air blowing step B, the cleaning fluid pooled on the lens 11 is gradually blown over the lens, gradually reducing the amount of cleaning fluid moving over the lens 11. In other words, the greater the number of times air is blown, the more the effect of the amount of cleaning fluid on the lens 11 upon the differential waveform information is reduced; thus, the predetermined length of time that the detection results from immediately before the lens was assessed as being in the second state subject to control are retained can be shortened in order to prioritize real-time detection results.

Meanwhile, during the process of the three-dimensional object detection unit 37 detecting three-dimensional objects using edge information, if the lens state assessment unit 38 assesses that the lens state is the first state subject to control, in which there is a large amount of cleaning fluid adhering to the lens 11, the controller 39 of the present embodiment retains detection results from immediately before the lens state was assessed as being in the first state subject to control for a predetermined length of time, and interrupts assessment of whether detected three-dimensional objects are other vehicles VX and output of the same for a predetermined length of time. The lens state assessment unit 38 assesses that the lens state is the first state subject to control, in which there is a large amount of cleaning fluid adhering to the lens 11, during the period from when the lens cleaning steps are begun to when the lens wetting step A is completed and from when the cleaning step C is begun to when the cleaning step C is finished.

As a result, during the process of detecting three-dimensional objects using edge information, a process that minimizes misdetection of other vehicles VX can be selectively executed during the lens cleaning process or in the first state subject to control, in which there is a high tendency toward reductions in the precision of detecting other vehicles VX due to cleaning fluid adhering to the lens 11, thereby making it possible to reduce processing load and avoid excessive suppression processes. As a result, other vehicles VX can be detected with greater precision.

When the lens state assessment unit 38 assesses that the lens state is the third state subject to control, in which a small amount of cleaning fluid adheres to the lens 11, the controller 39 of the present embodiment retains the relative speed of a three-dimensional object detected immediately before the lens was assessed as being in the third state subject to control, or assessment results on whether a three-dimensional object is another vehicle VX that were obtained based on this relative speed, for a predetermined length of time, and interrupts assessments of whether a detected three-dimensional object is another vehicle VX and output of the same for a predetermined length of time. The lens state assessment unit 38 assesses that the lens state is the third state subject to control, in which a small amount of cleaning fluid adheres to the lens 11, from when the air blowing process P4 performed last in the first air blowing step B is begun to when the process is ended and from when the second air blowing step D is begun to when the second air blowing step D is completed. This process can be applied whether differential waveform information is used to detect three-dimensional objects or edge information is used to detect three-dimensional objects.

As a result, when it is assessed that the lens state is the third state subject to control, in which cleaning fluid moving over the lens due to the air intermittently blown during the drying step affects the change over time in differential waveform information/edge information, leading to a high tendency towards reduced precision in detecting the relative speed of three-dimensional objects, the relative speed detection process is selectively suppressed, allowing the processing load to be reduced and keeping superfluous suppression processes from being executed. As a result, other vehicles VX can be detected with greater precision.

The specific control process actions captured for the different states subject to control of the lens 11 are summarized in FIG. 24.

The control command of the present embodiment is sent to the three-dimensional object detection units 33, 37 and the three-dimensional object assessment unit 34 in order to prevent a detected three-dimensional object from being mistaken assessed as being another vehicle VX. Because the computer 30 of the embodiment is a computer, control commands for the three-dimensional object detection process, the three-dimensional object assessment process, and the lens state assessment process may be incorporated into the programs for the various processes ahead of time, or may be sent at the time of execution. As a result, if it assessed that the lens 11 is in a predetermined state subject to control, detection/assessment results from immediately before that assessment was made are retained, and new detection/assessment processes are interrupted, allowing for the prevention of misdetections caused by the lens cleaning process.

The control procedure of the three-dimensional object detection device 1 according to the present embodiment will now be described with respect to the flowchart shown in FIG. 25. The process shown in FIG. 25 is a present three-dimensional object detection process performed after a previous three-dimensional object detection process using the results from the previous process.

Figure 25:
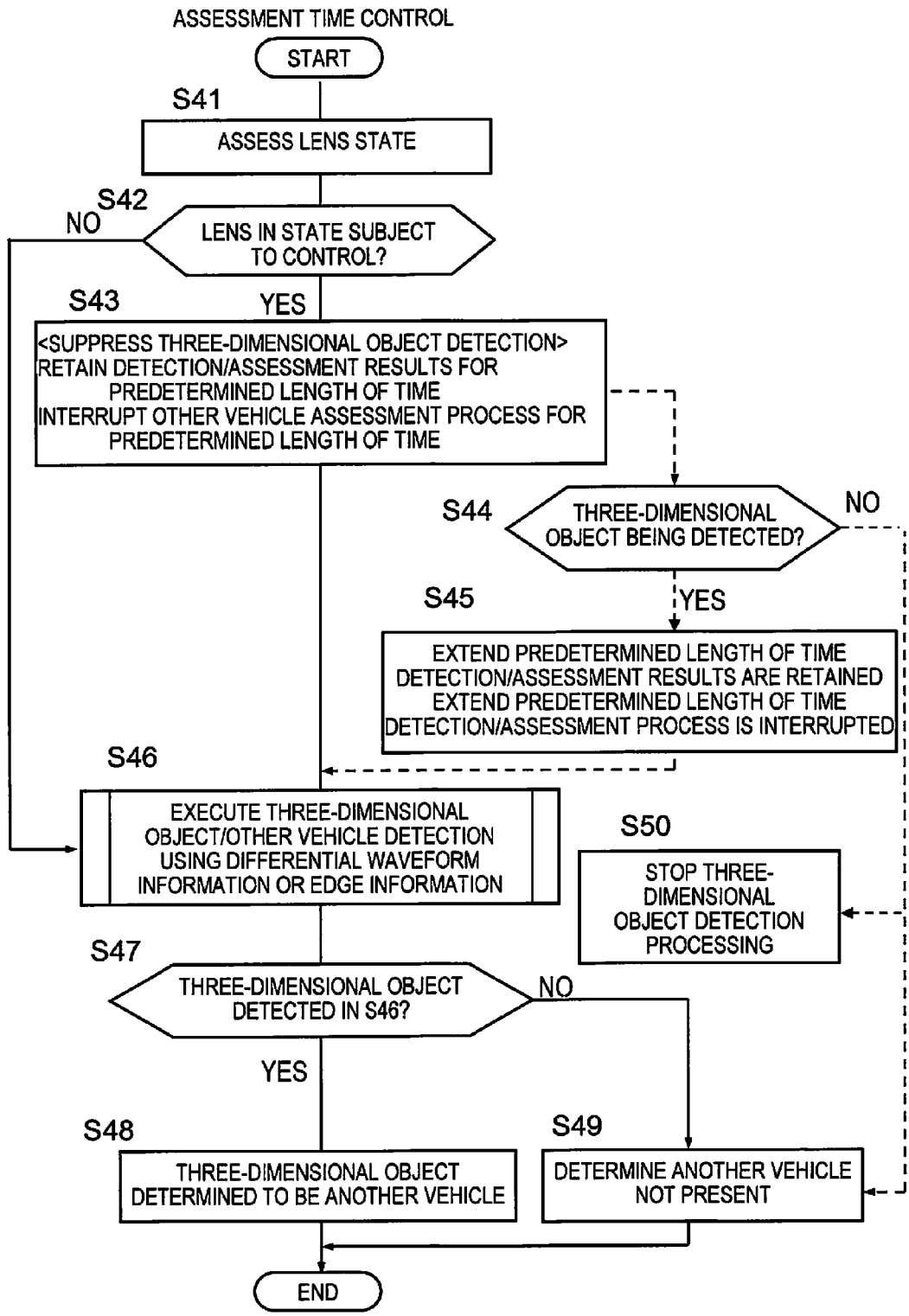
FIG. 25 is a flowchart showing a three-dimensional object assessment control procedure taking lens state into account.

First, in step S41 shown in FIG. 25, the lens state assessment unit 38 assesses whether the lens 11 is in a predetermined state subject to control based on the specific actions captured in a lens cleaning step executed by the lens cleaning device 100.

Figure 26:
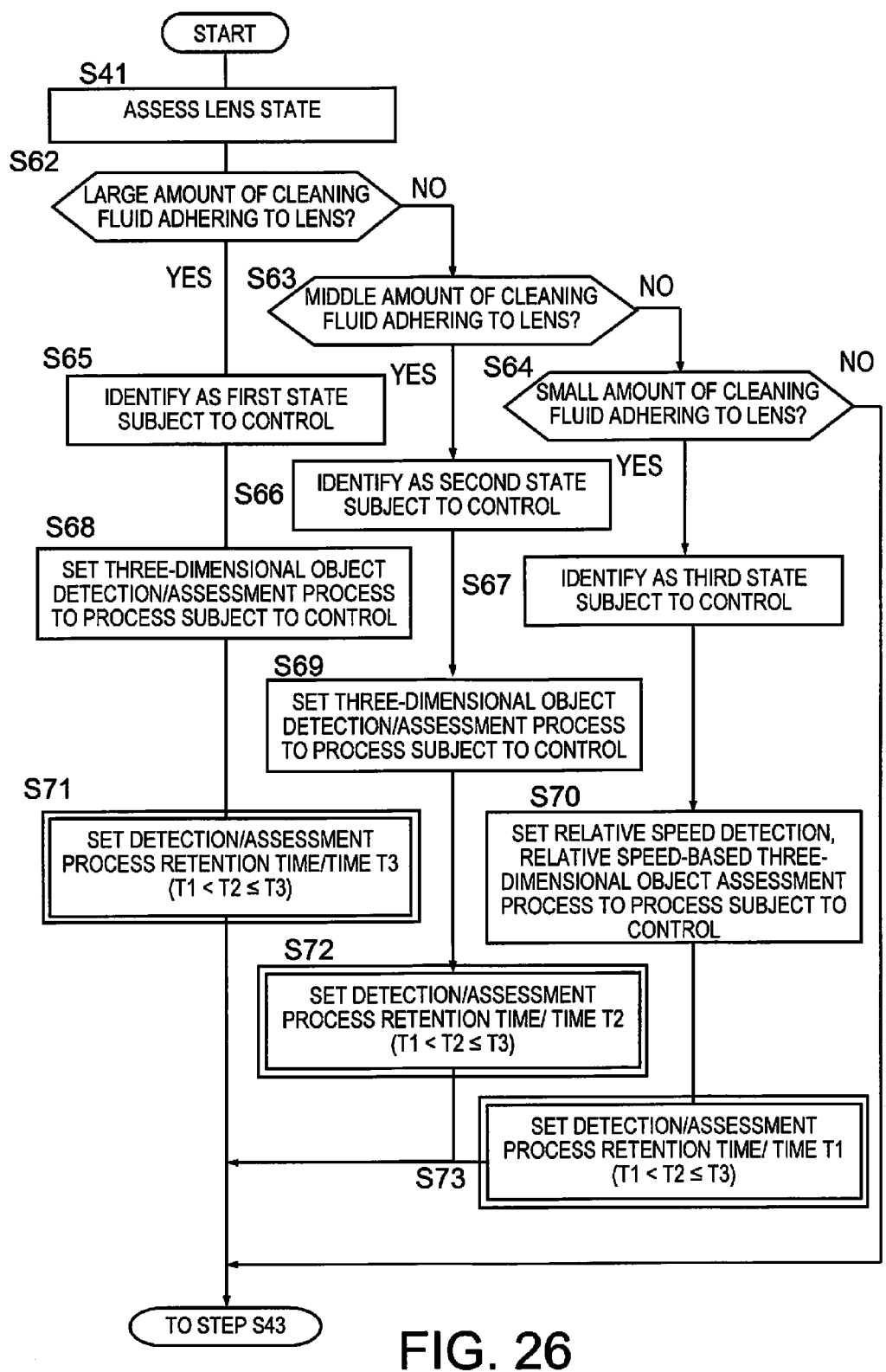
FIG. 26 is a flowchart of a control procedure for setting a process subject to control and specific control actions according to a state subject to control.

The control process for the process of assessing the lens state will now be described with reference to the flowchart of FIG. 26. The lens state assessment unit 38 assesses the lens state based on the specific actions captured during the lens cleaning step in terms of the amount of cleaning fluid adhering to the lens. In step S62, if the cleaning fluid dispensing process P1 of the lens wetting step A or the cleaning fluid spraying process P10 of the cleaning step C is being performed, the lens state assessment unit 38 assesses that there is a relatively large amount of cleaning fluid adhering to the lens 11, and the process continues to step S65. In step S65, the lens state assessment unit 38 assesses that the lens state is the first state subject to control.

In the subsequent step S63, when the dispersing air blowing processes P2, P3, P4 of the first air blowing step B are being performed, the lens state assessment unit 38 assesses that, relatively speaking, there is a middle amount of cleaning fluid adhering to the lens 11, and the process proceeds to step 866. In step S66, the lens state assessment unit 38 assesses that the lens state is the second state subject to control.

In the subsequent step S64, the lens state assessment unit 38 assesses that there is a relatively small amount of cleaning fluid adhering to the lens 11 when the drying air blowing process P20 is being performed during the second air blowing step D and when the final dispersing air blowing process P4 is being performed during the first air blowing step B, and the process continues to step S67. In step S67, the lens state assessment unit 38 assesses that the lens state is the first state subject to control.

The process to be controlled is also identified. If the lens is assessed as being in the first state subject to control in step S65, the process proceeds to step S68, and the three-dimensional object detection process and assessment process are set as processes subject to control (i.e., subject to the execution of the process of retaining the immediately preceding results). Similarly, if the lens is assessed as being in the second state subject to control in step S66, the process proceeds to step S69, and the three-dimensional object detection process and assessment process are set as processes subject to control (i.e., subject to the execution of the process of retaining the immediately preceding results).

If the lens is assessed as being in the third state subject to control in step S67, the process proceeds to step S70, and relative speed detection and the three-dimensional object detection process and assessment process based on relative speed are set as processes subject to control (i.e., subject to the execution of the process of retaining the immediately preceding results).

If the lens state is the first state subject to control, the detection/assessment process retention time or interruption time is set to T3 in step S71. If the lens state is the second state subject to control, the detection/assessment process retention time or interruption time is set to T2 in step S72. If the lens state is the third state subject to control, the detection/assessment process retention time or interruption time is set to T1 in step S73. The retention time or interruption time T1 for relative speed detection and the three-dimensional object detection/assessment process based on relative speed is shorter than the retention times or interruption times T2, T3 for the three-dimensional object detection/assessment process. This is because relative speed is detected based on information regarding the change over time in the three-dimensional object detection results, with the result that there is a possibility of reduced precision in the detected relative speed if past results are retained for too long. The retention time or interruption time T3 for the three-dimensional object detection process based on edge information can be set longer than the retention time or interruption time T2 for the three-dimensional object detection process based on differential waveform information. This is because the first state subject to control, in which there is a large amount of cleaning fluid adhering to the lens 11, tends to continue for a relatively long period of time. T3 and T2 may, of course, be set to the same length of time.

After assessing the lens state, identifying the process subject to control, and assessing the retention time/interruption time T1-T3, or concurrently therewith, the processes of step S42 and thereafter in FIG. 25 are performed.

Returning to FIG. 25, in step 42, the controller 39 evaluates the assessment results from step 41. If it is assessed in step S41 that the lens is in a "state subject to control" that has been defined as a state in which suppression control is executed, the controller 39 proceeds to step S43; if it is assessed that the lens is not in a "state subject to control" that has been defined as a state in which suppression control is executed, the process continues to step S46. The "states subject to control" of the lens 11 can be defined as appropriate. For example, if detecting other vehicles VX based on edge information, the "state subject to control" is defined as the first state subject to control shown in FIGS. 23 and 24, and if detecting other vehicles VX based on differential waveform information, the "state subject to control" can be defined as the second state subject to control shown in FIGS. 23 and 24. Along with these, the "state subject to control" can be defined as the third state subject to control shown in FIGS. 23 and 24.

In step S43, the controller 39 retains detection or assessment results from immediately before the lens state was assessed as being a state subject to control for a predetermined length of time, and interrupts the process of assessing (detecting) whether detected three-dimensional objects are other vehicles VX and output thereof for a predetermined length of time.

Figure 27:
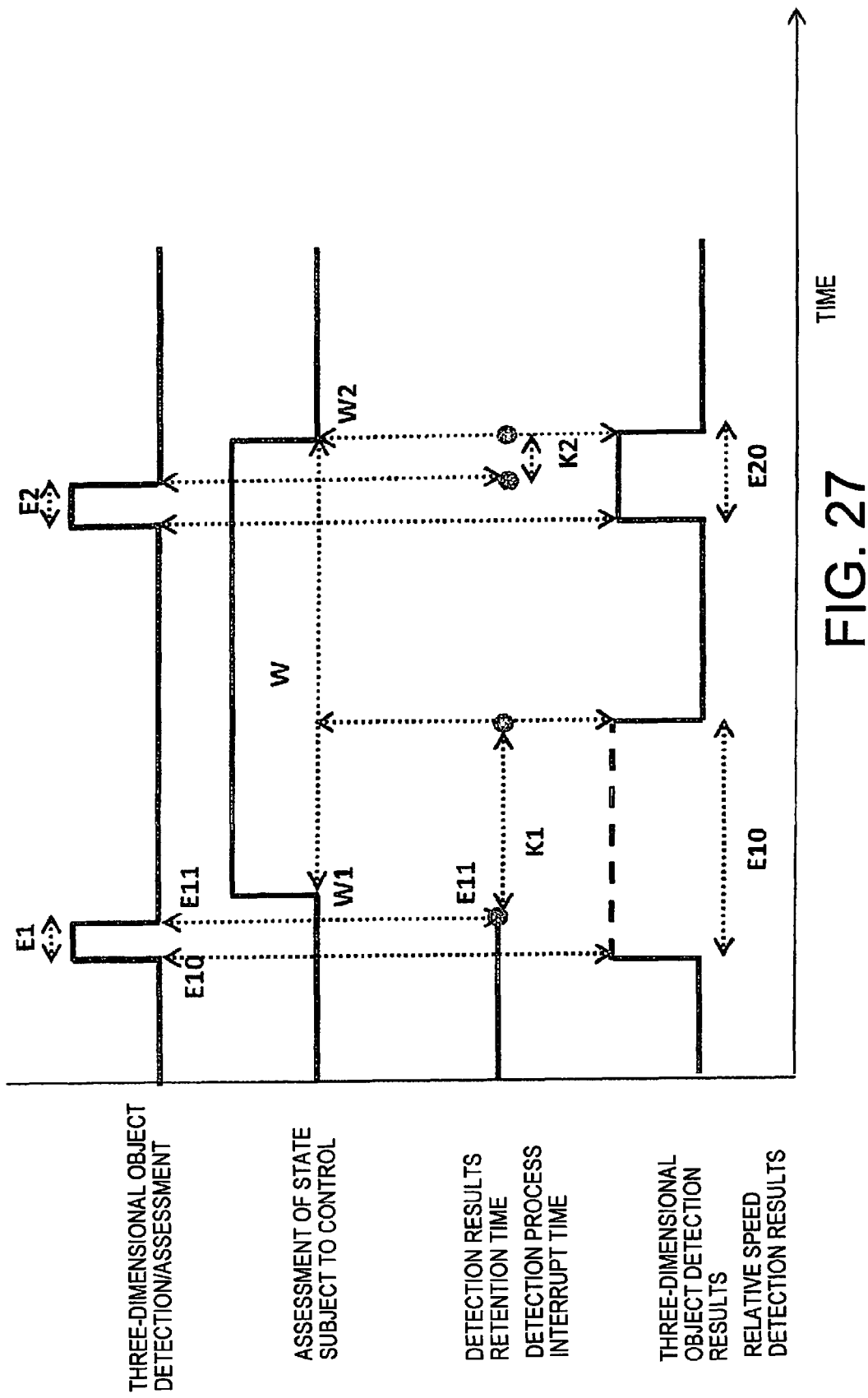
FIG. 27 is a timing chart for describing retention time.

This process will now described with reference to FIG. 27. First, a scenario in which three-dimensional object-related detection/assessment results are issued for a length of time E1 from time E10 to E11, after which the lens state is a state subject to control for a length of time W from time W10 to W11, will be described as an example. The controller 39 retains detection/assessment results related to a three-dimensional object detected during the length of time E1 immediately before the time W1 at which the lens state was assessed as being a state subject to control. In other words, the controller 39 treats the detection/assessment results from the length of time E1 as actual detection/assessment results for a predetermined length of time K1 after the times E10 to E11 in which the detection/assessment results relating to three-dimensional objects were outputted elapsed, and the other vehicle VX assessment process (three-dimensional object detection process) is executed based on these results. The predetermined length of time K1 can be set as desired. As the result of this process of retaining immediately preceding detection/assessment results and interrupting new detection/assessment processes and the output thereof, detection/assessment results from the length of time E1 in which these processes were actually being executed are treated (fictionally) as results detected or assessed across the length of time E1.

In this way, the controller 39 retains detection results or assessment results from immediately before the lens entered the predetermined state subject to control, and refrains from assessing whether three-dimensional objects are other vehicles VX based on newly acquired image information for a predetermined length of time after the lens enters the predetermined state subject to control. As the result of this process, it is possible to prevent detected three-dimensional objects from being misidentified as other vehicles VX even when the lens is in a predetermined state subject to control that tends to lead to reduced precision of detection results.

After step 43, the process may continue directly to step S46, or may pass through the processes of steps S44 and 45 before proceeding to step S46. In step S44, the controller 39 assesses whether a three-dimensional object is being detected by the three-dimensional object detection units 33, 37. If a three-dimensional object is being detected, the process continues to step S45, the predetermined length of time for which the results of the detection/assessment executed in step S43 are retained is extended, and the predetermined length of time for which the detection/assessment process and process of outputting the same are interrupted is extended. Based on the perspective that detection/assessment results indicating that a three-dimensional object is being detected are highly reliable, weight is given to assessments made when a three-dimensional object is being detected, improving precision in detecting other vehicles VX.

In the subsequent step S46, a three-dimensional object (other vehicle) is detected based on differential waveform information or edge information. In step S47, it is assessed whether the three-dimensional object detected in step S46 is another vehicle VX. If the three-dimensional object is another vehicle VX, assessment results indicating that another vehicle is present are outputted in step S48. If the three-dimensional object is not another vehicle VX, assessment results indicating that no other vehicle is present are outputted in step S49. The processes performed in steps S46 and S47 are the same as the other vehicle VX detection process based on differential waveform information as described using FIGS. 11 and 12 and the other vehicle VX detection process based on edge information as described using FIGS. 17 and 18. If no three-dimensional object is detected in step S44, the process may continue to step S50 and end the three-dimensional object detection process, or the process may continue to step S49 and determine that no other vehicle is present.

Second Embodiment

Another lens cleaning device 100 that can be applied as the lens cleaning device 100 according to the first present invention of the present invention will now be described with reference to the drawings.

The lens cleaning device 100 according to the present embodiment is provided with a nozzle that is disposed so that an outlet thereof faces the surface of the camera lens and includes a cleaning fluid channel that directs cleaning fluid to the outlet and an air channel that directs compressed air to the outlet, cleaning fluid delivery means for delivering cleaning fluid to the nozzle, and compressed air delivery means for delivering compressed air to the nozzle, cleaning fluid and compressed air being sprayed from the outlet to clean the lens surface by the cleaning fluid delivery means being operated and the compressed air delivery means being intermittently operated multiple times.

Figure 28:
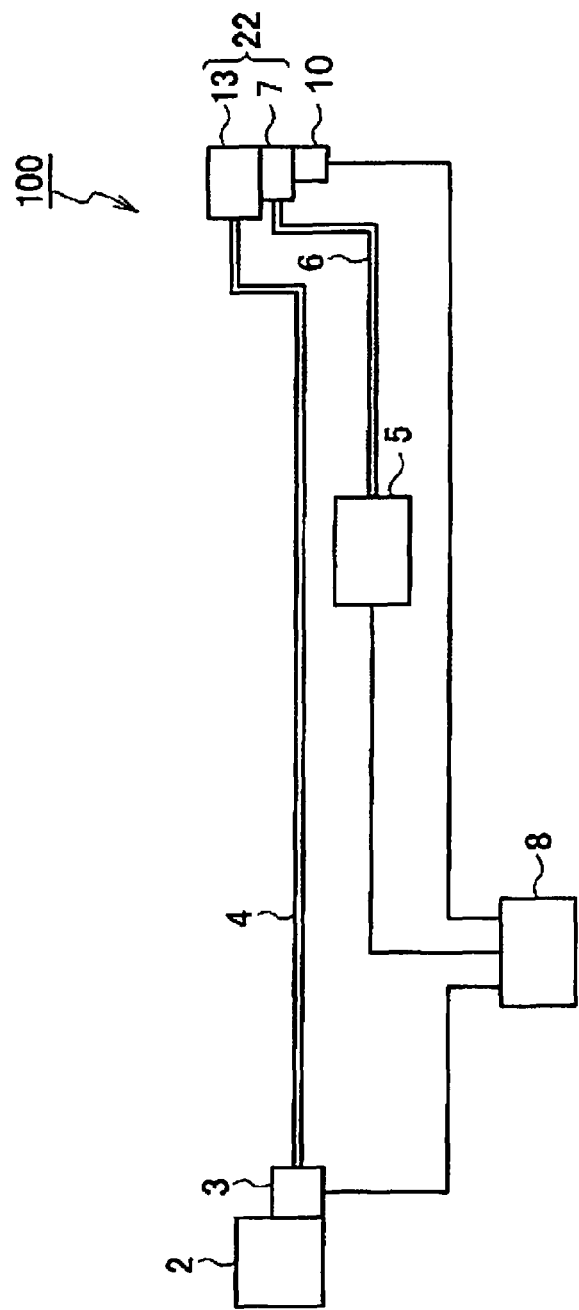
FIG. 28 is a block diagram of the configuration of a vehicle-mounted camera cleaning device according to another example.

FIG. 28 is a block diagram of the configuration of a lens vehicle-mounted camera cleaning device according to one embodiment of the present invention. As shown in FIG. 28, the lens cleaning device 100 according to the present embodiment is provided with a cleaning fluid reservoir tank 2 for accumulating cleaning fluid, a cleaning fluid pump 3 (cleaning fluid supply means) for sending out cleaning fluid accumulated in the cleaning fluid reservoir tank 2, an air pump 5 (compressed air supply means) for sending out compressed air, and a nozzle 7 for spraying cleaning fluid, compressed air, or a mixture of cleaning fluid and compressed air onto the surface of the lens of a camera 10.

Also provided are a cleaning fluid tube 4 for directing cleaning fluid sent out by the cleaning fluid pump 3 to a secondary tank 13 for accumulating the cleaning fluid, an air tube 6 for directing compressed air sent out by the air pump 5 to the nozzle 7 of a nozzle unit 22, and a control unit (control means) 8 for controlling the operation of the cleaning fluid pump 3 and the air pump 5.

Figure 29A:
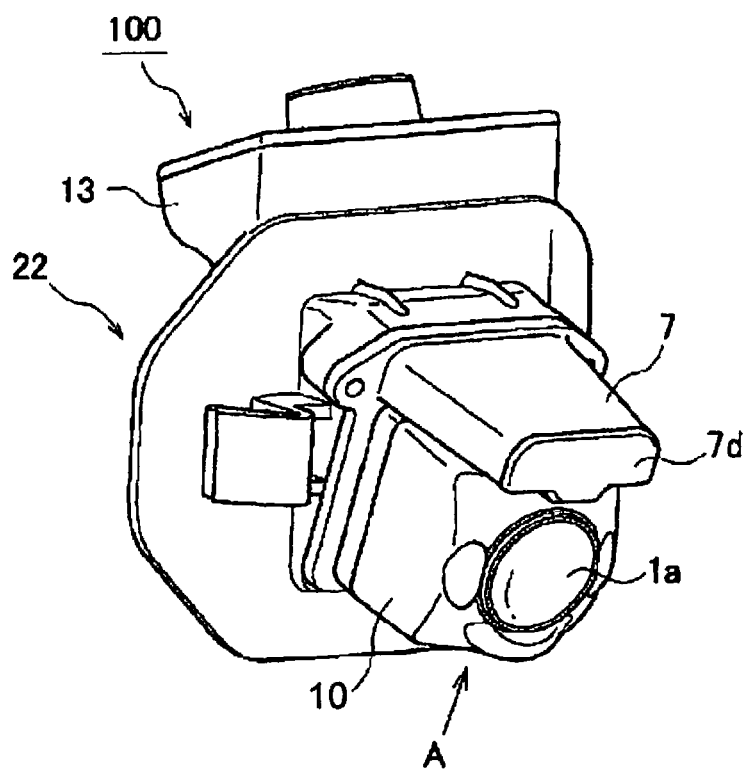
FIG. 29A is a perspective view of the configuration of a vehicle-mounted camera with a camera lens cleaning device according to another example.
Figure 29B:
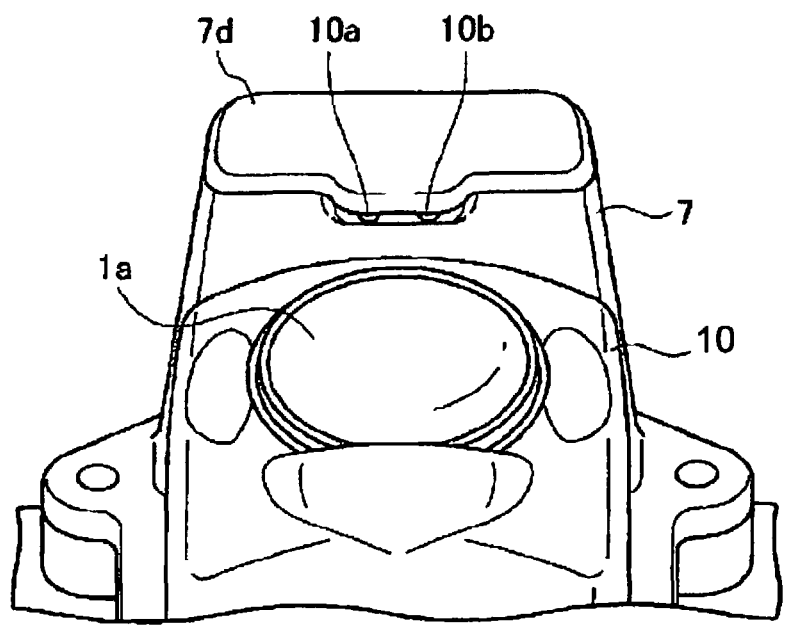
FIG. 29B is another perspective view of the configuration of the vehicle-mounted camera with the camera lens cleaning device illustrated in FIG. 29A.

FIG. 29A is a perspective view of a lens cleaning device 100 according to the present embodiment mounted to a camera 10 mounted to the rear of a vehicle, and FIG. 29B is a view of the lens cleaning device 100 of FIG. 29A from the "A" direction. As shown in FIG. 29A, a nozzle unit 22 for cleaning a lens surface 1a is anchored rearward of the vehicle near a side of the camera 10 also anchored rearward of the vehicle. The nozzle unit 22 is provided with a nozzle 7 for spraying cleaning fluid and compressed air toward the lens surface 1a, and a cap 7d. As shown in FIG. 29B, the nozzle 7 is provided at an end thereof with two outlets 10a, 10b for spraying cleaning fluid and compressed air. That is, cleaning fluid and compressed air are sprayed by the outlets 10a, 10b of the nozzle 7 toward the lens surface 1a, thereby removing foreign matter adhering to the lens surface 1a.

Figure 30:
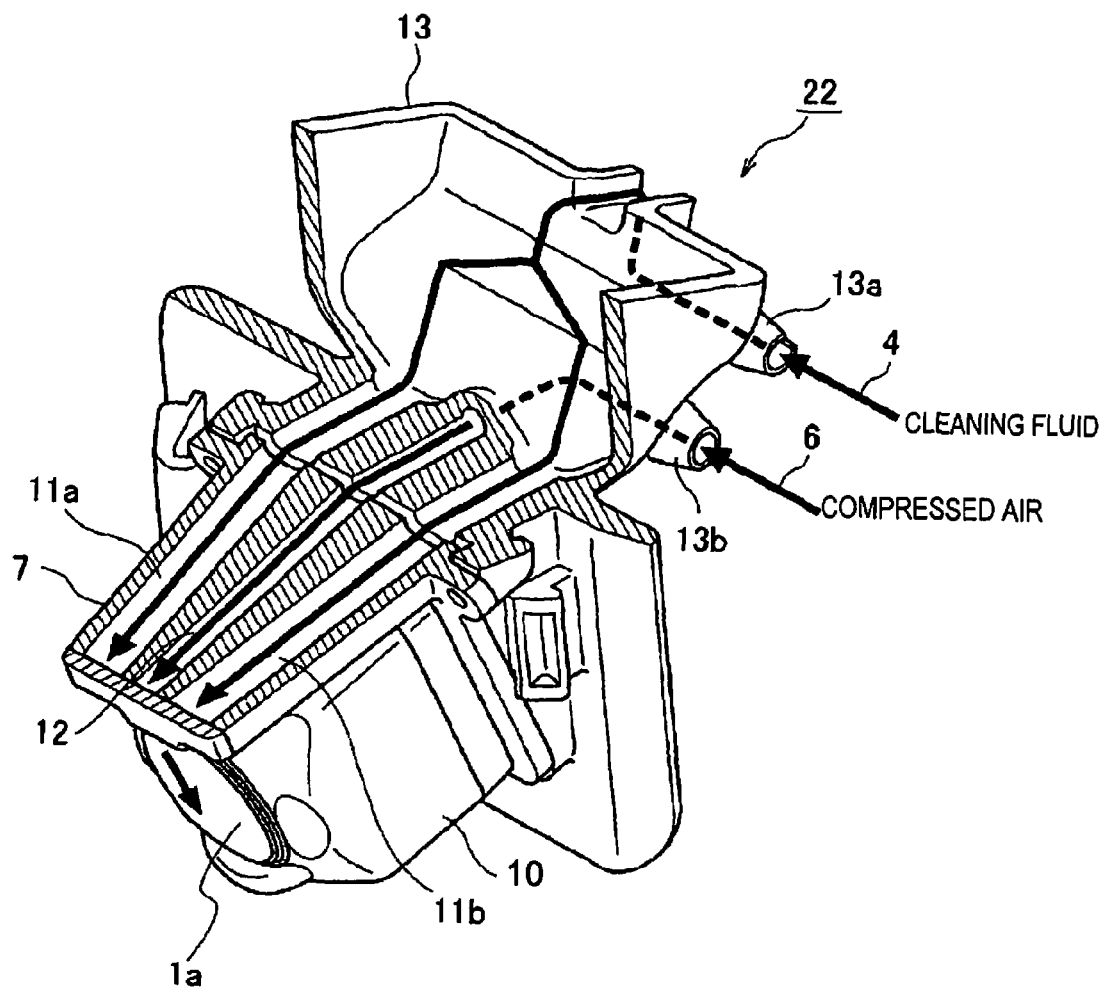
FIG. 30 is a partial cut-away perspective view of a camera unit provided in a vehicle-mounted with a camera lens camera cleaning device according to another example.

FIG. 30 is a partially cut-away perspective view of the nozzle unit 22 shown in FIG. 29(A. As shown in FIG. 30, an air channel 12 for directing compressed air is provided in a central part of the nozzle 7 provided at the end of the nozzle unit 22, and cleaning fluid channels 11a, 11b for directing cleaning fluid are provided to both the left and right sides of the air channel 12. The ends of the air channel 12 and the cleaning fluid channels 11a, 11b curve at substantially a right angle so as to face the lens surface 1a of the camera 10.

A secondary tank 13 for temporarily accumulating cleaning fluid is provided upstream of the cleaning fluid channels 11a, 11b. A plug 13a for connecting to the cleaning fluid tube 4 and a plug 13b for connecting to the cleaning fluid tube 4 are provided to the side of the secondary tank 13; of these, the plug 13b is connected to the air channel 12 via a flow path provided below the secondary tank 13. Specifically, compressed air introduced into the nozzle unit 22 via the plug 13b is conducted directly into the air channel 12.

The plug 13a is connected to the secondary tank 13, and cleaning fluid supplied via the plug 13a flows into the interior thereof from above the secondary tank 13. The tube connecting from the plug 13a to the secondary tank 13 used during this process faces in the vertical direction, as indicated by number 23 in FIG. 33B. This tube 23 will be described in detail hereafter.

As shown in FIG. 30, the bottom of the secondary tank 13 is connected to the two cleaning fluid channels 11a, 11b. Thus, compressed air sent out by the air pump 5 shown in FIG. 28 is directed through the air tube 6 into the air channel 12 of the nozzle 7, while cleaning fluid sent out by the cleaning fluid pump 3 is accumulated in the secondary tank 13, then directed into the two cleaning fluid channels 11a, 11b.

Figure 31A:
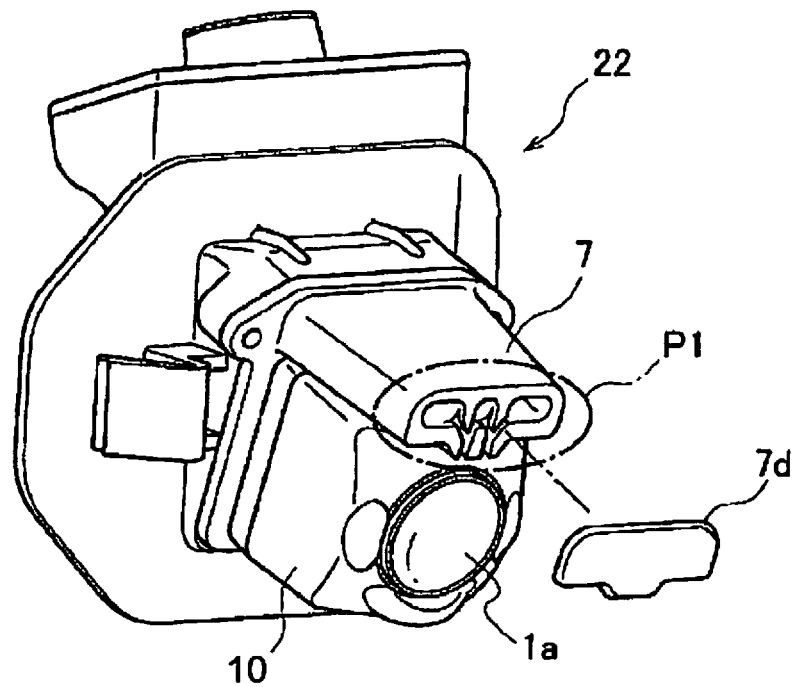
FIG. 31A is a cross-sectional view of a nozzle end section provided in a vehicle-mounted camera with a camera lens cleaning device according to another example.
Figure 31B:
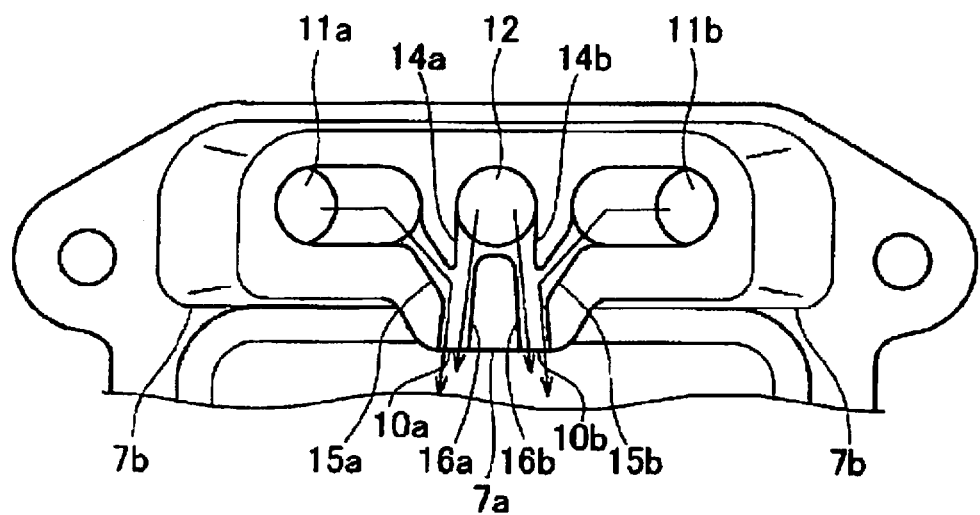
FIG. 31B is an enlarged cross-sectional view of the nozzle end section illustrated in FIG. 31A of the vehicle-mounted camera with the camera lens cleaning device.

FIG. 31B is an illustration of a detailed configuration of a nozzle end section, showing a cross-sectional view of the part indicated by number P1 in FIG. 31A. As shown in FIG. 31B, the air channel 12 is provided in the center of the end of the nozzle 7, and the two cleaning fluid channels 11a, 11b are provided so as to sandwich the air channel 12 therebetween.

The cleaning fluid channels 11a, 11b are connected to end sections 15a, 15b, the end sections 15a, 15b having a flow path area that is less than that of the cleaning fluid channels 11a, 11b. As a result, the cleaning fluid flowing through the cleaning fluid channels 11a, 11b increases in speed in the end sections 15a, 15b.

Meanwhile, the end of the air channel 12 branches into two end sections 14a, 14b. The end sections 14a, 14b have a flow path area that is less than that of the air channel 12. As a result, compressed air flowing through the air channel 12 increases in speed when passing through the end sections 14a, 14b.

The end section 15a of the one cleaning fluid channel 11a and the one end section 14a of the air channel 12 merge to form a merged flow path 16a, the end of which forms an outlet 10a (see FIG. 29B). The end section 15b of the other cleaning fluid channel 11b and the other end section 14b of the air channel 12 merge to form a merged flow path 16b, the end of which forms an outlet 10b (FIG. 29B). The merged flow path 16a and the merged flow path 16b face directions fanning outward toward a distal end.

Figure 32:
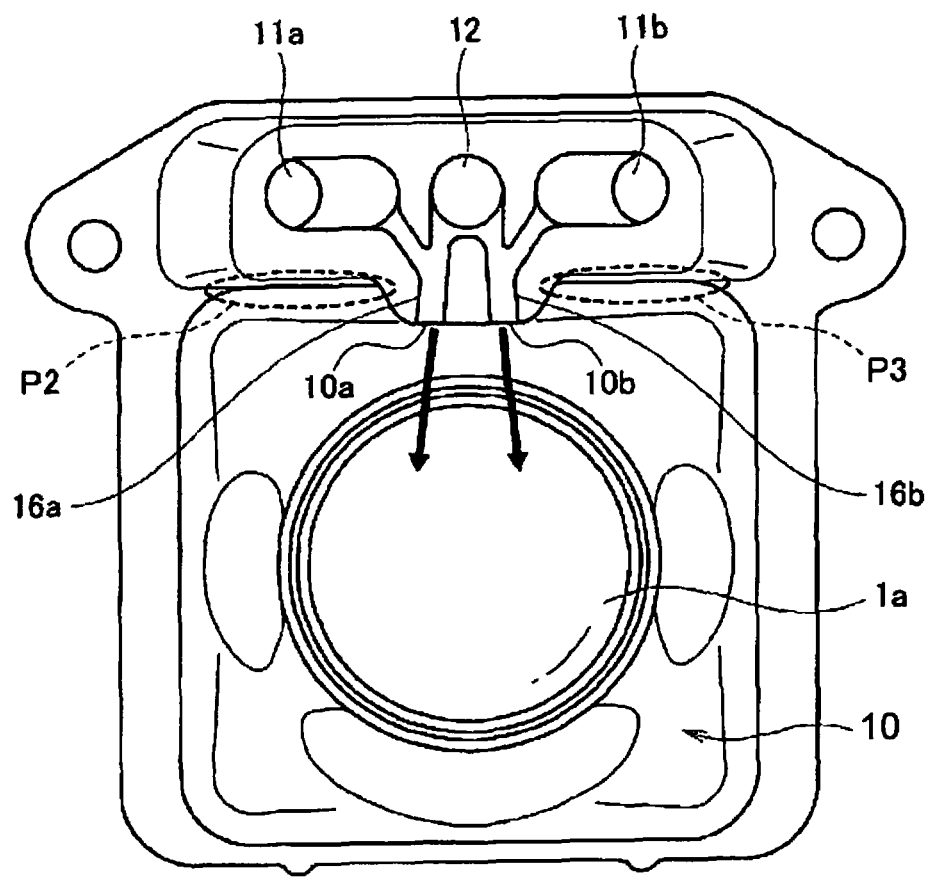
FIG. 32 is a view illustrating the relative disposition of a nozzle end section and a camera provided in a vehicle-mounted camera cleaning device according to another example.

Thus, cleaning fluid sent out by the cleaning fluid pump 3 shown in FIG. 28 is accumulated in the secondary tank 13, and, when compressed air is sent out by the air pump 5, the compressed air is sprayed at an increased flow speed, with the spraying compressed air creating negative pressure in the cleaning fluid channels 11a, 11b and drawing out the cleaning fluid accumulated in the secondary tank 13. Thus, the compressed air and cleaning fluid are sprayed out of the outlets 10a, 10b via the two merged flow paths 16a, 16d onto the lens surface 1a. The liquid mixture of cleaning fluid and compressed air is sprayed in an outward fanning direction, as shown in FIG. 32, allowing the entire surface of the lens surface 1a to be cleaned.

As shown in FIG. 31B, a sprayed surface 7a at the end of the nozzle 7 projects further forward than a surrounding side surface 7b. This arrangement makes it possible to prevent cleaning fluid sprayed from the outlets 10a, 10b from adhering to the side surface 7b of the nozzle 7. Specifically, it is possible to prevent cleaning fluid from adhering to the areas labeled P2 and P3 in FIG. 32.

Figure 33A:
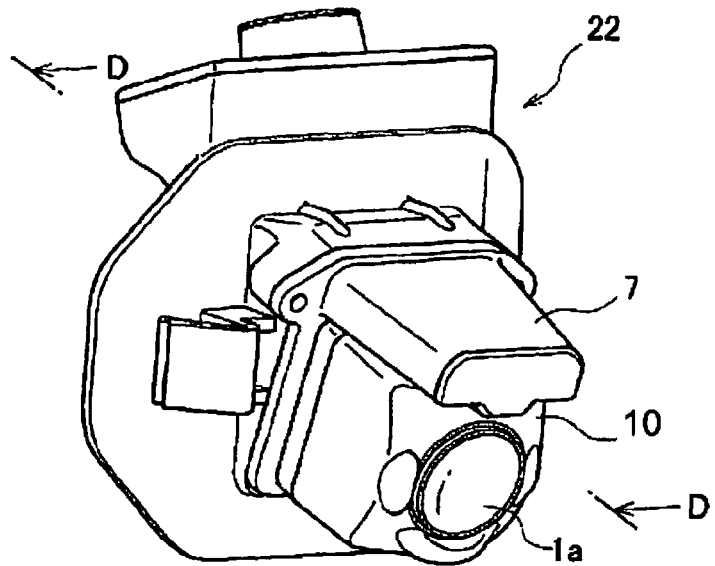
FIG. 33A is a perspective view of a vehicle-mounted camera with a camera lens cleaning device according to another example.
Figure 33B:
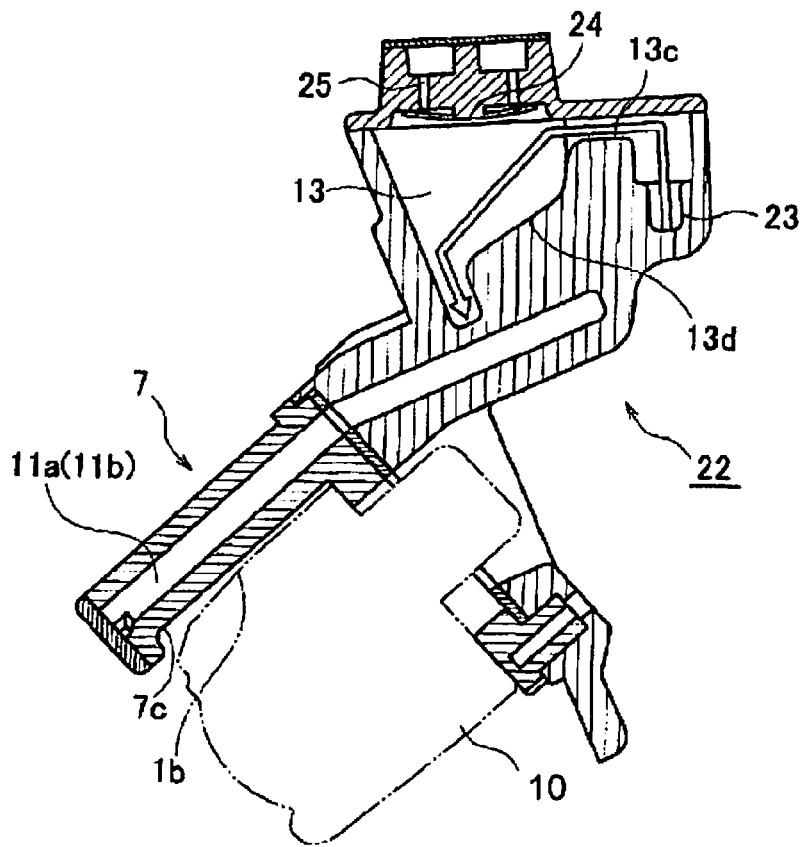
FIG. 33B is a cross-sectional view of a nozzle unit of the vehicle-mounted camera with the camera lens cleaning device illustrated in FIG. 33B.

FIG. 33B is a cross-sectional view of the nozzle unit 22 shown in FIG. 33A as seen from direction "D". As shown in FIG. 33B, there is a slight gap provided between a bottom surface 7c of the nozzle 7 and an upper surface 1b of the camera 10. The width of the gap decreases toward the interior. Thanks to this arrangement, even if cleaning fluid enters between the bottom surface 7c of the nozzle 7 and the upper surface 1b of the camera 10, the cleaning fluid is gradually pushed into the interior of the gap between the nozzle 7 and the camera 10 by surface tension, and is released to the exterior at the left and right sides of the camera 10 as seen head-on. In other words, the presence of the slight gap between the bottom surface 7c of the nozzle 7 and the upper surface 1b of the camera 10 allows problems such as cleaning fluid collecting and solidifying to be avoided.

As shown in FIG. 33B, a supply mouth 13c for supplying the cleaning fluid within the secondary tank 13 provided upstream of the nozzle 7 is provided in an upper part of the secondary tank 13, and a pipe 23 facing the vertical direction is provided in the supply mouth 13c. The pipe 23 is connected to the plug 13a shown in FIG. 30. Having the pipe 23 face in the vertical direction prevents cleaning fluid accumulated in the pipe from irregularly flowing into the secondary tank 13 when the supply of cleaning fluid from the cleaning fluid pump 3 (FIG. 28) has been stopped. In other words, it is possible to prevent cleaning fluid from flowing into the secondary tank 13 due to vibration or the like when the secondary tank 13 is empty.

A check valve 24 is provided on an upper surface of the secondary tank 13. The check valve 24 is, e.g., an umbrella valve, and is configured so that the valve opens and air from the exterior enters through a ventilation hole 25 when the pressure within the secondary tank 13 is negative, and the valve closes and release to the exterior is blocked when the pressure within the secondary tank 13 is positive.

As shown in FIG. 33B, a bottom surface 13d of the secondary tank 13 is slanted forward (i.e., to the left in the drawing) and downward, and an outlet pipe of the secondary tank 13 and the cleaning fluid channels 11a, 11b and air channel 12 provided in the nozzle 7 (see FIG. 30) are also slanted downward and forward. This arrangement keeps cleaning fluid accumulated in the secondary tank 13 from pooling at a fixed location and flowing reliably downward due to the inclination at each position.

Figure 34:
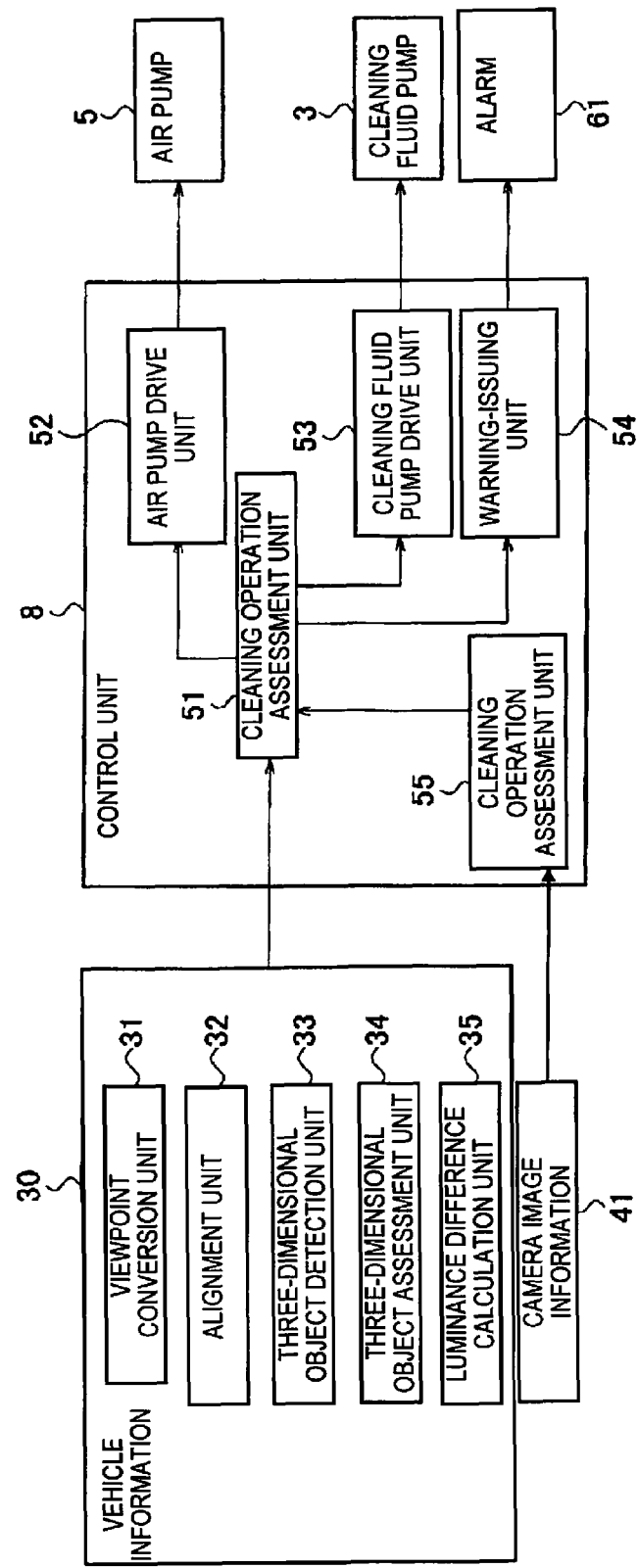
FIG. 34 is a block diagram of the detailed configuration of a control unit of a vehicle-mounted camera cleaning device according to another example.

Next, the detailed configuration of the control unit (control means) 8 shown in FIG. 28 will be described with reference to the block diagram shown in FIG. 34. As shown in FIG. 34, a control unit 8 is connected to a control unit installed in the vehicle, acquires different types of vehicle information in the form of host vehicle speed information 31, wiper switch information 32, washer switch information 33, shift position information 34, and headlight switch information 35, as well as camera image information 41 constituting an image captured by the camera 10.

The control unit 8 comprises a contamination state assessment unit 55 (contamination state assessment means) that assesses whether there is contamination on the lens surface 1a of the camera 10 based on the camera image information 41, and a cleaning operation assessment unit 51 for assessing the cleaning mode (details to be described hereafter) of the lens surface 1a based on the various types of vehicle information. Also provided are an air pump drive unit 52 for controlling the driving of the air pump 5, a cleaning fluid pump drive unit 53 for controlling the driving of the cleaning fluid pump 3, and a notice-issuing unit 54 that outputs a notice signal when an anomaly occurs during the cleaning operation, all based on the cleaning mode assessed by the cleaning operation assessment unit 51. The control unit 8 is connected to an alarm 61 that issues notice that a warning has been generated when the notice-issuing unit 54 outputs a notice signal.

Next, the various cleaning modes set, as appropriate, according to the results assessed by the cleaning operation assessment unit 51 will be described. In the present embodiment, three modes are set: a pressure cleaning mode in which cleaning fluid and compressed air are sprayed to wash the lens surface 1a, an air blowing mode in which only compressed air is blown to remove droplets adhering to the lens surface 1a, and a continuous rinsing mode in which cleaning fluid is intermittently dispensed dropwise onto the lens surface 1a to impede the adhesion of contamination thereto. One of these three modes is selected and executed, as appropriate, according to the contamination state of the lens surface 1a and other conditions such as weather conditions, effectively cleaning the camera 10.

First, the pressure cleaning mode will be described. In the pressure cleaning mode, the cleaning fluid pump 3 is driven for a short length of time in response to control performed by the cleaning fluid pump drive unit 53 shown in FIG. 34, accumulating cleaning fluid in the secondary tank 13, and, simultaneously, the air pump 5 is driven in response to control performed by the air pump drive unit 52. Specifically, as shown in parts (a) and (b) of FIG. 36, the cleaning fluid pump 3 and the air pump 5 are both driven at time to.

Then, for a length of time t0-t1 (for example, 200 msec), cleaning fluid stored in the cleaning fluid reservoir tank 2 is supplied to the secondary tank 13 via the cleaning fluid tube 4, accumulating cleaning fluid in the secondary tank 13. The length of time t0-t1 is set to the time necessary for the cleaning fluid pump 3 to completely fill the secondary tank 13 with cleaning fluid.

The compressed air sent out by the air pump 5 is directed via the air tube 6 into the air channel 12 within the nozzle 7 shown in FIG. 30, after which the compressed air is sent from the end sections 14a, 14b shown in FIG. 31B to the merged flow paths 16a, 16b. Because the end sections 14a, 14b have a smaller flow path area than the air channel 12, the flow speed of the air increases in the end sections 14a, 14b. Negative pressure is thus created in the end sections 15a, 15b of the cleaning fluid channels 11a, 11b downstream of the merged flow paths 16a, 16b, cleaning fluid stored in the secondary tank 13 is drawn out, and the cleaning fluid so drawn out flows through the cleaning fluid channels 11a, 11b into the merged flow paths 16a, 16b.

As a result, the cleaning fluid is sprayed in a mist form along with the compressed air from the merged flow paths 16a, 16b. It is thus possible to spray the cleaning fluid in mist form from the outlets 10a, 10b at the ends of the merged flow paths 16a, 16b onto the lens surface 1a. This allows foreign matter adhering to the lens surface 1a to be removed through the synergistic effects of the misted cleaning fluid and air pressure.

When the cleaning fluid in the secondary tank 13 is sprayed and is entirely spent at time t2 shown in part (b) of FIG. 36, only compressed air is subsequently sprayed from time t2 to time t3, allowing droplets adhering to the lens surface 1a to be removed by the compressed air.

In other words, in the pressure cleaning mode, the air pump 5 (compressed air supply means) is operated, compressed air is sprayed from the outlets 10a, 10b, the negative pressure created by the spraying of the compressed air causes the cleaning fluid supplied to the cleaning fluid channels 11a, 11b to be drawn out and sprayed from the outlets 10a, 10b, and the sprayed compressed air and cleaning fluid cleans the lens surface 1a. This pressure cleaning mode is suited for removing foreign matter such as mud adhering to the lens surface 1a.

Figure 36:
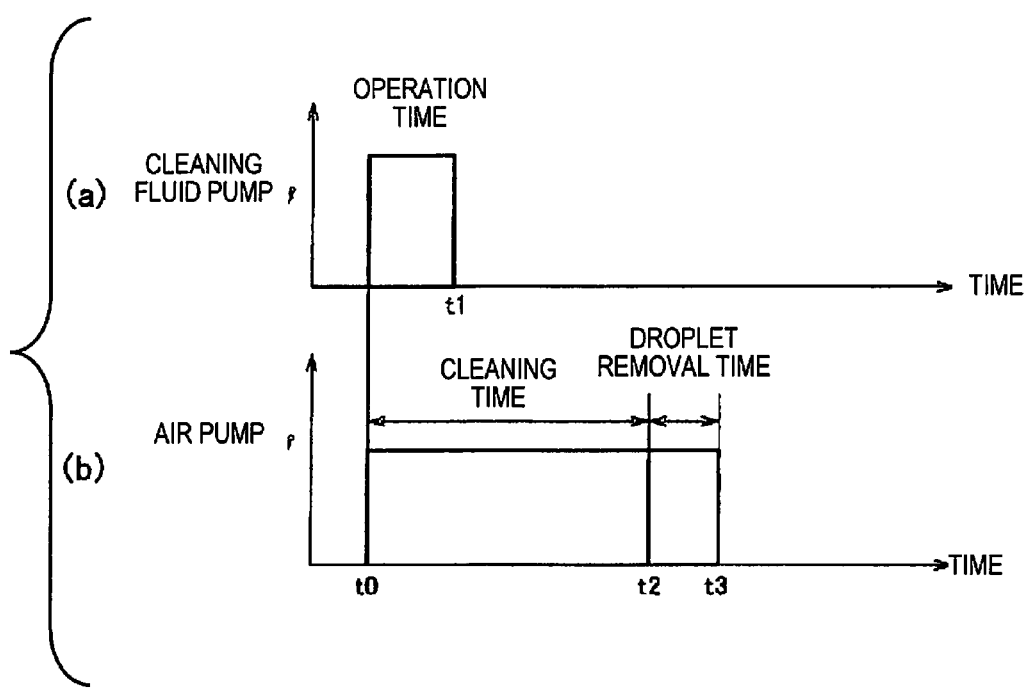
FIG. 36 is a timing chart showing the process of a pressure cleaning mode executed by a vehicle-mounted camera cleaning device according to another example.

Setting a longer drive time for the cleaning fluid pump 3 as shown in part (a) of FIG. 36 (for example, having t0-t1 be 400 msec) allows cleaning fluid accumulated in the secondary tank 13 to be expelled by the pressure of the cleaning fluid pump 3 and cleaning fluid to be supplied to the cleaning fluid channels 11a, 11b under pressure, allowing for high pressure cleaning of the lens surface 1a.

Figure 37:
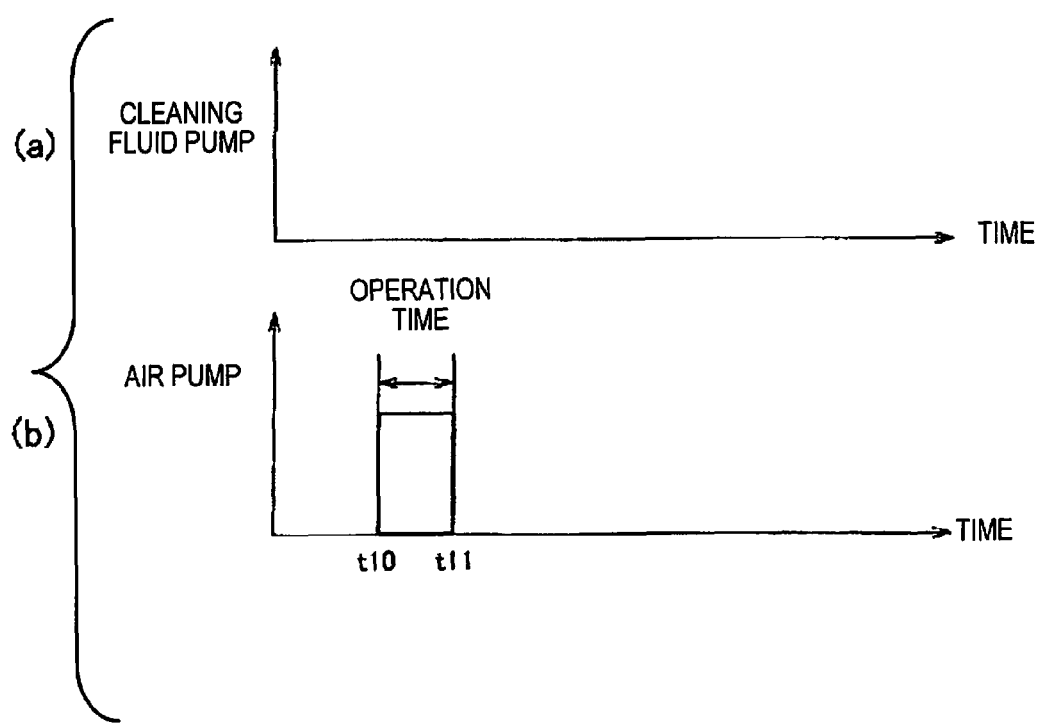
FIG. 37 is a timing chart showing the process of an air blowing mode executed by a vehicle-mounted camera cleaning device according to another example.

Next, the air blowing mode will be described. In the air blowing mode, with no cleaning fluid accumulated in the secondary tank 13, the air pump drive unit 52 shown in FIG. 34 is controlled, and only the air pump 5 is driven. Specifically, as shown in part (a) of FIG. 37, the cleaning fluid pump 3 is stopped, and, as shown in part (b) of FIG. 37, the air pump 5 is driven for a length of time t10-t11 (for example two seconds). Compressed air is then sprayed from the outlets 10a, 10b via the end sections 14a, 14b of the air channel 12 and the merged flow paths 16a, 16b onto the lens surface 1a. Droplets adhering to the lens surface 1a of the camera 10 can thus be removed by the pressure of the air.

Because the pipe 23 coupled to the secondary tank 13 faces in substantially the vertical direction, as shown in FIG. 33, and the bottom surface 13d of the secondary tank 13 and the cleaning fluid pipe are slanted downwards, there is no residual cleaning fluid with the secondary tank 13 or the pipe thereof. Cleaning fluid can thus be prevented from being directed into the merged flow paths 16a, 16b even if compressed air is being sprayed and there is negative pressure within the secondary tank 13, preventing cleaning fluid from mixing with the compressed air. It is therefore possible to avoid problems such as cleaning fluid mixed in with the compressed air adhering to the lens surface 1a when the compressed air is being sprayed in order to remove droplets adhering from the lens surface 1a. In other words, in the air blowing mode, compressed air is supplied to the air tube 6 by the air pump 5 (compressed air supply means) while the supply of cleaning fluid is cut off, and compressed air is sprayed from the outlets 10a, 10b, thereby cleaning the lens surface 1a. The air blowing mode is suited to removing droplets adhering to the lens surface 1a.

Figure 38:
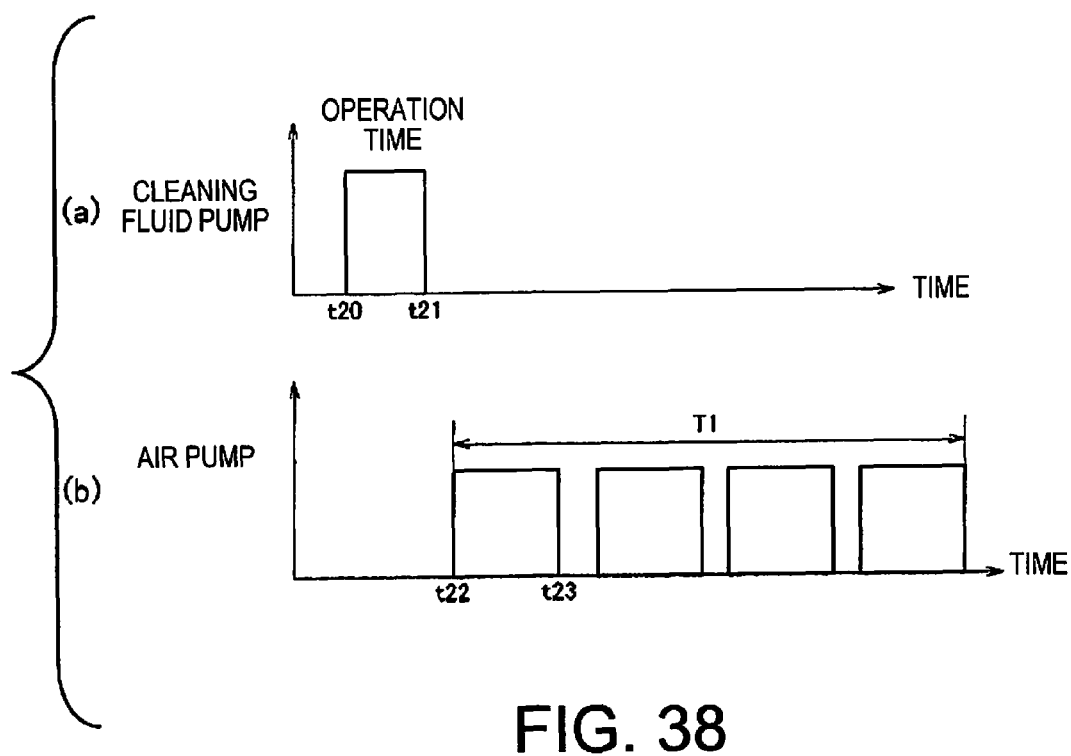
FIG. 38 is a timing chart showing the process of a continuous rinsing mode executed by a vehicle-mounted camera cleaning device according to another example.

Next, the continuous rinsing mode will be described. In continuous rinsing mode, cleaning fluid is supplied from the cleaning fluid pump 3 into the secondary tank 13 as the result of control performed by the cleaning fluid pump drive unit 53, and the air pump 5 is intermittently driven as the result of control performed by the air pump drive unit 52, thereby dispensing cleaning fluid onto the lens surface 1a. Specifically, as shown in FIG. 38, the cleaning fluid pump 3 is driven during the time interval t20-t21 to accumulate cleaning fluid in the secondary tank 13, after which the air pump 5 is intermittently driven at time t22 over a length of time T1, thereby dispensing cleaning fluid bit by bit onto the lens surface 1a. Small amounts of cleaning fluid (for example, 0.25 cc) are dispensed at a time onto the lens surface 1a at a time interval, for example, of t22-23.

The lens surface 1a can thus be kept in a perpetually moistened state, allowing contamination components contained in water kicked up by the vehicle during rainy weather to be kept from being separated out. In other words, in the continuous rinsing mode, compressed air is intermittently sprayed from the outlets 10*a*, 10*b* multiple times, the negative pressure created by spraying the compressed air draws out cleaning fluid, and the cleaning fluid is sprayed from the outlets 10*a*, 10*b* onto the lens surface 1*a*. This continuous rinsing mode is suited to keeping the lens surface 1*a* in a moistened state during rainy weather and keeping contamination components from being precipitated out onto the lens surface 1*a*.

Using the lens cleaning device 100 according to the second embodiment configured as described above allows the predetermined cleaning steps described in the context of the first embodiment to be executed under the control of the control 110.

Figure 35:
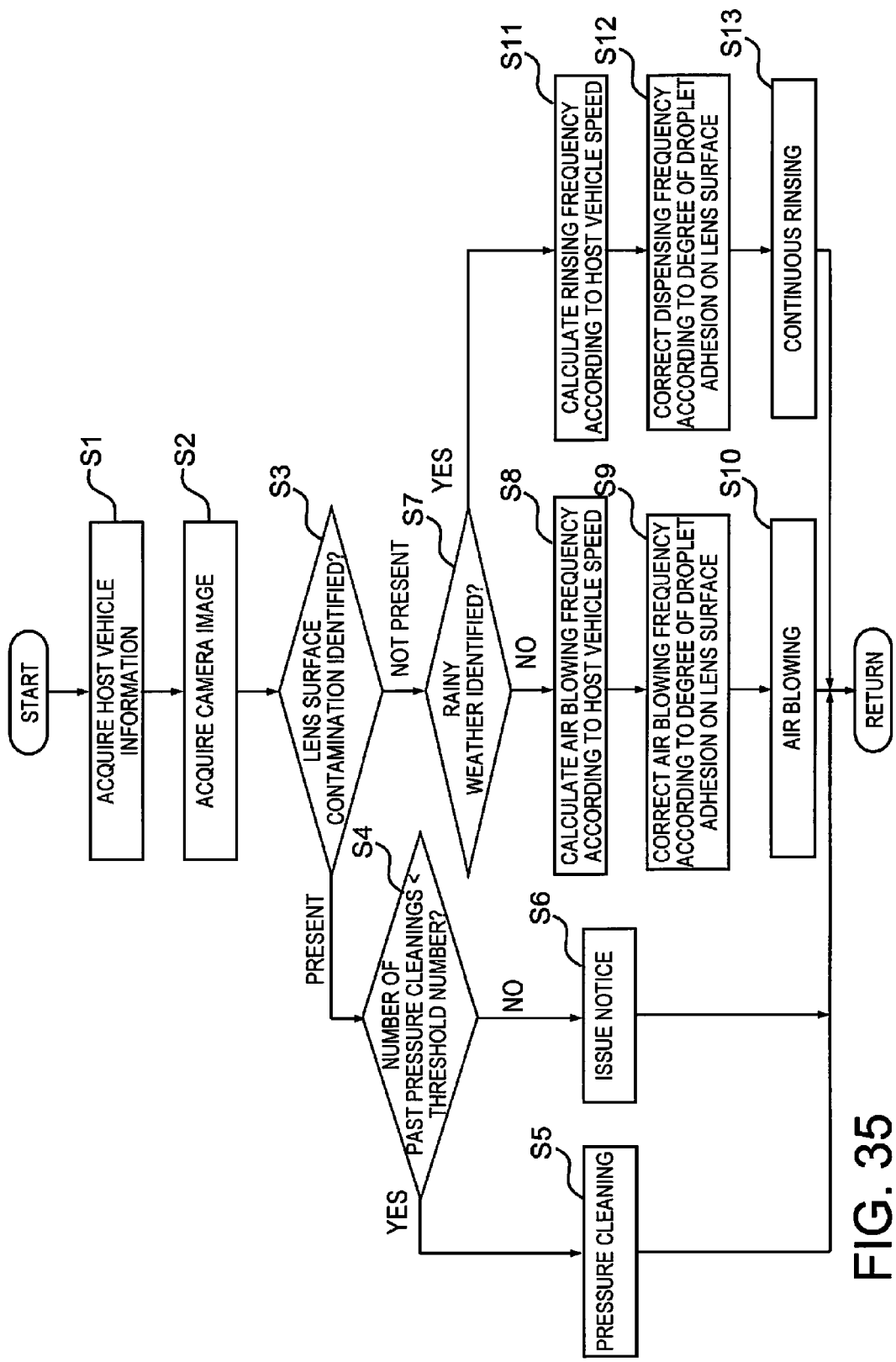
FIG. 35 is a flowchart of a process procedure for a vehicle-mounted camera cleaning device according to another example.

Next, the operation of the vehicle-mounted camera lens cleaning device 100 according to the present embodiment configured as described above will be described with reference to the flowchart shown in FIG. 35. FIG. 35 shows a process procedure, performed by the control unit 8, which is executed according to a predetermined computation cycle. First, in step S1, the cleaning operation assessment unit 51 of the control unit 8 acquires host vehicle information. Specifically, the unit acquires the various types of vehicle information 30 shown in FIG. 34, i.e., the host vehicle speed information 31, the wiper switch information 32, the washer switch information 33, the shift position information 34, and the headlight switch information 35.

In step S2, the contamination state assessment unit 55 of the control unit 8 acquires camera image information 41.

In step S3, the contamination state assessment unit 55 assesses whether contamination is present on the lens surface 1*a* based on the camera image. The presence or lack of contamination can be assessed by performing a predetermined image process upon the captured image, and assessing whether there are any locations of light blockage. When assessing lens surface 1*a* contamination, it is also possible to assess whether it is day or night based on the headlight switch information 35, and alter the contamination assessment conditions according to whether it is day or night. Performing this process allows for higher precision contamination assessment. If contamination is present (step S3: "PRESENT"), the process proceeds to step S4; if not, (step S3: "NOT PRESENT"), the process continues to step S7.

In step S4, the cleaning operation assessment unit 51 assesses whether the number of times pressure cleaning was performed in the past is less than a predetermined threshold number of times (for example, three times). If the number of times is less than the threshold (step S4: YES), the cleaning operation assessment unit 51 cleans the lens surface 1*a* in pressure cleaning mode in step S5. Specifically, the air pump 5 is driven by the air pump drive unit 52 and the cleaning fluid pump 3 is driven by the cleaning fluid pump drive unit 53, thereby spraying cleaning fluid and compressed air from the outlets 10*a*, 10*b* of the nozzle 7 and cleaning off contamination adhering to the lens surface 1*a*.

Meanwhile, if the number of times pressure cleaning was performed in the past is equal to or greater than the threshold (step S4: NO), it is assessed that the contamination on the lens surface 1*a* has not been removed despite cleaning having been performed in pressure cleaning mode for the threshold number of times; thus, the notice-issuing unit 54 outputs a warning signal in step S6. As a result, a warning is issued by the alarm 61, making it possible to bring to the driver's attention that the contamination on the lens surface 1*a* has not been removed.

If it is assessed, during the process of step S3, that there is no contamination on the lens surface 1*a*, it is assessed in step S7 whether the current weather conditions are rainy. This process is based, for example, on the wiper switch information 32: if the wipers are being operated, the weather is assessed as being rainy. If it is assessed to be rainy weather, the process proceeds to step S8; if not, the process continues to step S11.

In step S8, the cleaning operation assessment unit 51 calculates an air blowing frequency according to the speed of the host vehicle. Specifically, data indicating the relationship between vehicle speed and cleaning frequency in air blowing mode is pre-saved in memory (not shown) belonging to the control unit 8, and, when the host vehicle speed information 31 shown in FIG. 34 referring to this data is acquired, the air blowing mode cleaning frequency is set according to the host vehicle speed information. For example, the frequency for the vehicle when traveling at maximum speed is set to a maximum frequency of every two seconds, the frequency for the vehicle when stopped is set to a minimum frequency of every two minutes, and frequencies for intermediate speeds are assessed via linear interpolation. In other words, the faster the vehicle is traveling, the higher the air blowing mode cleaning frequency is set.

In step S9, the cleaning operation assessment unit 51 detects the amount of droplets adhering to the lens surface 1*a*, and corrects the air blowing mode cleaning frequency according to that amount. Specifically, a coefficient of "1" is set if the droplets adhering to the lens surface 1*a* are of a standard size, a coefficient of greater than 1 is set if the droplets are larger than the standard size, and a coefficient of less than 1 is set if the droplets are smaller than the standard size, and the air blowing mode cleaning frequency is corrected.

In step S10, the cleaning operation assessment unit 51 cleans the lens surface 1*a* in air blowing mode. Specifically, a control command is outputted to the air pump drive unit 52, causing the air pump 5 to be operated and compressed air to be sent out. It is thus possible to spray compressed air from the outlets 10*a*, 10*b* via the end sections 14*a*, 14*b* of the air channel 12 and clean the lens surface 1*a*, removing droplets adhering to the lens surface 1*a*. This cleaning in air blowing mode is repeatedly executed at a set time interval according to the set frequency.

Meanwhile, if it is assessed in the process of step S7 that weather conditions are rainy (step S7: YES), the cleaning operation assessment unit 51 assesses the cleaning fluid dispensing frequency according to the speed of the host vehicle in step S11. Specifically, data indicating the relationship between vehicle speed and cleaning frequency in continuous rinsing mode is pre-saved in memory (not shown) belonging to the control unit 8, and, when the host vehicle speed information 31 shown in FIG. 34 is acquired referring to this data, the continuous rinsing mode cleaning frequency is set according to the host vehicle speed information. For example, the frequency for the vehicle when traveling at maximum speed is set to a maximum frequency of every ten seconds, the frequency for the vehicle when stopped is set to a minimum frequency of every twenty seconds, and frequencies for intermediate speeds are assessed via linear interpolation. In other words, the faster the vehicle is traveling, the higher the continuous rinsing mode cleaning frequency is set.

In step S12, the cleaning operation assessment unit 51 detects the amount of droplets adhering to the lens surface 1*a*, and corrects the continuous rinsing mode cleaning frequency according to that amount. Specifically, a coefficient of "1" is set if the droplets adhering to the lens surface 1a are of a standard size, a coefficient of greater than 1 is set if the droplets are larger than the standard size, and a coefficient of less than 1 is set if the droplets are smaller than the standard size, and the continuous rinsing mode cleaning frequency is corrected.

In step S13, the cleaning operation assessment unit 51 cleans the lens surface 1a in continuous rinsing mode. It is thus possible to spray cleaning fluid from the outlets 10a, 10b, dispensing the fluid onto the lens surface 1a, and effectively prevent contamination from adhering to the lens surface 1a. This cleaning in continuous rinsing mode is repeatedly executed at a set time interval according to the set frequency.

In this way, one of the various cleaning modes is selected as appropriate according to the contamination state of the lens surface 1a and weather conditions, i.e., whether the weather conditions are rainy, allowing the lens surface 1a of the camera 10 to be cleaned using the optimal cleaning mode for those conditions. In the process described above, it is acceptable for the current shift position to be acquired from the shift position information 34, and the various cleaning mode operations to be executed only when the vehicle is in the D (drive) range and traveling at or above a predetermined speed (such as 30 km/h).

In the vehicle-mounted camera lens cleaning device 100 according to the present embodiment, as described above, the air channel 12 is provided at the end of the nozzle 7, the cleaning fluid channels 11a, 11b are provided near the air channel 12, and the end sections 14a, 14b of the air channel 12 and the end sections 15a, 15b of the cleaning fluid channels 11a, 11b are made to merge. Thus, by selecting continuous rinsing mode, in which the air pump 5 is intermittently operated multiple times (for example, four times) to supply compressed air to the air channel 12 with cleaning fluid having been accumulated in the secondary tank 13 through the operation of the cleaning fluid pump 3, and spraying compressed air from the end sections 14a, 14b, it is possible to create negative pressure in the cleaning fluid channels 11a, 11b, draw cleaning fluid out of the secondary tank 13, and intermittently spray cleaning fluid through the merged flow paths 16a, 16b. By atomizing and spraying particles of cleaning fluid via waves of air, it is possible to efficiently clean the lens surface 1a with a small amount of cleaning fluid.

It is also possible to keep the lens surface 1a in a state of being moistened by the cleaning fluid, impeding the adhesion of contamination to the lens surface 1a. Moreover, because intermittent rinsing is performed using the cleaning fluid stored in the secondary tank 13, the amount of cleaning fluid used to perform cleaning can be reduced.

By spraying cleaning fluid onto the lens surface 1a using continuous rinsing mode when the weather conditions are rainy, it is possible to prevent contamination from adhering to the lens surface 1a due to mud, rain, or the like being kicked up. Moreover, the continuous rinsing frequency increases as the speed of the vehicle increases, allowing cleaning fluid to be sprayed as appropriate according to speed.

By operating the air pump 5 when the cleaning fluid supply is cut off, compressed air can be sprayed in air blowing mode, allowing for the removal of water adhering to the lens surface 1a. By selecting air blowing mode when there is no contamination on the lens surface 1a and weather conditions are rainy, rainwater adhering to the lens surface 1a after being kicked up by the vehicle while traveling can be reliably removed, allowing the camera 10 to capture a clear image. Because the air blowing mode cleaning frequency increases as vehicle speed increases, droplets can be removed as appropriate according to the speed.

By supplying compressed air to the air channel 12 and spraying the air from the end sections 14a, 14b, it is possible to perform pressure cleaning mode, in which negative pressure is created in the cleaning fluid channels 11a, 11b, drawing the cleaning fluid out and mixing the cleaning fluid and the compressed air in the merged flow paths 16a, 16b, after which the mixture is sprayed onto the lens surface 1a. It is thus possible to render the cleaning fluid into a mist, allowing the amount of cleaning fluid needed for cleaning to be reduced. When contamination forms on the lens surface 1a, cleaning is performed in the cleaning mode, allowing any contamination forming on the lens surface 1a to be immediately cleaned off.

Moreover, a warning is issued if the contamination is not removed despite cleaning being performed in pressure cleaning mode a predetermined number of times, making it possible to call the driver's attention to the presence of contamination on the lens surface 1a.

In the vehicle-mounted camera lens cleaning device 100 according to the present embodiment, one of pressure cleaning mode, air blowing mode, and continuous rinsing mode is selected as appropriate to clean the lens surface 1a, allowing the lens surface 1a to be cleaned according to a mode suited to the driving conditions.

The foregoing has been a description of the vehicle-mounted camera lens cleaning device according to the present invention based on the illustrated embodiment, but the present invention is not limited thereto, and the configurations of the various parts thereof can be replaced with any desired configuration exhibiting similar functionality.

For example, in the embodiment described above, an example was described in which one air channel 12 and two cleaning fluid channels are provided within the nozzle 7 and these are merged to form two merged flow paths 16a, 16b, but the present invention is not limited to such an arrangement, and an arrangement in which one or more air channels and one or more cleaning fluid channels merge at an end section is also possible.

In the embodiment described above, the compressed air and cleaning fluid merge at the end of the nozzle 7, but the present invention is not limited to such an arrangement, and an arrangement is also possible in which the air channel and the cleaning fluid channel are disposed in proximity to each other, and the negative pressure created when compressed air is expelled from the air channel is used to mist and spray the cleaning fluid supplied from the cleaning fluid channel. In this case, the end sections 14a, 15a and 14, 15b shown in FIG. 31B do not merge, and spraying is performed from these end sections in proximity.

The three-dimensional object detection device 1 according to the present embodiment of the present invention, which is configured and operates as described above, yields the following effects.

(1) In accordance with the three-dimensional object detection device 1 of the present embodiment, when the lens 11 is cleaned using the cleaning fluid, the three-dimensional object detection process and assessment process are suppressed, depending on the wetness of the lens, so that detection results or assessment results from before the lens was cleaned are maintained, thereby preventing mistaken assessments such as an already detected three-dimensional object changing to being undetected as the result of the lens cleaning process, or an undetected three-dimensional object changing to being detected as the result of the lens cleaning process. This allows for the prevention of reductions in the precision of the detection results caused by the lens 11 being cleaned, allowing for the provision of a three-dimensional object detection device 1 that detects other vehicles traveling in the detection areas at a high level of precision. This effect is similarly exhibited whether other vehicles VX are detected using differential waveform information or using edge information.

(2) In accordance with the three-dimensional object detection device 1 of the present embodiment, immediately preceding detection results are retained for a predetermined length of time and assessments of whether detected three-dimensional objects are other vehicles VX and output thereof is interrupted for a predetermined length of time only when a three-dimensional object was detected before a state subject to control was entered as the result of the lens being cleaned, thereby allowing another vehicle VX to be detected at high precision based on highly reliable detection/assessment results indicating that another vehicle VX was detected from before the effects of lens cleaning are felt.

(3) In accordance with the three-dimensional object detection device 1 of the present embodiment, during the process of detecting three-dimensional objects using differential waveform information, a process that minimizes misdetection of other vehicles VX can be selectively executed during the lens cleaning process or in the second state subject to control, in which there is a high tendency toward reductions in the precision of detecting other vehicles VX due to cleaning fluid adhering to the lens 11, thereby making it possible to reduce processing load and avoid superfluous suppression processes. As a result, other vehicles VX can be detected with greater precision.

(4) In accordance with the three-dimensional object detection device 1 of the present embodiment, the greater the number of times air is blown, the more the effects of the amount of cleaning fluid on the lens 11 upon the differential waveform information is reduced; thus, the predetermined length of time that the detection results from immediately before the lens was assessed as being in the second state subject to control are retained can be shortened in order to prioritize real-time detection results.

(5) In accordance with the three-dimensional object detection device 1 of the present embodiment, during the process of detecting three-dimensional objects using edge information, a process that minimizes misdetection of other vehicles VX can be selectively executed during the lens cleaning process or in the first state subject to control, in which there is a high tendency toward reductions in the precision of detecting other vehicles VX due to cleaning fluid adhering to the lens 11, thereby making it possible to reduce processing load and avoid superfluous suppression processes. As a result, other vehicles VX can be detected with greater precision.

(6) In accordance with the three-dimensional object detection device 1 of the present embodiment, when it is assessed that the lens state is the third state subject to control, in which cleaning fluid moving over the lens due to the air intermittently blown during the drying step affects the change over time in differential waveform information/edge information, leading to a high tendency towards reduced precision in detecting the relative speed of three-dimensional objects, the relative speed detection process is selectively suppressed, allowing the processing load to be reduced and keeping superfluous suppression processes from being executed. As a result, other vehicles VX can be detected with greater precision.

The abovementioned camera 10 is equivalent to the camera according to the present invention, the abovementioned viewpoint conversion unit 31 is equivalent to the image conversion means according to the present invention, the abovementioned alignment unit 32 and three-dimensional object detection unit 33 are equivalent to the three-dimensional object detection means according to the present invention, the abovementioned luminance difference calculation unit 35, edge line detection unit 36, and three-dimensional object detection unit 37 are equivalent to the three-dimensional object detection means according to the present invention, the abovementioned three-dimensional object assessment unit 34 is equivalent to a three-dimensional object assessment means, the abovementioned lens state assessment unit 38 is equivalent to a lens state assessment means, the abovementioned controller 39 is equivalent to a control means, the abovementioned vehicle speed sensor 20 is equivalent to a vehicle speed sensor, and the lens cleaning device 100 is equivalent to a lens cleaning means.

The alignment unit 21 of the present embodiment aligns the positions of bird's-eye view images captured at different points in time in bird's-eye view to obtain an aligned bird's-eye view image; this "alignment" process can be performed at a level of precision suitable for the type of object being detected or the required level of detection precision. The alignment process may be a more stringent one in which positions are aligned based on identical time and positions, or a less stringent one involving merely finding coordinates in a bird's-eye view image.

The invention claimed is:

1. A three-dimensional object detection device comprising:
   a camera provided with a lens for forming a video image of an area rearward of a vehicle;
   a three-dimensional object detection unit programmed to detect a three-dimensional object rearward of the vehicle based on images captured by the camera;
   a lens cleaning device arranged to spray cleaning fluid to clean the lens of the camera;
   a lens state assessment unit programmed to assess whether the lens is in a predetermined wetness state during a lens cleaning process executed by the lens cleaning unit; and
   a controller programmed to suspend detection of the three-dimensional object for a predetermined length of time upon the lens state assessment unit assessing that the lens is in the predetermined wetness state,
   during the suspension of detection of the three-dimensional object, the controller uses a detection result obtained by the three-dimensional object detection unit immediately before the lens was assessed to be in the predetermined wetness state.

2. The three-dimensional object detection device according to claim 1, further comprising:
   an image conversion unit programmed to perform viewpoint conversion of the images obtained by the camera to bird's-eye view images; and
   a three-dimensional object assessment unit programmed to assess whether a three-dimensional object detected by the three-dimensional object detection unit is another vehicle;
   the three-dimensional object detection unit being further programmed to detect a presence of the three-dimensional object in a detection area set on each of a right side and a left side rearward of the vehicle based on differential waveform information in which the differential waveform information is generated by aligning positions of bird's-eye view images obtained at different points in time by the image conversion unit, and counting a number of pixels indicating a predetermined difference in a differential image of an aligned bird's-eye view image along a direction in which the three-dimensional object collapses when viewpoint conversion of the bird's-eye view images is performed to create a frequency distribution;

the lens cleaning device being provided with a pump for supplying cleaning fluid and a nozzle for spraying the supplied cleaning fluid onto the lens, and the lens cleaning device cleaning the lens of the camera by spraying cleaning fluid onto the lens at a predetermined timing according to a predetermined lens cleaning step; and the controller is further programmed to use a detection result obtained by the three-dimensional object detection unit or an assessment result obtained by the three-dimensional object assessment unit immediately before the lens state was assessed to be the predetermined wetness state for a predetermined length of time, thereby suppressing detection of the three-dimensional object or assessment of the three-dimensional object as being the other vehicle upon the lens state assessment unit assessing that the lens state is the predetermined wetness state.

3. The three-dimensional object detection device according to claim 1, wherein the controller is further programmed to use a detection result obtained by the three-dimensional object detection unit immediately before the lens state was assessed as being the predetermined wetness state for a predetermined length of time, upon the lens state assessment unit assessing that the lens state is the predetermined wetness state, and the controller identifying a detection state in which the three-dimensional object is being detected by the three-dimensional object detection unit immediately before the lens state is assessed as being the predetermined wetness state.

4. The three-dimensional object detection device according to claim 1, wherein the lens cleaning device is configured to clean the lens using cleaning fluid according to predetermined lens cleaning steps including a lens wetting step, a first air blowing step, a cleaning step, and a second air blowing step;

the lens state assessment unit is further programmed to assess that the lens state is a middle wetness state in which a middle amount of cleaning fluid adheres to the lens during a period of time from when the first air blowing step is begun to when the first air blowing step is complete; and the controller is further programmed to use a detection obtained by the three-dimensional object detection unit immediately before the lens state was assessed as being the middle wetness state for a predetermined length of time, upon the lens state being assessed to be the middle wetness state.

5. The three-dimensional object detection device according to claim 4, wherein the lens state assessment unit is further programmed to identify a number of times air is blown during the first air blowing step; and the controller is further programmed to set the predetermined length of time for using the detection results from immediately before the lens state was assessed as being in the middle wetness state to be shorter as the identified number of times that air is blown becomes higher.

6. The three-dimensional object detection device according to claim 1, wherein the three-dimensional object detection unit detects a three-dimensional object present in the area rearward of the vehicle based on a differential waveform information, and calculates a relative speed of the three-dimensional object based on a change over time in a waveform of a differential waveform information within the predetermined length of time;

the three-dimensional object assessment unit is further programmed to assess that the three-dimensional object is another vehicle, when the relative speed of the three-dimensional object is continuously within a predetermined value range for a predetermined length of time or longer;

the lens cleaning device is configured to clean the lens using cleaning fluid according to predetermined lens cleaning steps including a lens wetting step, a first air blowing step, a cleaning step, and a second air blowing step;

the lens state assessment unit is further programmed to assess that the lens state is a small wetness state in which a small amount of cleaning fluid adheres to the lens from when the air blowing process performed last in the first air blowing step is begun to when the process is ended, and from when the second air blowing step is begun to when the second air blowing step is completed; and the controller is further programmed to use, for a predetermined length of time, the relative speed of the three-dimensional object detected by the three-dimensional object detecting unit or the assessment result obtained by the three-dimensional object assessment unit immediately before the lens state was assessed as being the small wetness state, upon the lens state being assessed to be the small wetness state.

7. The three-dimensional object detection device according to claim 1, further comprising:

an image conversion unit programmed to perform viewpoint conversion of the images obtained by the camera to bird's-eye view images; and a three-dimensional object assessment unit programmed to assess whether a three-dimensional object detected by the three-dimensional object detection unit is another vehicle;

the three-dimensional object detection unit being further programmed to detect edge information indicating that there is a luminance difference between adjacent image areas of equal to or greater than a predetermined threshold value along a direction of collapse of a three-dimensional object when viewpoint conversion to the bird's-eye view images is performed in the bird's-eye view images obtained by the image conversion unit, and the three-dimensional object detection unit being programmed to detect a presence of the three-dimensional object a three-dimensional object based on the edge information;

the lens cleaning device being provided with a pump for supplying cleaning fluid and a nozzle for spraying the supplied cleaning fluid onto the lens, the lens cleaning device cleaning the lens of the camera by spraying cleaning fluid onto the lens at a predetermined timing according to a predetermined lens cleaning step; and the controller is further programmed to use, for a predetermined length of time, a detection result obtained by the three-dimensional object detection unit or an assessment result obtained from three-dimensional object assessment unit immediately before the lens state was assessed to be the predetermined wetness state, thereby suppressing detection of the three-dimensional object or assessment of the three-dimensional object as being the other vehicle upon the lens state assessment unit assessing that the lens state is the predetermined wetness state.

8. The three-dimensional object detection device according to claim 7, wherein the controller is further programmed to use the detection result from immediately before the lens state was assessed as being the predetermined wetness state for a predetermined length of time, upon the lens state assessment unit assessing that the lens state is the predetermined wetness state, and the control identifying a detection state in which the three-dimensional object is being detected by the three-dimensional object detection unit immediately before the lens state is assessed as being the predetermined wetness state.

9. The three-dimensional object detection device according to claim 1, wherein the lens cleaning device is configured to clean the lens using cleaning fluid according to predetermined lens cleaning steps including a lens wetting step, a first air blowing step, a cleaning step, and a second air blowing step;

the lens state assessment unit is further programmed to assess that the lens state is a large wetness state in which there is a large amount of cleaning fluid adhering to the lens during a period of time from when the lens cleaning steps are begun to when the lens wetting step is completed, or from when the cleaning step is begun to when the cleaning step is finished; and the controller is further programmed to use a detection result obtained by the three-dimensional object detection unit immediately before the lens state was assessed as being the large wetness state for a predetermined length of time, upon the lens state being assessed to be the large wetness state.

10. The three-dimensional object detection device according to claim 7, wherein the three-dimensional object detection unit detects a three-dimensional object present in the area rearward of the vehicle based on edge information, and calculates a relative speed of the three-dimensional object based on a change over time in the edge information within the predetermined length of time;

the three-dimensional object assessment unit is further programmed to assess that the three-dimensional object is another vehicle when the relative speed of the three-dimensional object is continuously within a predetermined value range for a predetermined length of time or longer;

the lens cleaning device is configured to clean the lens using cleaning fluid according to predetermined lens cleaning steps including a lens wetting step, a first air blowing step, a cleaning step, and a second air blowing step;

the lens state assessment unit is further programmed to assess that the lens state is a small wetness state subject to control in which a small amount of cleaning fluid adheres to the lens during a period of time from when the air blowing process performed last in the first air blowing step is begun to when the process is ended, and from when the second air blowing step is begun to when the second air blowing step is completed; and the controller is further programmed to use, for a predetermined length of time, the relative speed of the three-dimensional object detected by the three-dimensional object detection unit or an assessment result obtained by the three-dimensional object assessment unit immediately before the lens state was assessed as being the small wetness state, upon the lens state being assessed to be the small wetness state.

11. A three-dimensional object detection method in which a computing device of a three-dimensional object detection device executes:

a step of detecting a three-dimensional object rearward of a vehicle based on images acquired by a camera that is installed in the vehicle and provided with a lens for forming a video image of an area rearward of the vehicle;

a step of assessing whether the state of the lens is a predetermined wetness state based on a timing at which cleaning fluid is sprayed onto the lens during a lens cleaning step in which the lens of the camera is cleaned by spraying cleaning fluid, the lens cleaning being executed using a lens cleaning device; and a step of suspending, for a predetermined length of time, the step of detecting a three-dimensional object rearward of the vehicle upon assessing that the lens state is the predetermined wetness state, the suspension being accomplished by using a detection result obtained by the step of detecting a three-dimensional object rearward of the vehicle immediately before the lens was assessed to be in the predetermined wetness state.

* * * * *